(12) United States Patent
Kawamura

(10) Patent No.: US 9,122,044 B2
(45) Date of Patent: Sep. 1, 2015

(54) ZOOM LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/301,924

(22) Filed: Jun. 11, 2014

(65) Prior Publication Data

US 2014/0368925 A1  Dec. 18, 2014

(30) Foreign Application Priority Data

Jun. 13, 2013  (JP) .................................. 2013-124347

(51) Int. Cl.
*G02B 15/14* (2006.01)
*G02B 15/173* (2006.01)
*G02B 27/64* (2006.01)

(52) U.S. Cl.
CPC ............ *G02B 15/173* (2013.01); *G02B 27/646* (2013.01)

(58) Field of Classification Search
CPC .................................................. G02B 15/173
USPC ......................................................... 359/687
See application file for complete search history.

(56) References Cited

U.S. PATENT DOCUMENTS 6,650,475 B1   11/2003  Hamano
2011/0109979 A1* 5/2011  Wada ............................ 359/773

FOREIGN PATENT DOCUMENTS

| JP | 2001-117000 | 4/2001 |
| JP | 2002-006217 | 1/2002 |
| JP | 2008-181147 | 8/2008 |
| JP | 2009-150970 | 7/2009 |

* cited by examiner

*Primary Examiner* — James Jones
(74) *Attorney, Agent, or Firm* — Young & Thompson

(57) ABSTRACT

A zoom lens includes a positive first lens group, a negative second lens group, a positive third lens group, and a fourth lens group. The first through third lens groups move such that the distance between the first and second lens groups is greater while the distance between the second lens group and the third lens group is less at the telephoto end compared to the wide angle end, and the fourth lens moves with the third lens group. The third lens group includes a fixed positive subgroup, including at least one positive lens and one negative lens, and a movable subgroup provided toward an image side of the fixed lens group including one negative lens that moves perpendicular to an optical axis to correct an image plane when camera shake occurs. The fourth lens group includes a fixed subgroup and a movable subgroup that moves during focusing operations.

20 Claims, 53 Drawing Sheets

FIG.1
EXAMPLE 1
WIDE ANGLE END
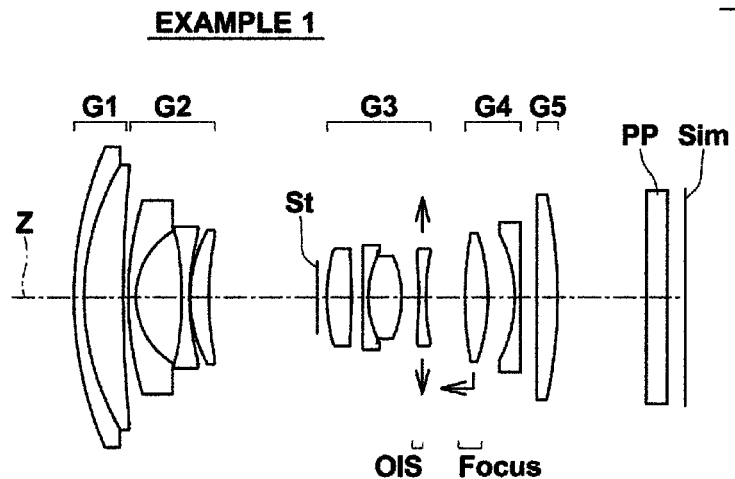
INTERMEDIATE
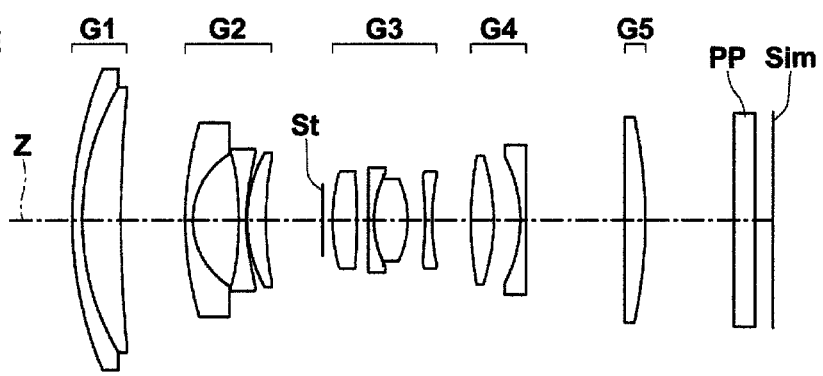
TELEPHOTO END
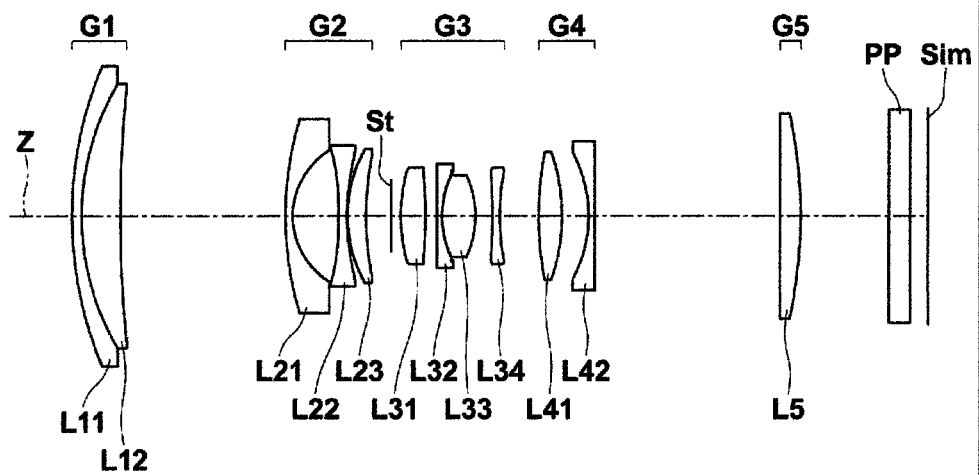

FIG.2
EXAMPLE 2
WIDE ANGLE END
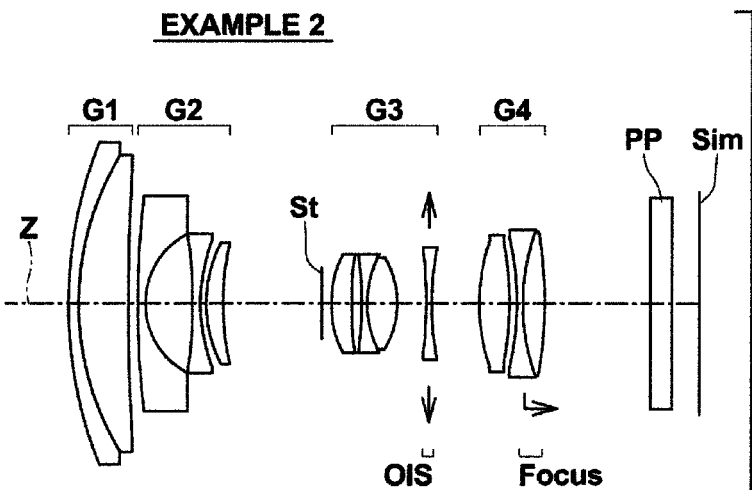
INTERMEDIATE
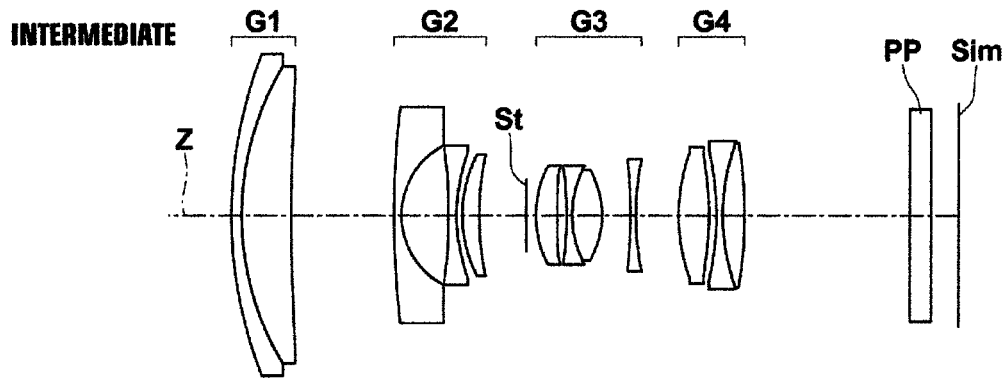
TELEPHOTO END
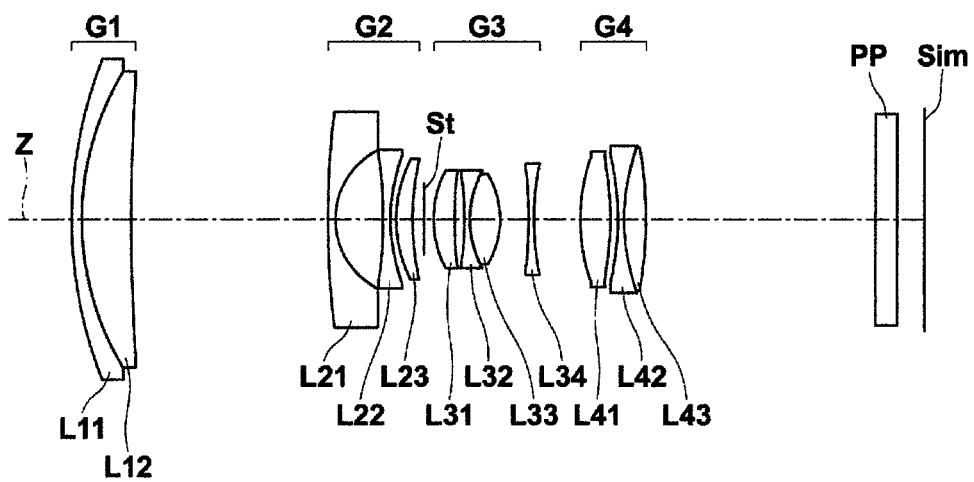

FIG.3
EXAMPLE 3
WIDE ANGLE END
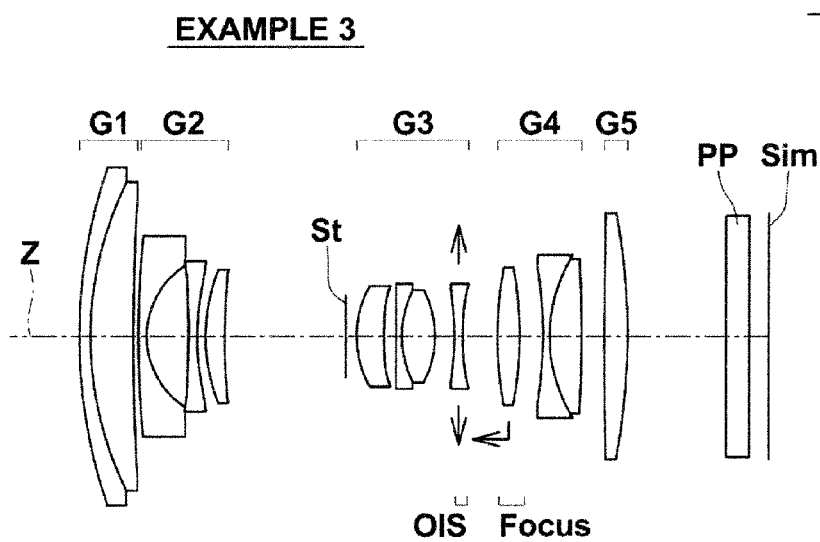
INTERMEDIATE
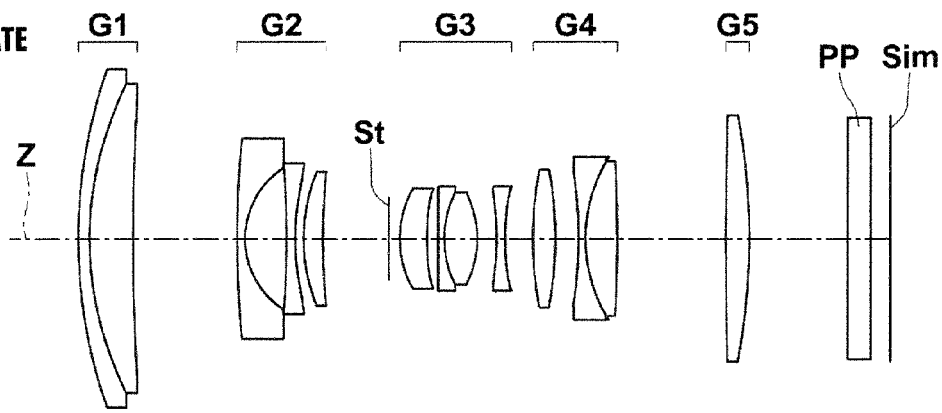
TELEPHOTO END
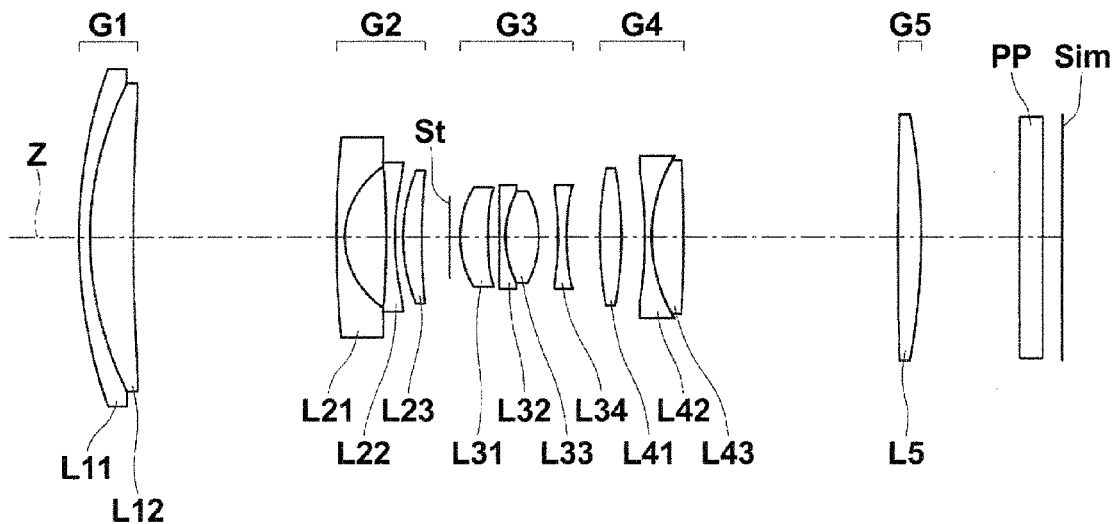

FIG.4
EXAMPLE 4
WIDE ANGLE END
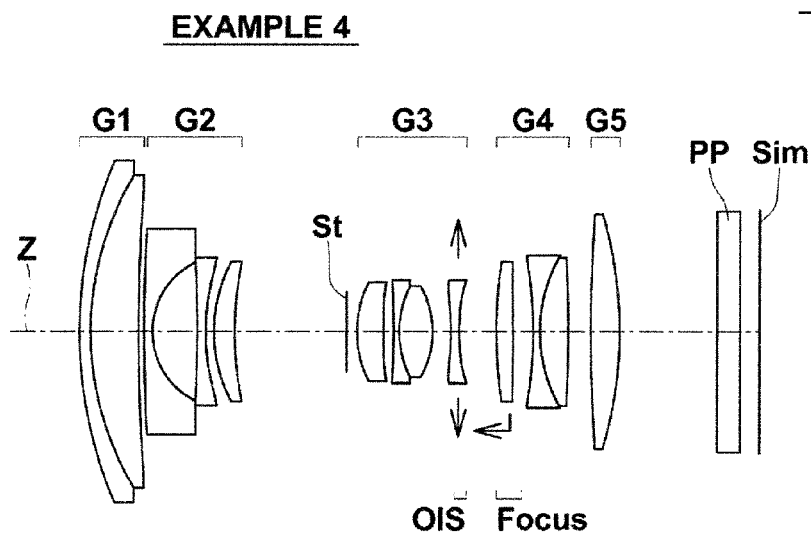
INTERMEDIATE
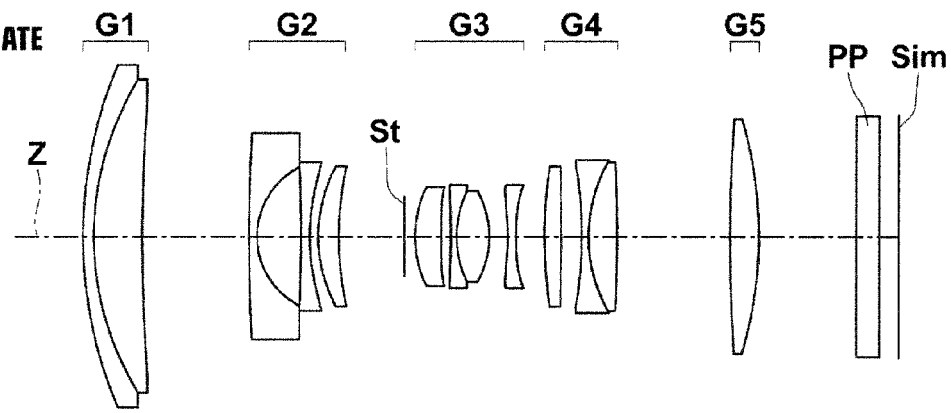
TELEPHOTO END
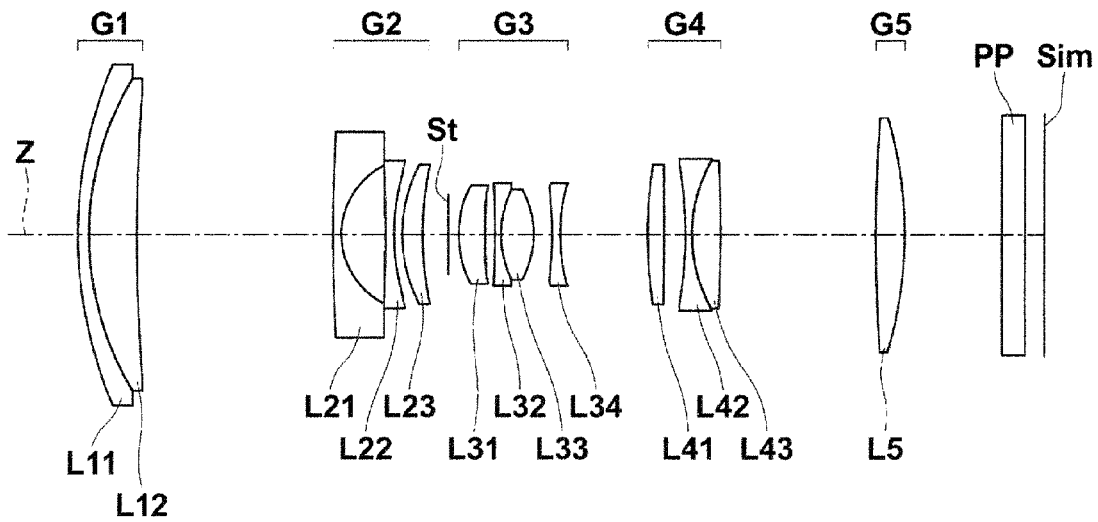

FIG.5
EXAMPLE 5
WIDE ANGLE END
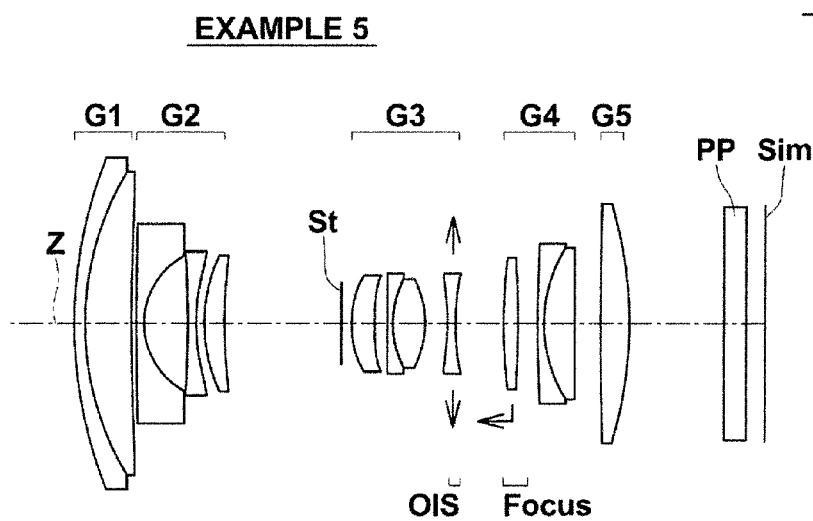
INTERMEDIATE
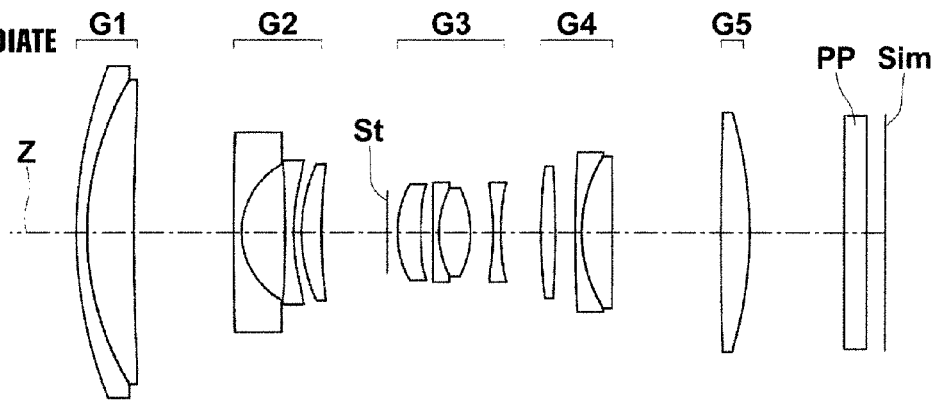
TELEPHOTO END
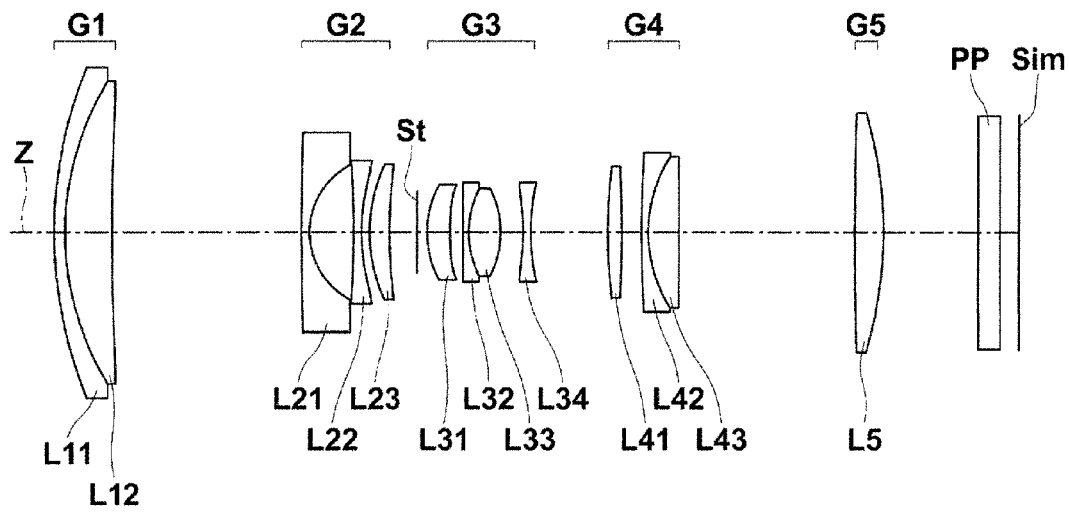

FIG.7
EXAMPLE 7
WIDE ANGLE END
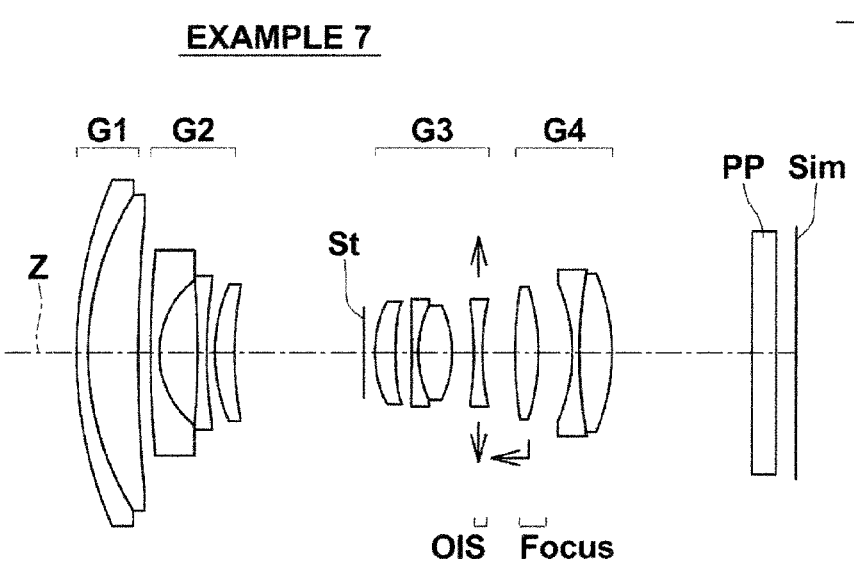
INTERMEDIATE
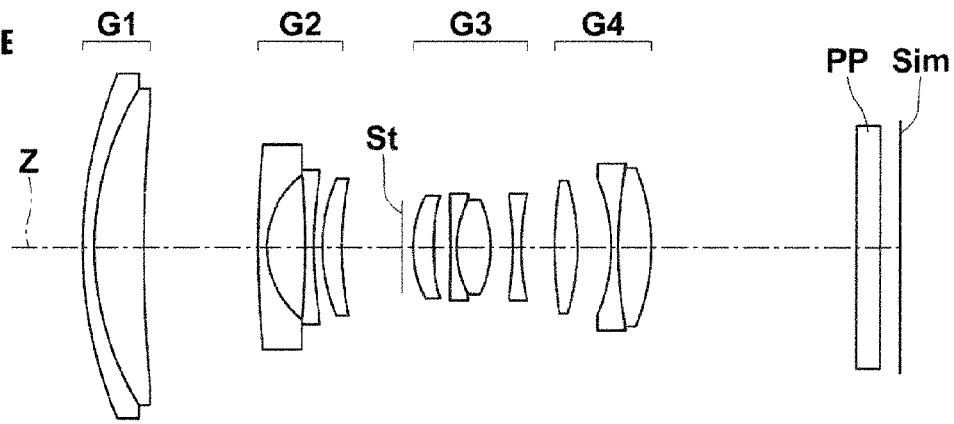
TELEPHOTO END
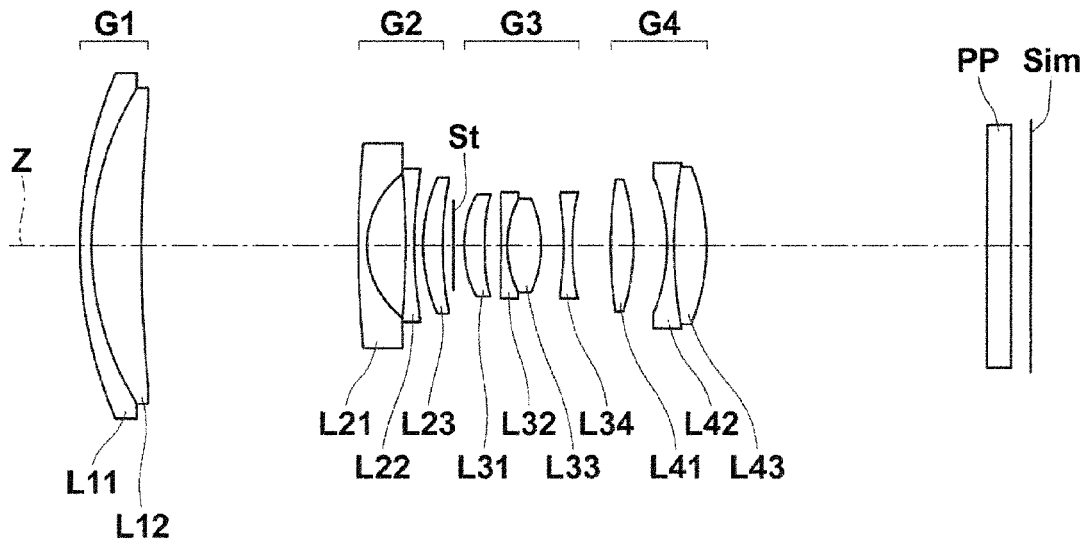

FIG.8
EXAMPLE 8
WIDE ANGLE END
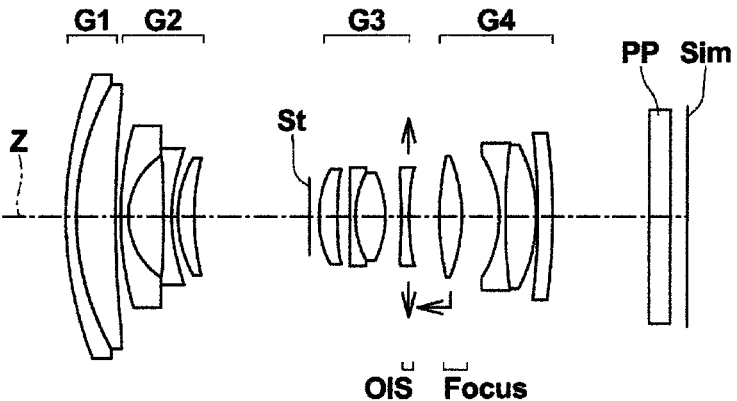
INTERMEDIATE
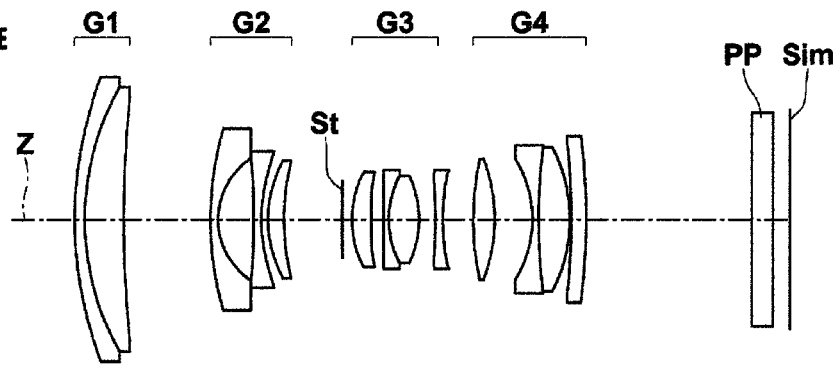
TELEPHOTO END
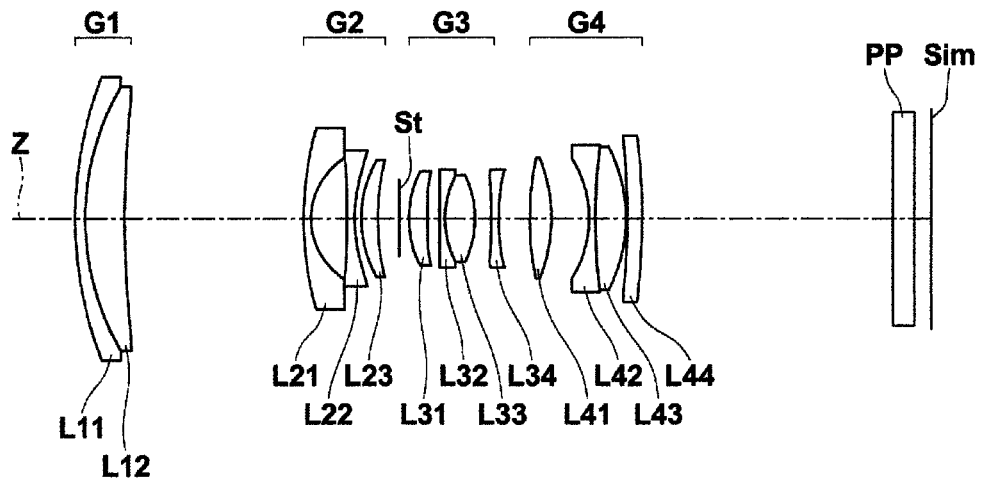

FIG.9
EXAMPLE 9
WIDE ANGLE END
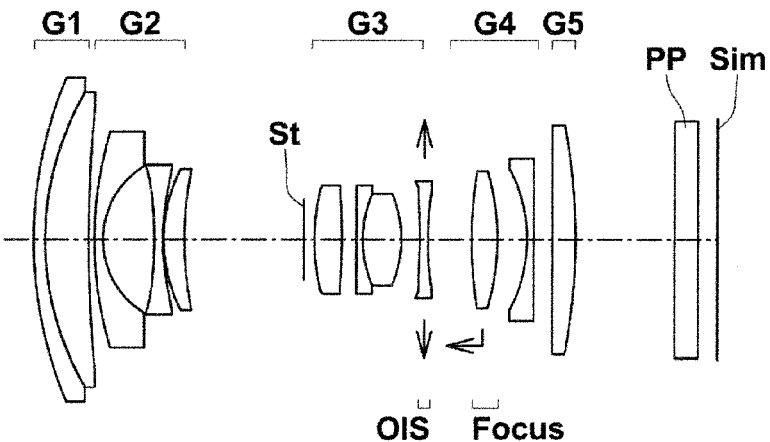
INTERMEDIATE
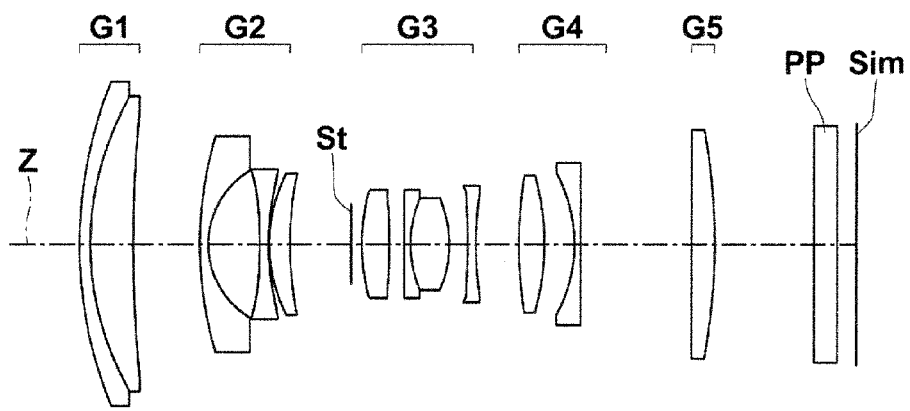
TELEPHOTO END
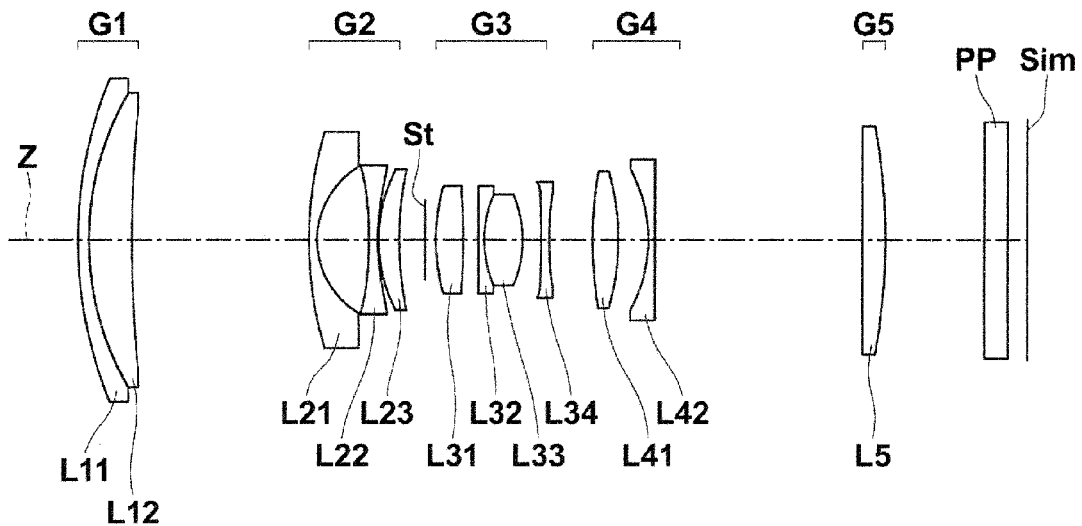

FIG.10
EXAMPLE 10
WIDE ANGLE END
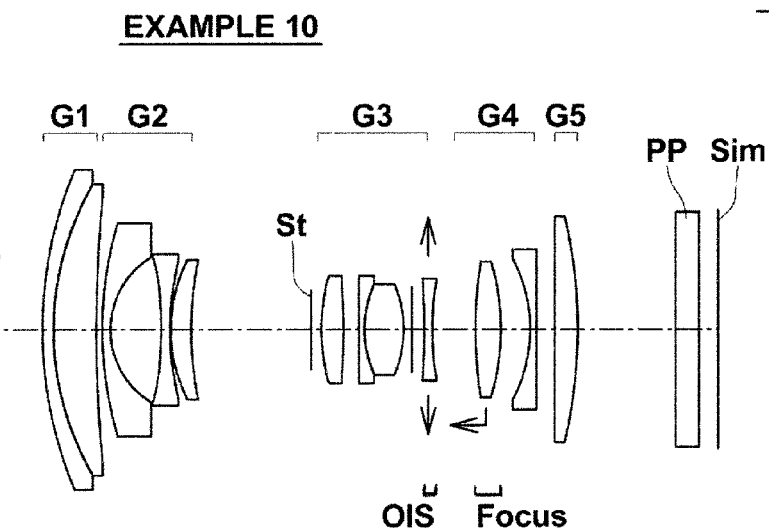
INTERMEDIATE
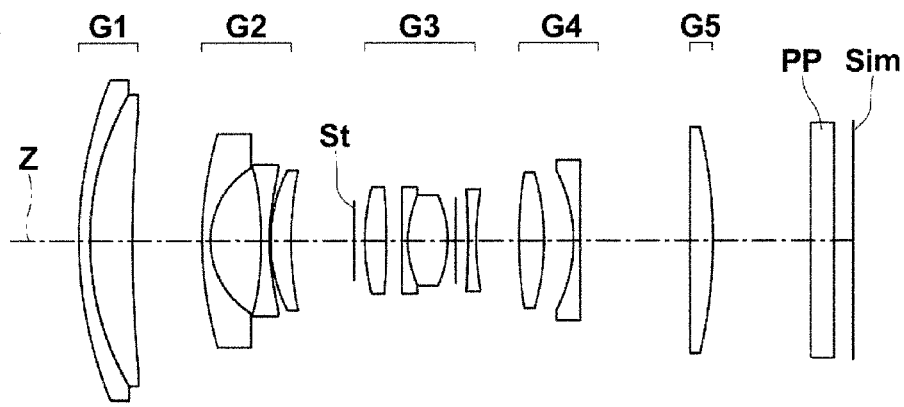
TELEPHOTO END
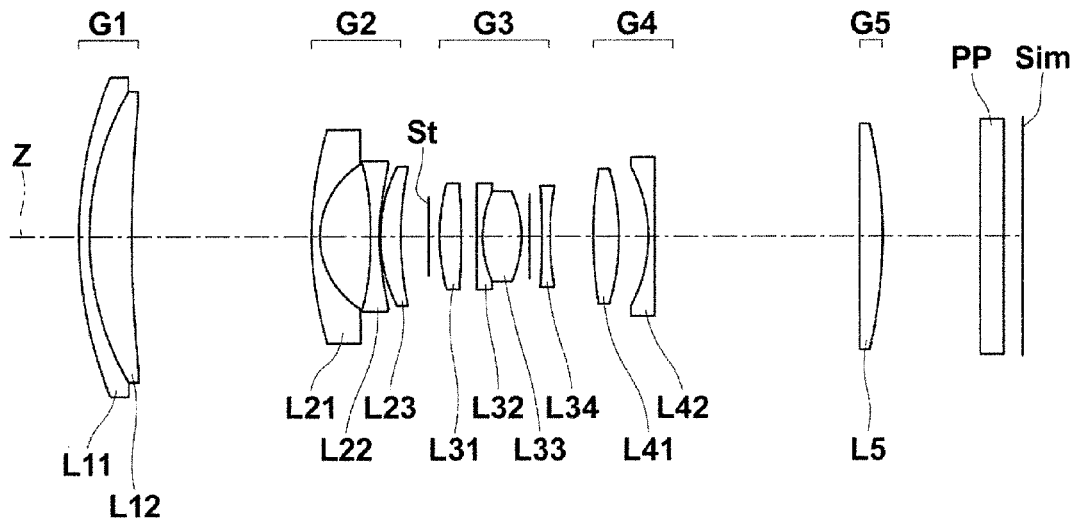

FIG.14
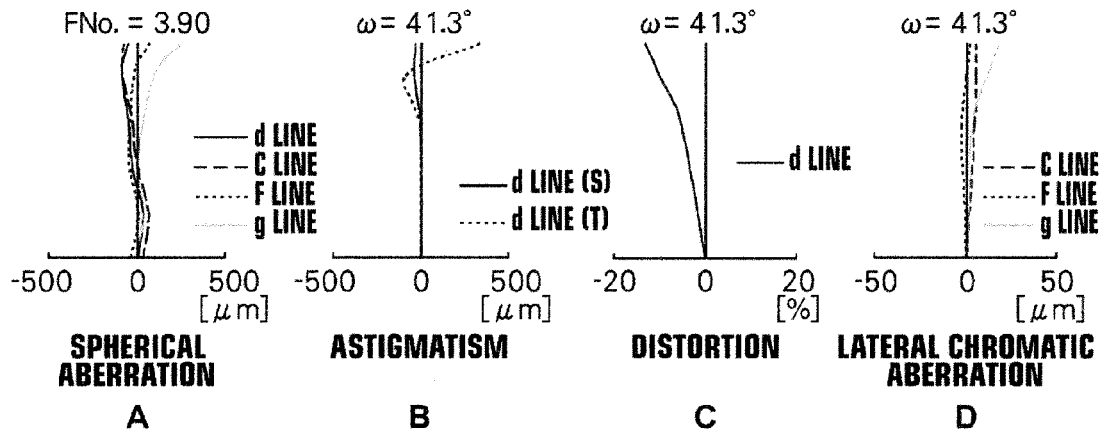
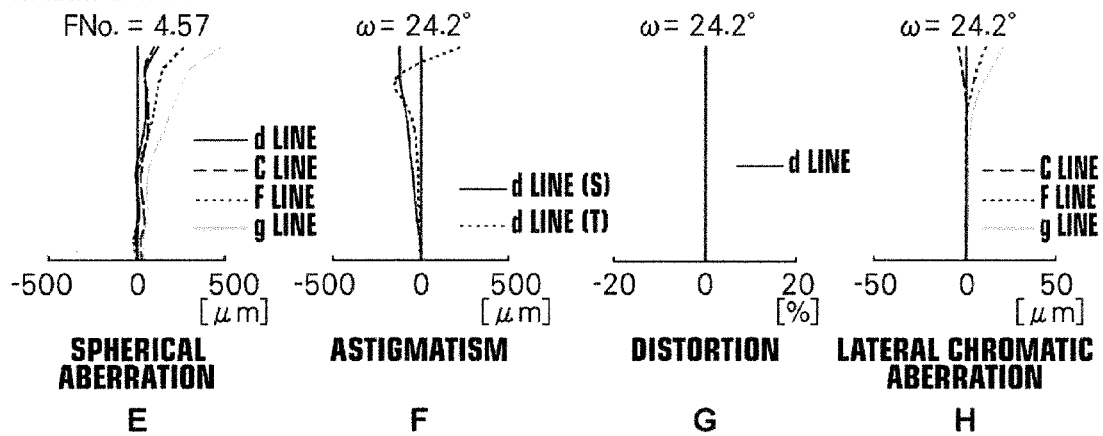
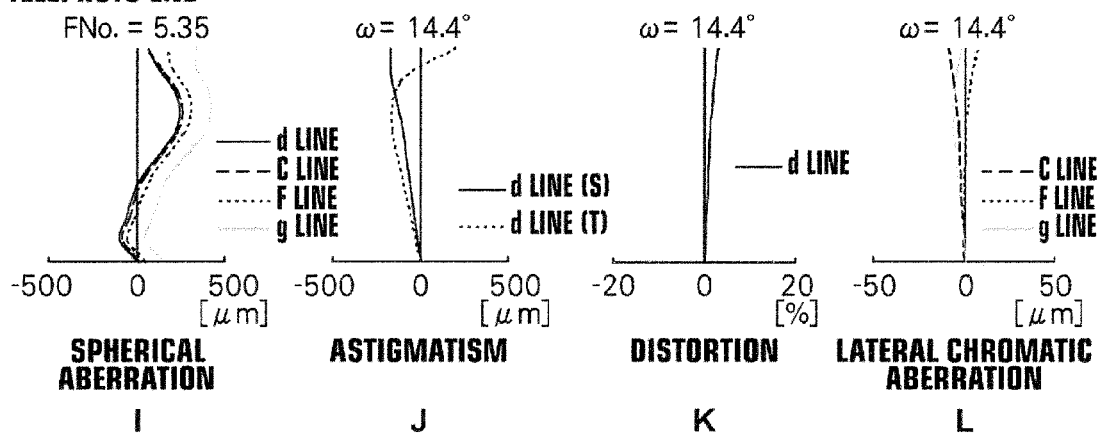

FIG.15
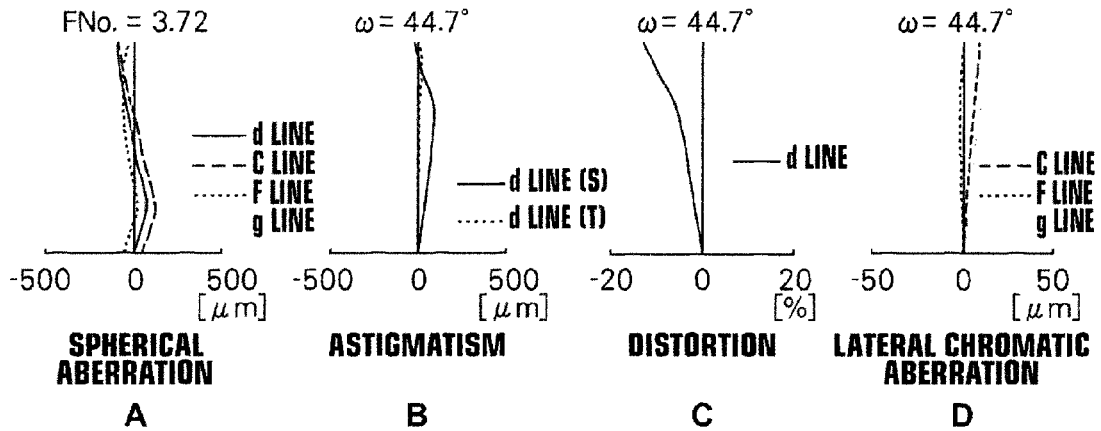
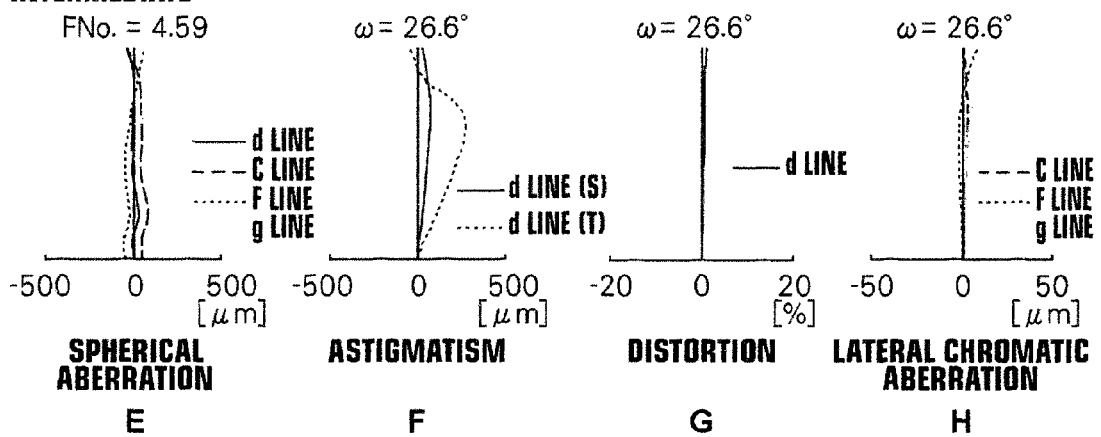
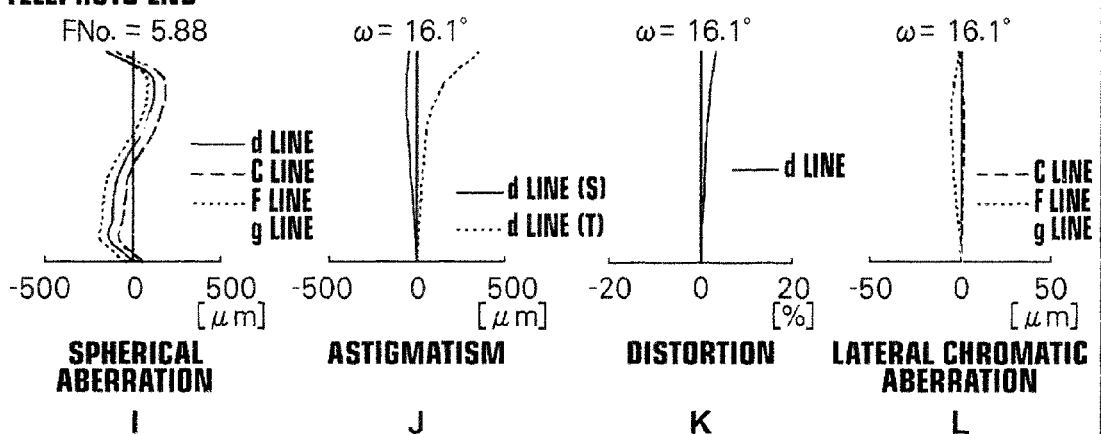

FIG.16
EXAMPLE 4
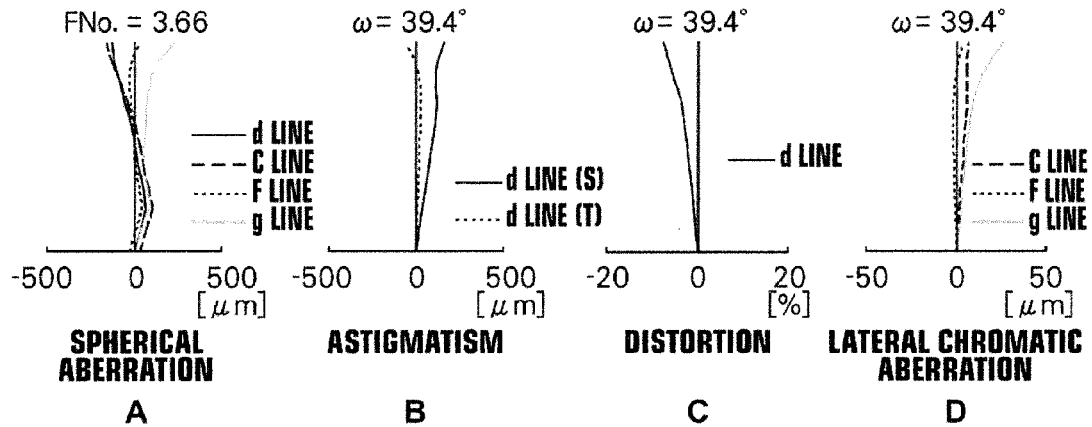
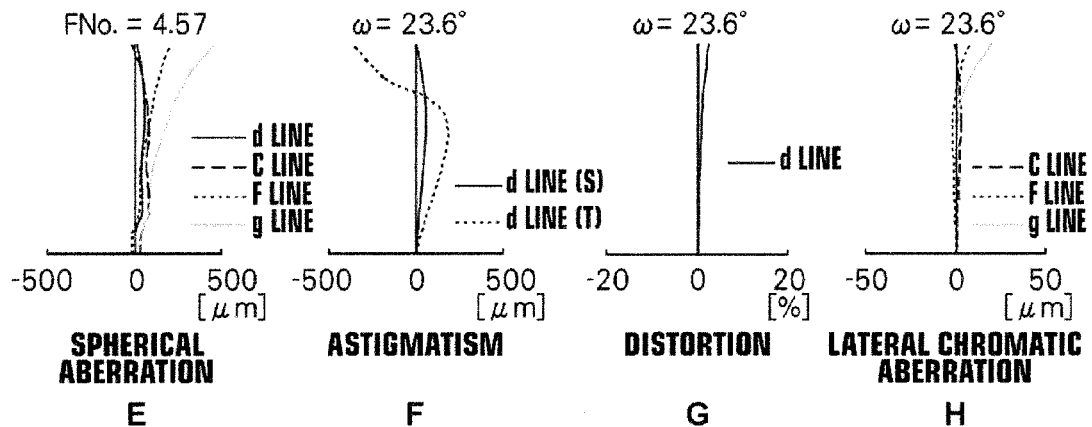
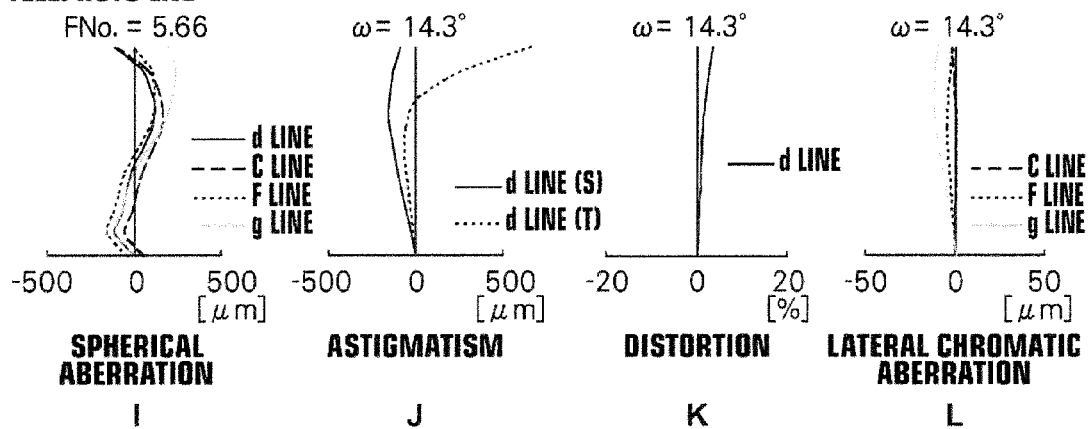

FIG.17
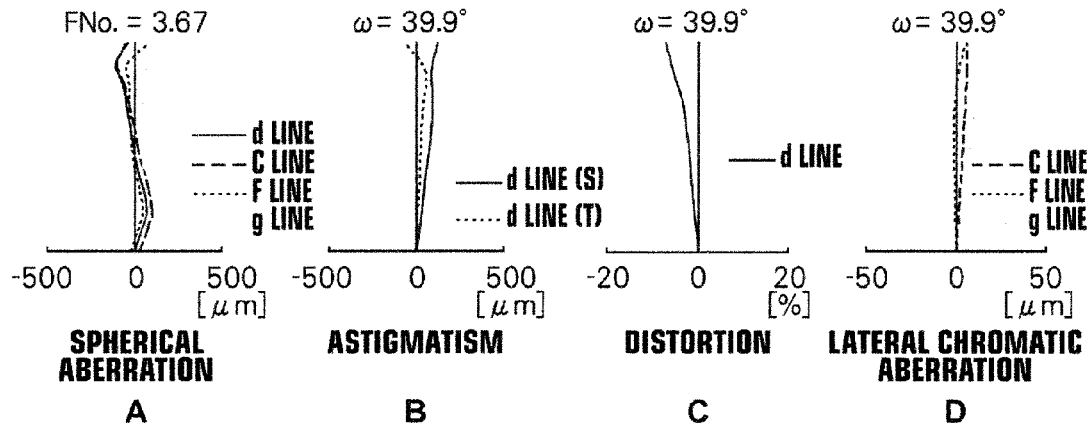
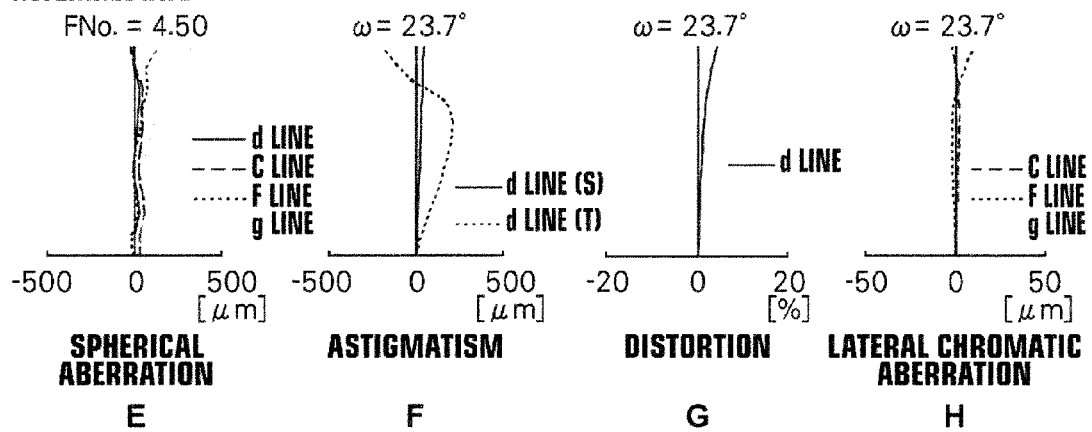
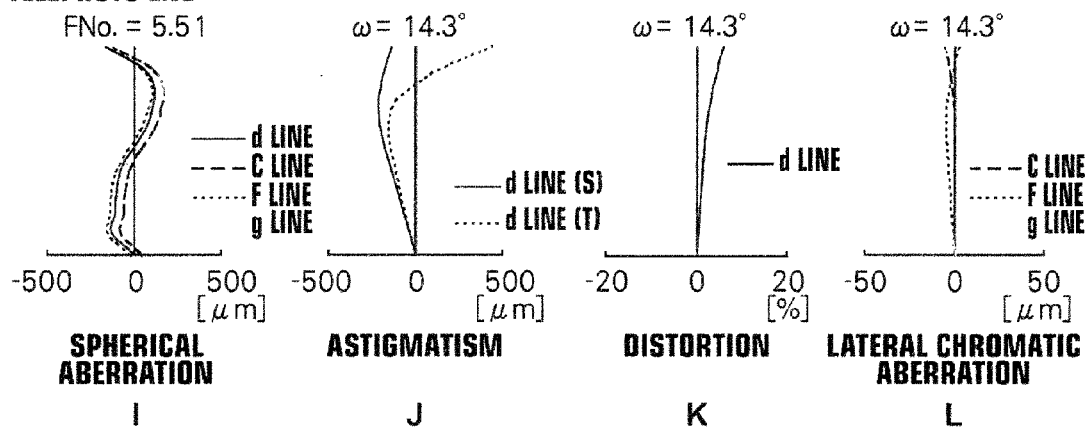

FIG.18
EXAMPLE 6
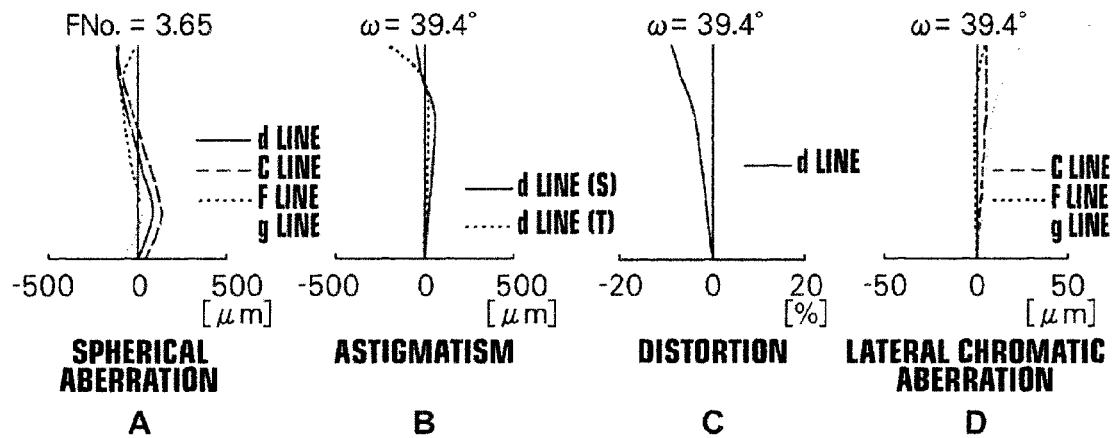
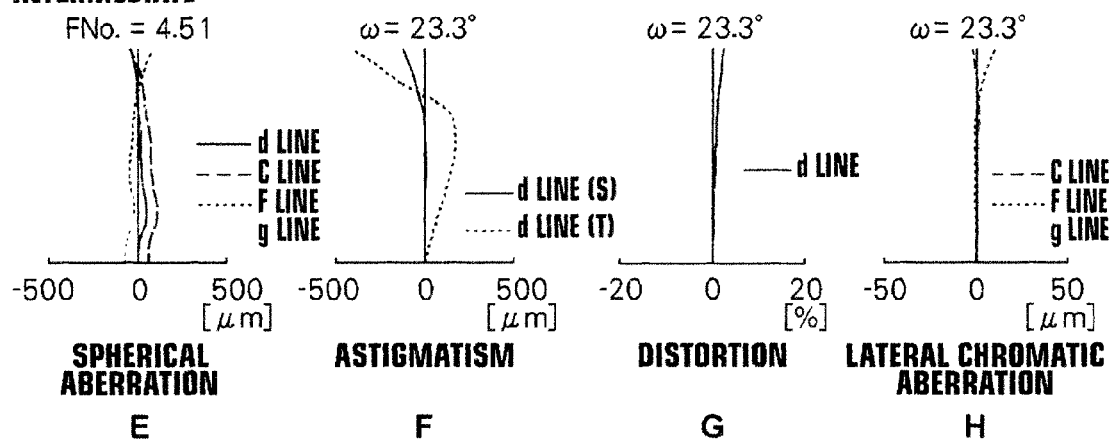
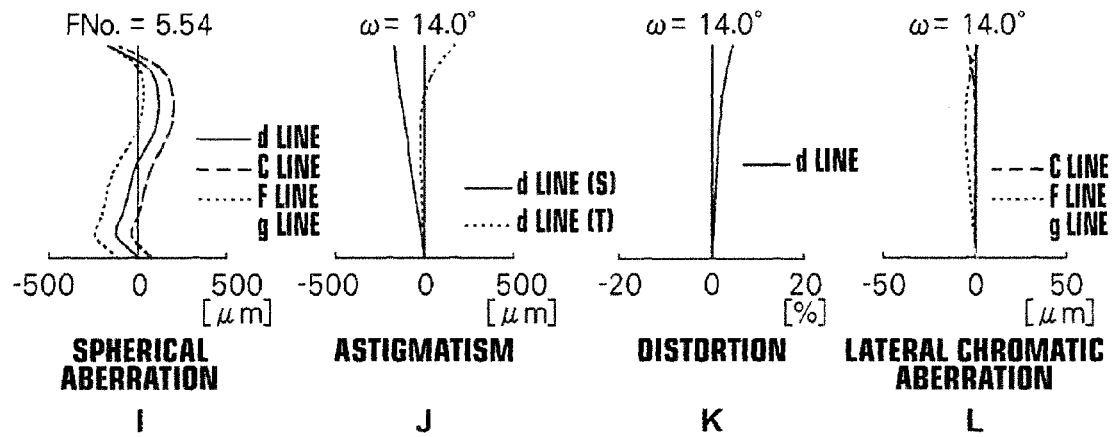

FIG.19
EXAMPLE 7
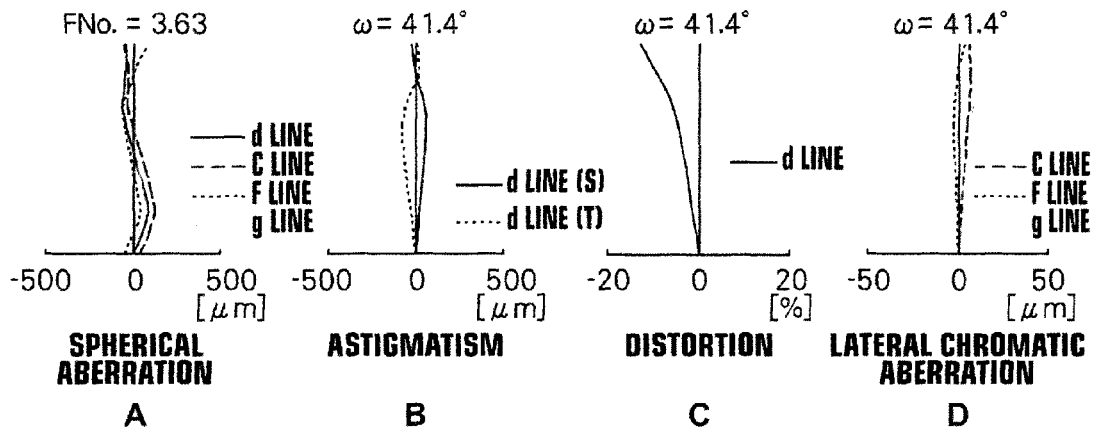
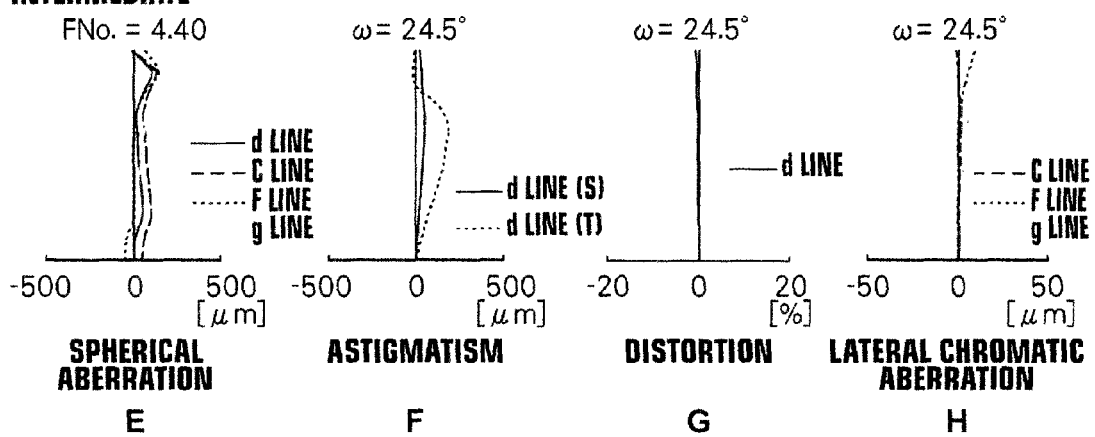
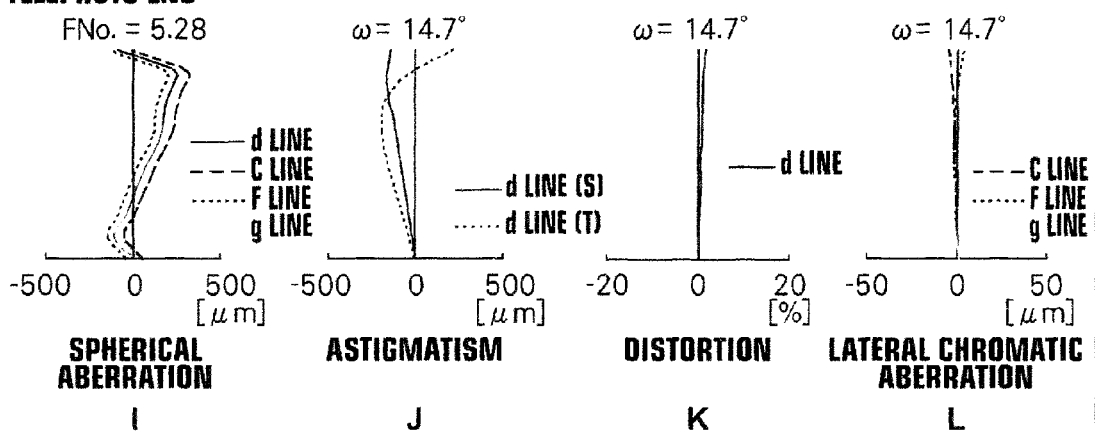

FIG.20
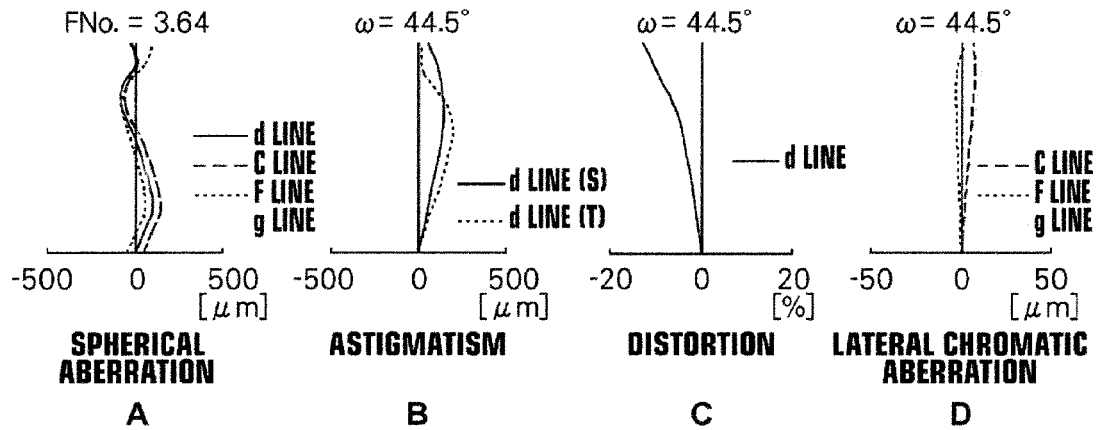
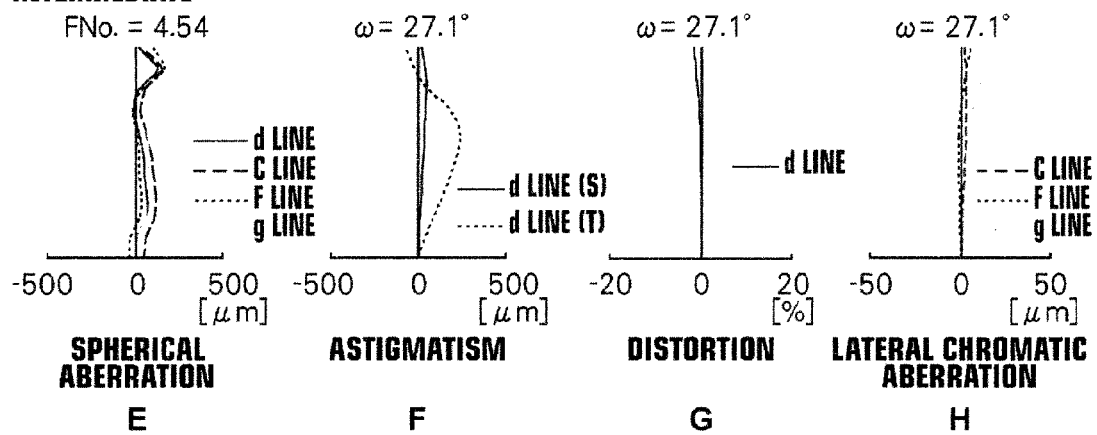
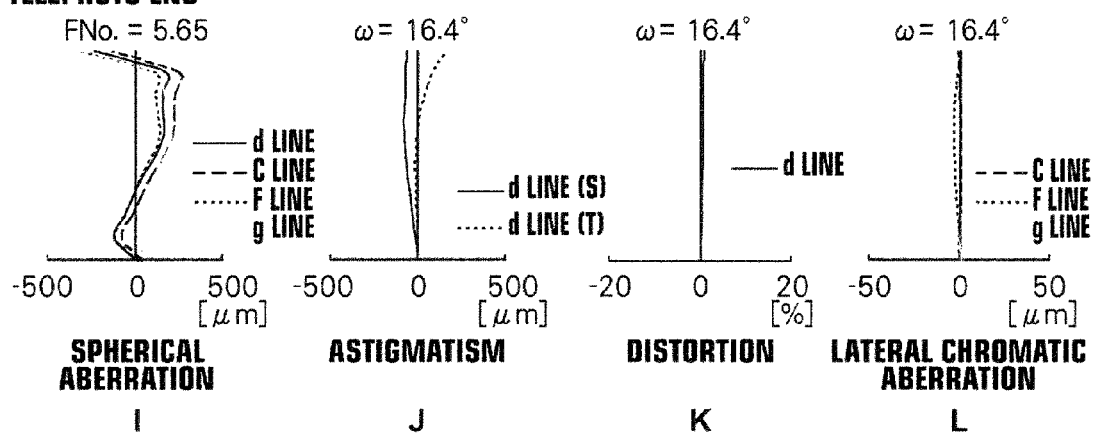

FIG.21
EXAMPLE 9
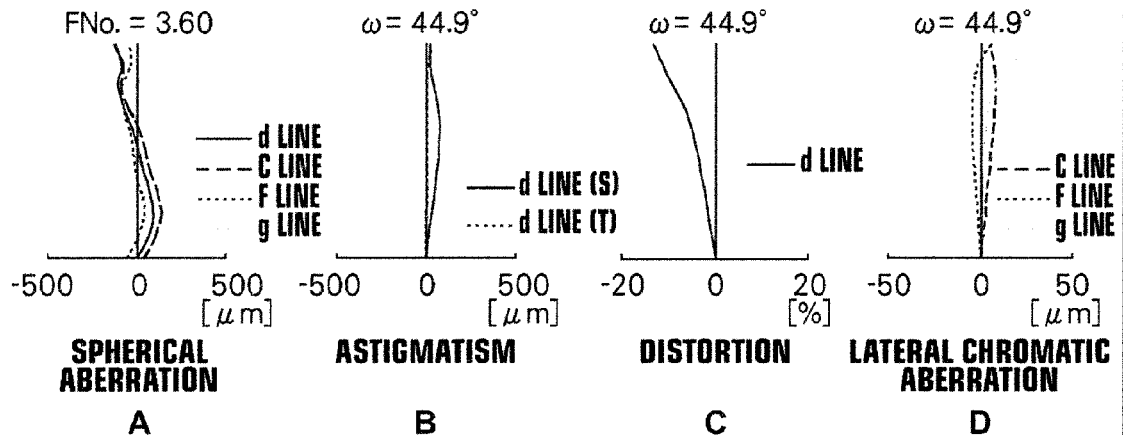
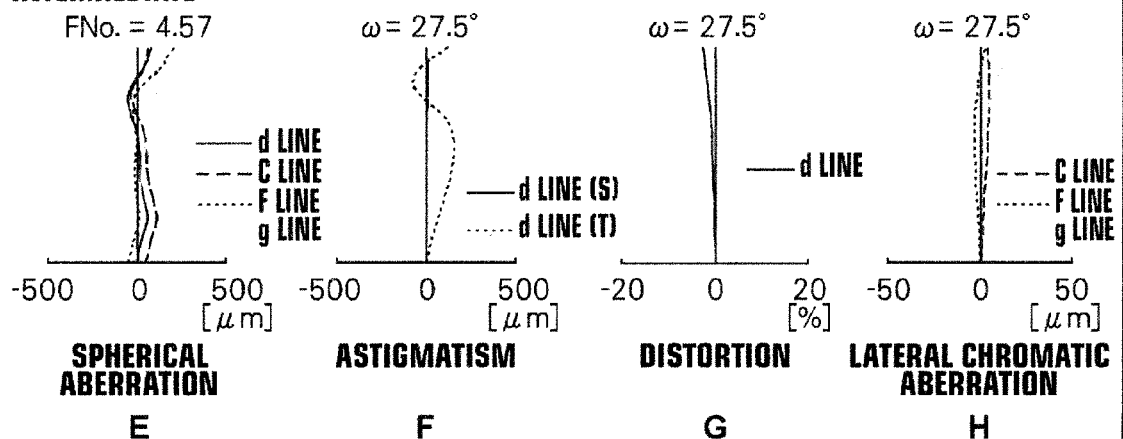
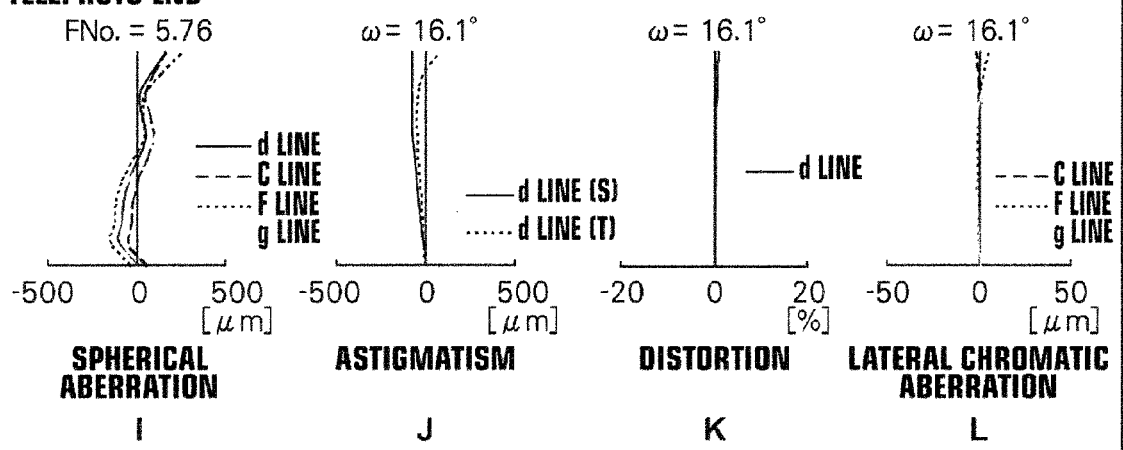

FIG.22
EXAMPLE 10
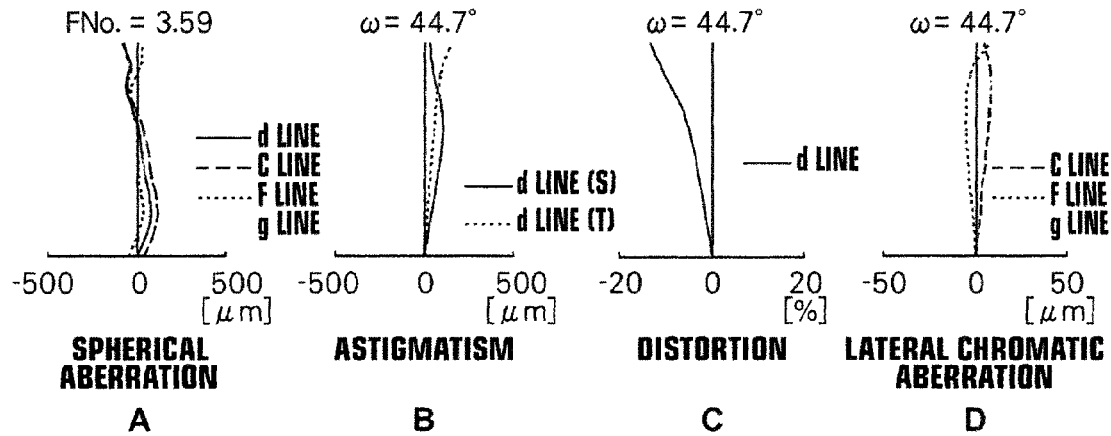
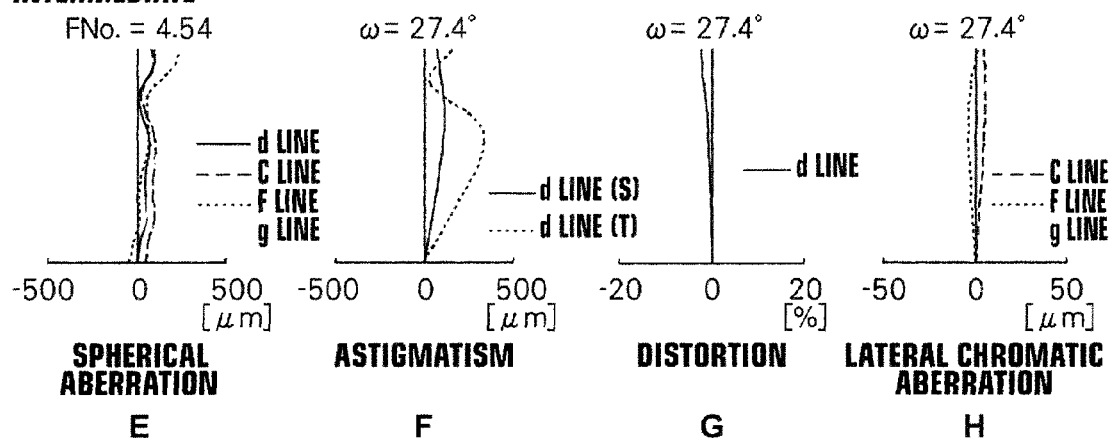
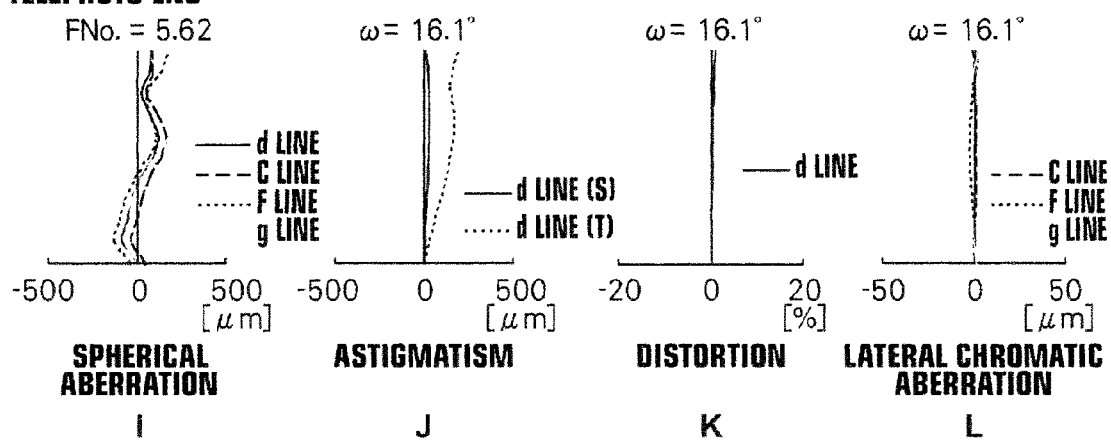

FIG.23
WIDE ANGLE END      EXAMPLE 1
[WITHOUT CAMERA SHAKE CORRECTION]
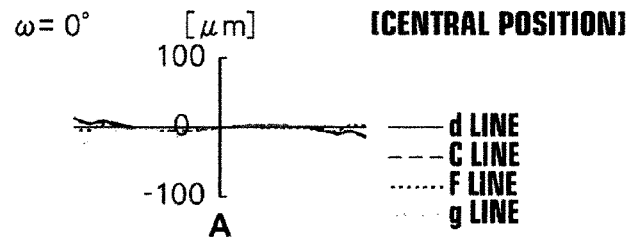
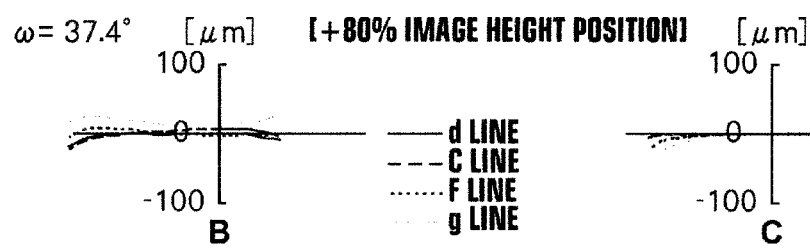 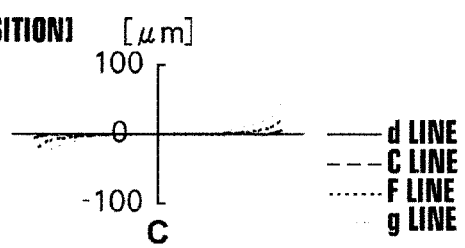
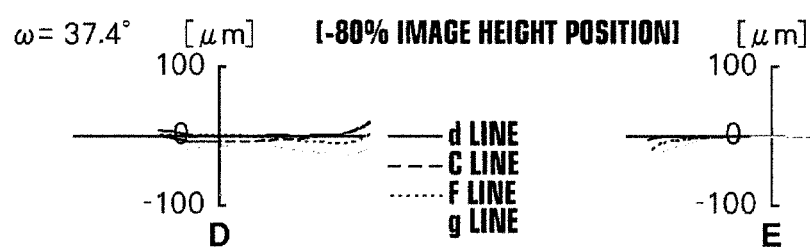 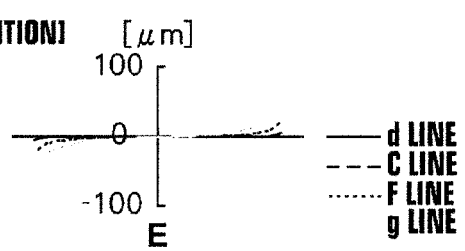
[WITH 0.3° CAMERA SHAKE CORRECTION]
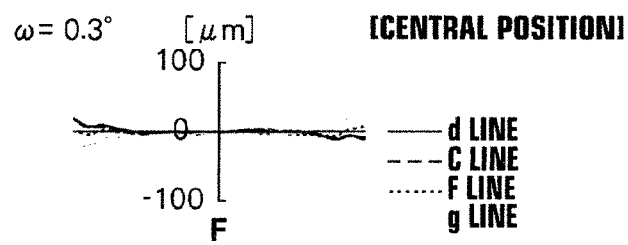
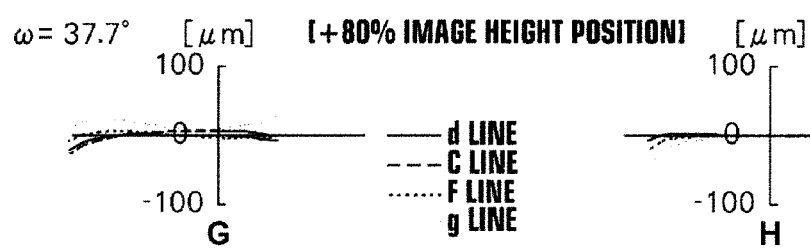 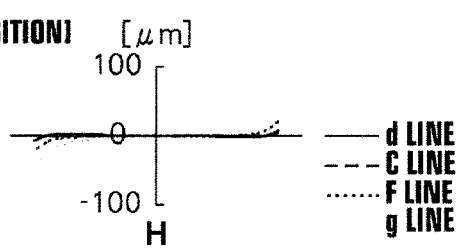
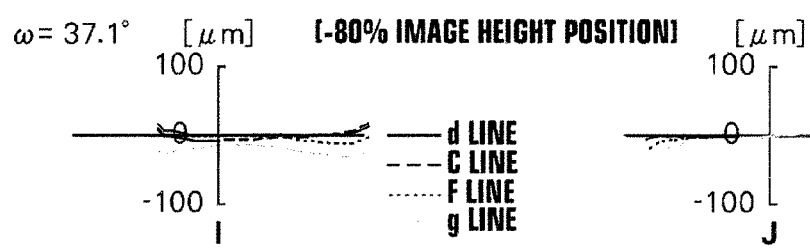 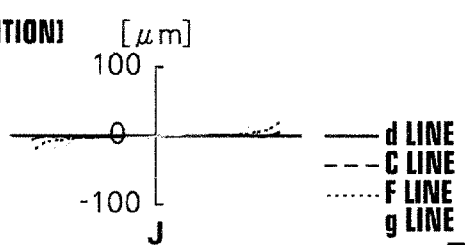

FIG.24
INTERMEDIATE     EXAMPLE 1
[WITHOUT CAMERA SHAKE CORRECTION]
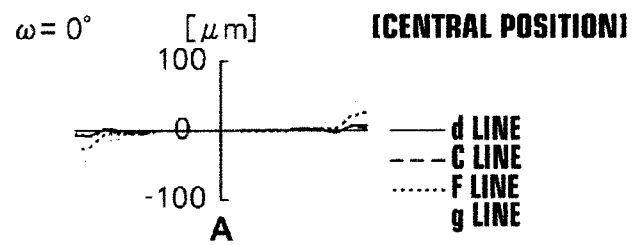
[CENTRAL POSITION] — A
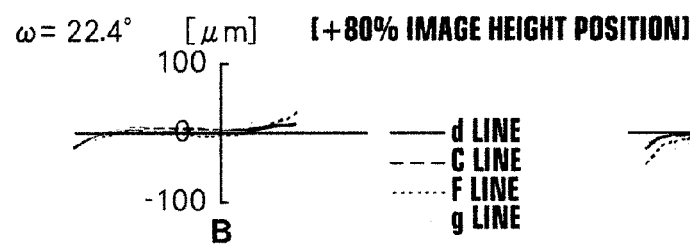 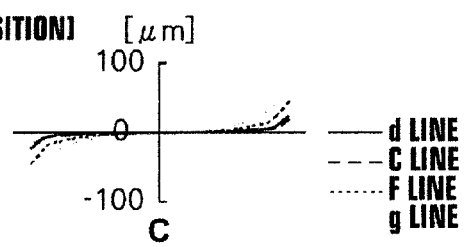
[+80% IMAGE HEIGHT POSITION] — B, C
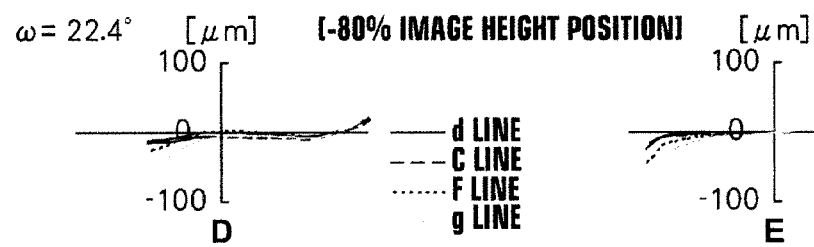 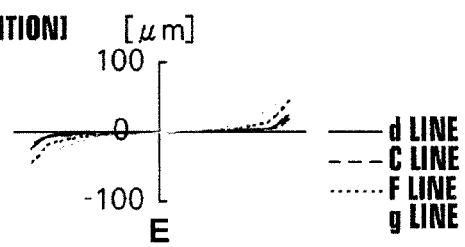
[−80% IMAGE HEIGHT POSITION] — D, E
[WITH 0.3° CAMERA SHAKE CORRECTION]
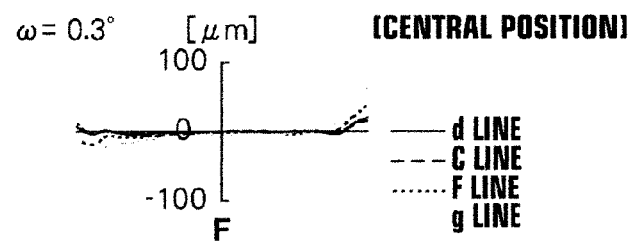
[CENTRAL POSITION] — F
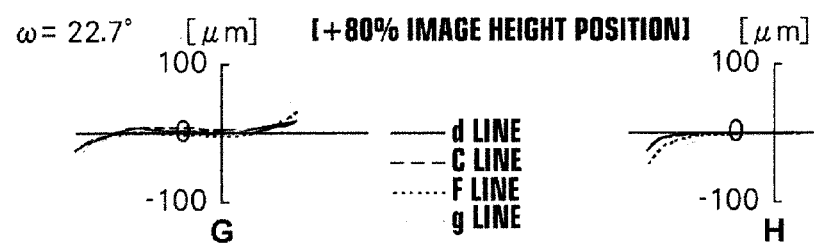 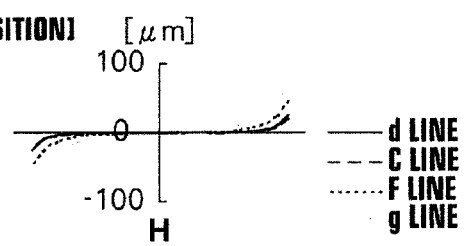
[+80% IMAGE HEIGHT POSITION] — G, H
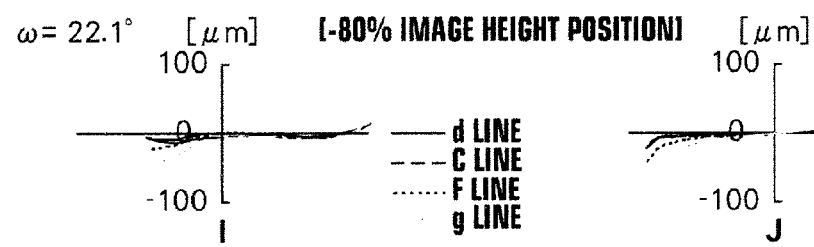 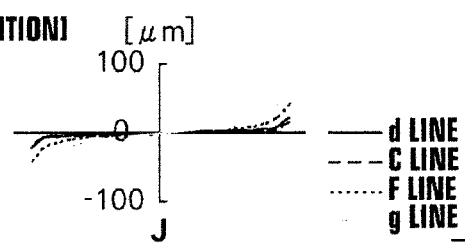
[−80% IMAGE HEIGHT POSITION] — I, J

FIG.25
TELEPHOTO END     EXAMPLE 1
[WITHOUT CAMERA SHAKE CORRECTION]
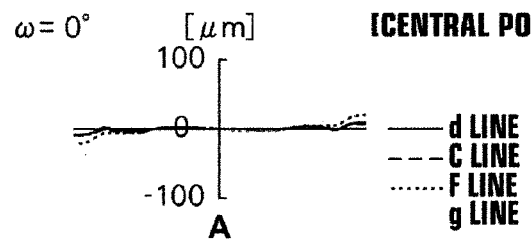
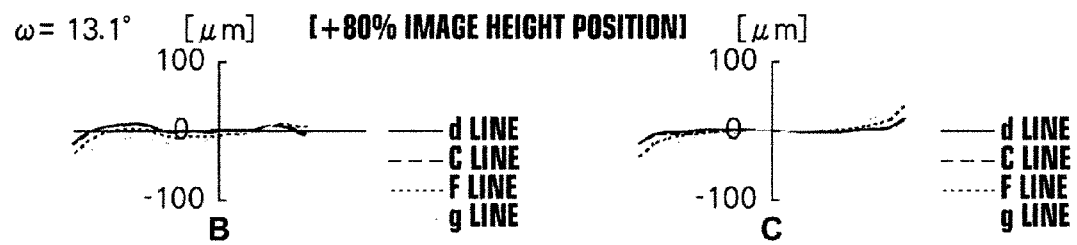
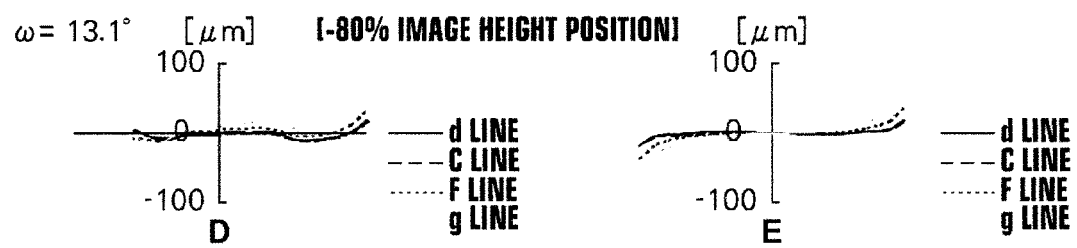
[WITH 0.3° CAMERA SHAKE CORRECTION]
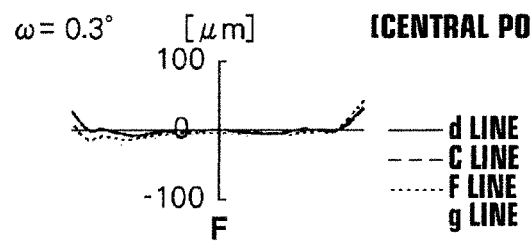
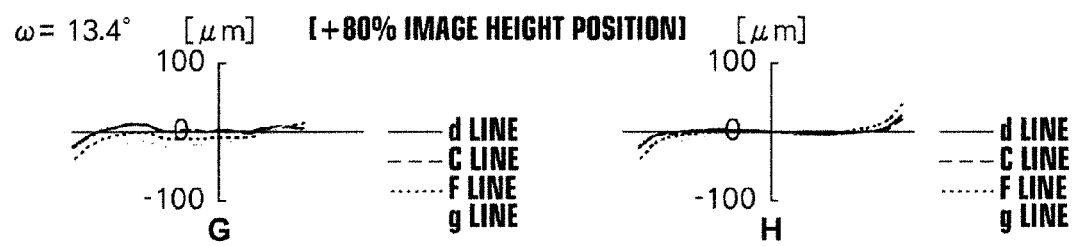
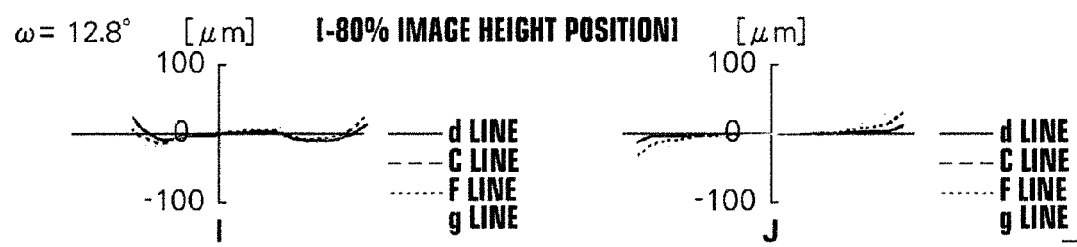

FIG.26
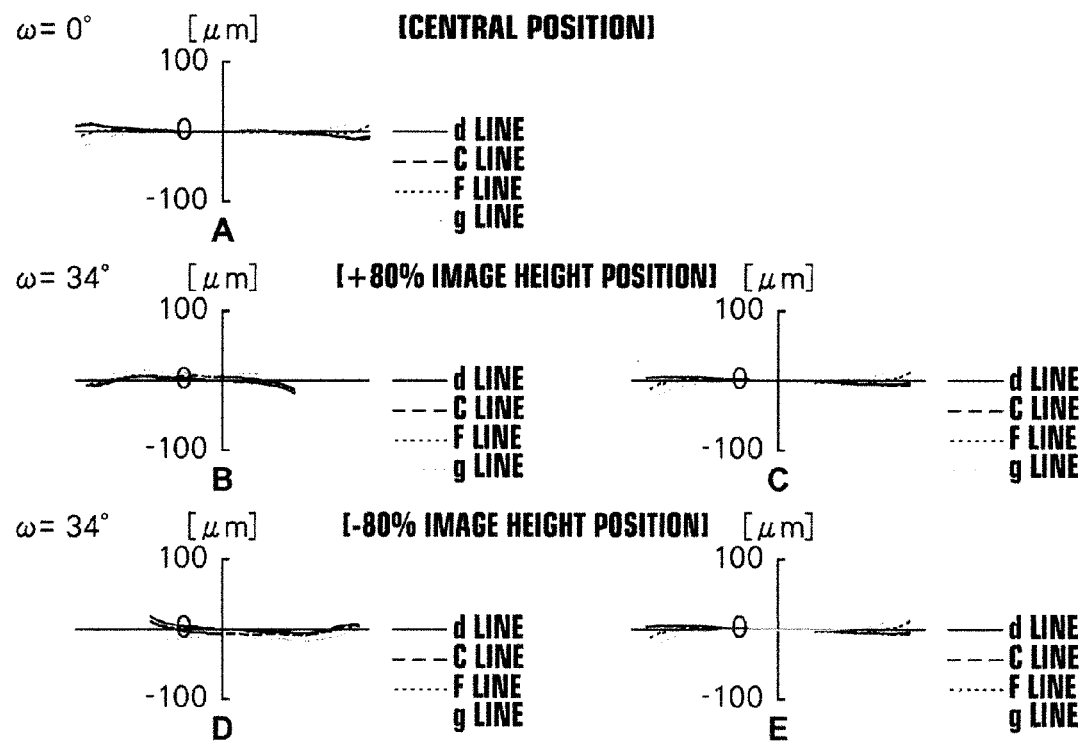
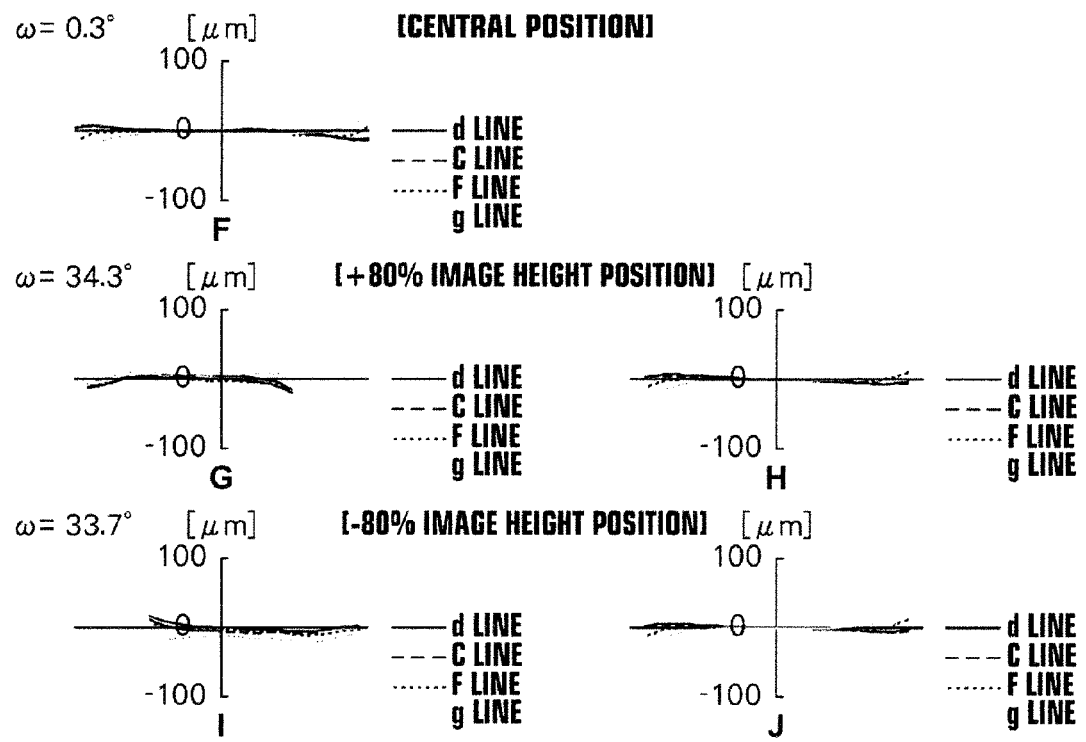

FIG.27
EXAMPLE 2
INTERMEDIATE
[WITHOUT CAMERA SHAKE CORRECTION]
$\omega = 0°$  [CENTRAL POSITION]
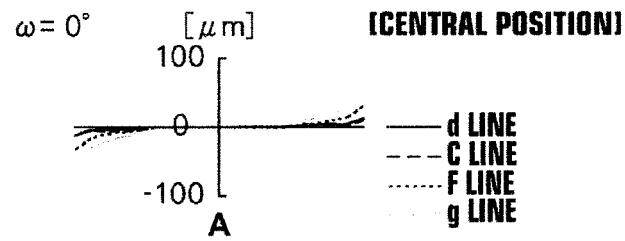
A
$\omega = 19.8°$  [+80% IMAGE HEIGHT POSITION]
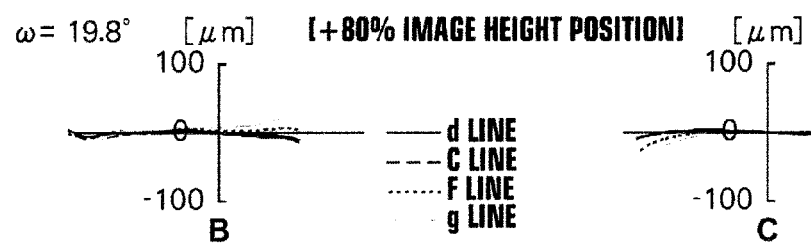
B
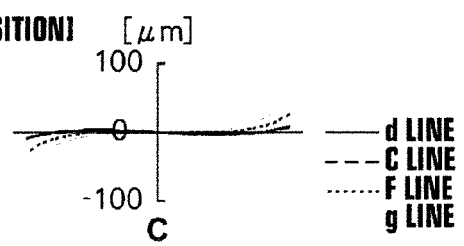
C
$\omega = 19.8°$  [-80% IMAGE HEIGHT POSITION]
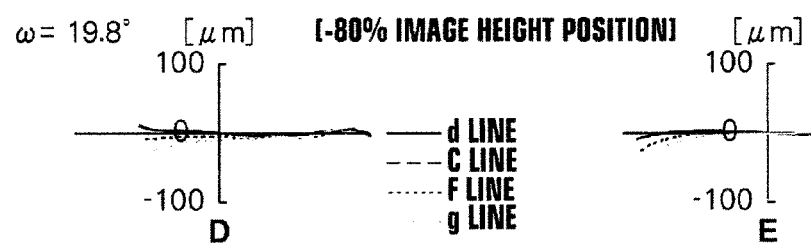
D
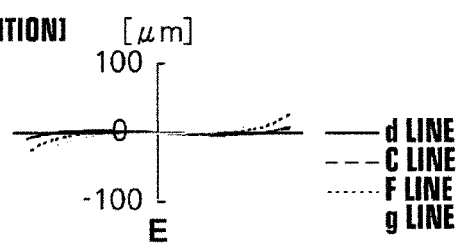
E
[WITH 0.3° CAMERA SHAKE CORRECTION]
$\omega = 0.3°$  [CENTRAL POSITION]
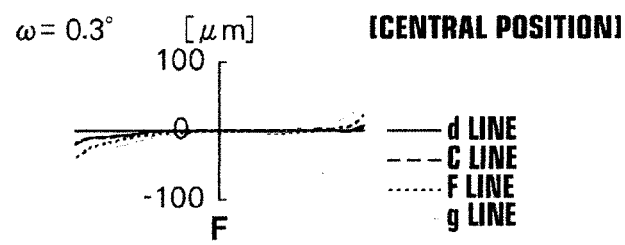
F
$\omega = 20.1°$  [+80% IMAGE HEIGHT POSITION]
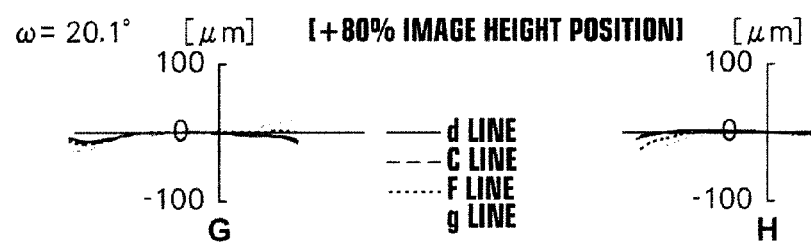
G
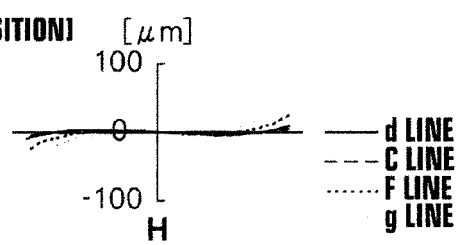
H
$\omega = 19.5°$  [-80% IMAGE HEIGHT POSITION]
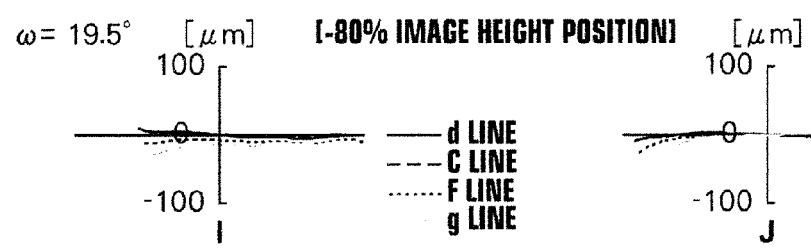
I
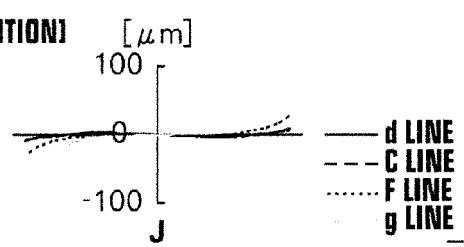
J

FIG.28
TELEPHOTO END      EXAMPLE 2
[WITHOUT CAMERA SHAKE CORRECTION]
$\omega = 0°$ [μm]    [CENTRAL POSITION]
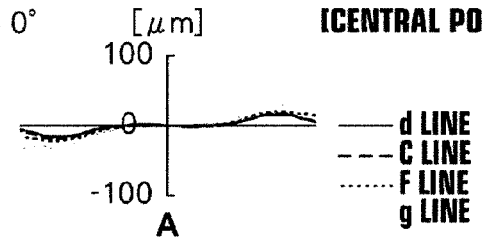
A
$\omega = 11.7°$ [μm]    [+80% IMAGE HEIGHT POSITION]    [μm]
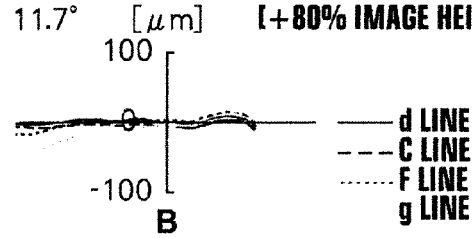 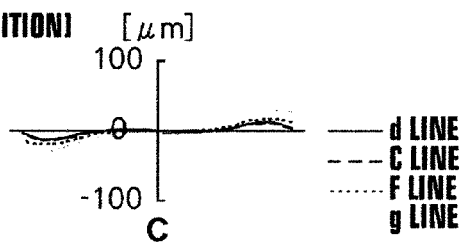
B            C
$\omega = 11.7°$ [μm]    [−80% IMAGE HEIGHT POSITION]    [μm]
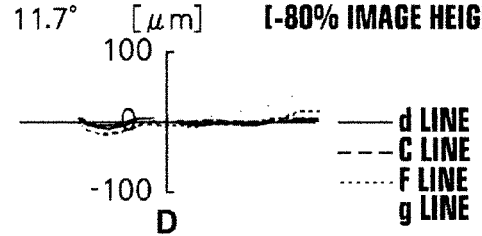 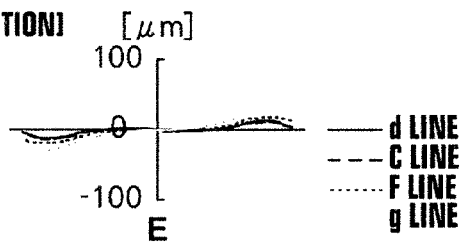
D            E
[WITH 0.3° CAMERA SHAKE CORRECTION]
$\omega = 0.3°$ [μm]    [CENTRAL POSITION]
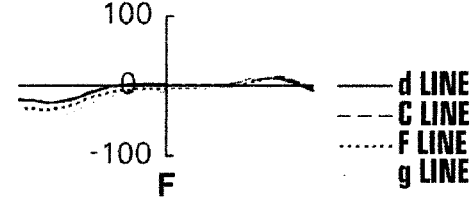
F
$\omega = 12°$ [μm]    [+80% IMAGE HEIGHT POSITION]    [μm]
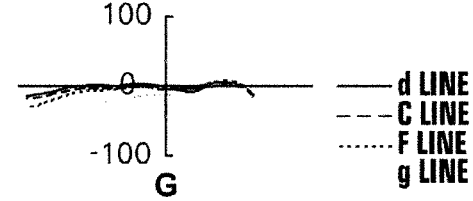 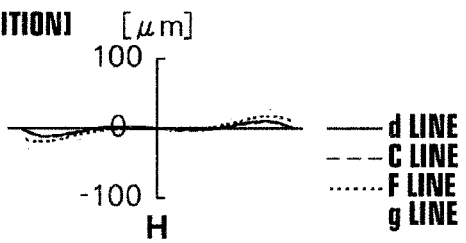
G            H
$\omega = 11.5°$ [μm]    [−80% IMAGE HEIGHT POSITION]    [μm]
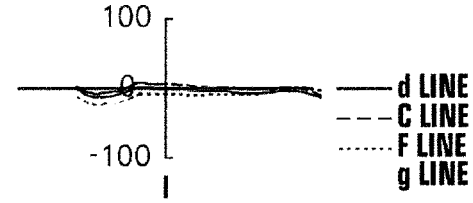 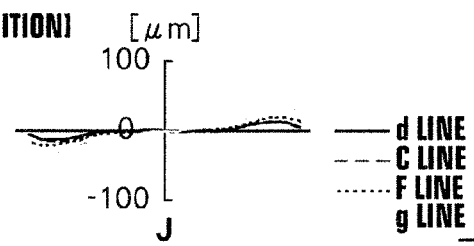
I            J

FIG.29
WIDE ANGLE END     EXAMPLE 3
[WITHOUT CAMERA SHAKE CORRECTION]
ω = 0°  [μm]  [CENTRAL POSITION]
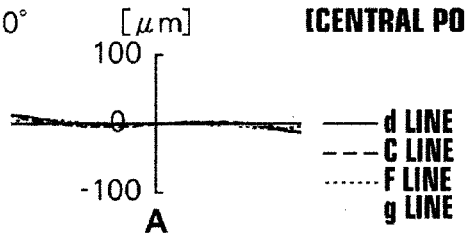
A
ω = 37.1°  [μm]  [+80% IMAGE HEIGHT POSITION]  [μm]
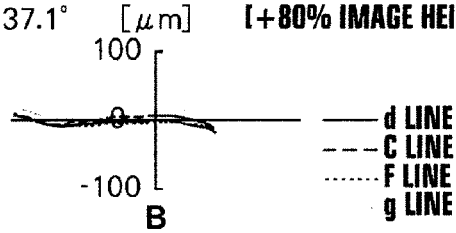 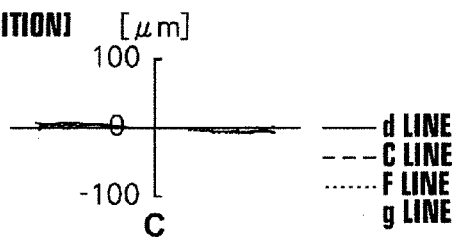
B     C
ω = 37.1°  [μm]  [−80% IMAGE HEIGHT POSITION]  [μm]
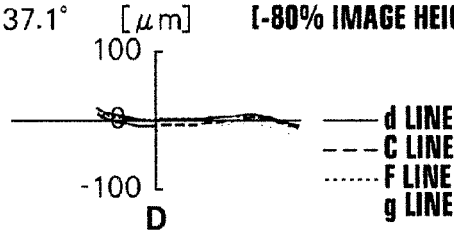 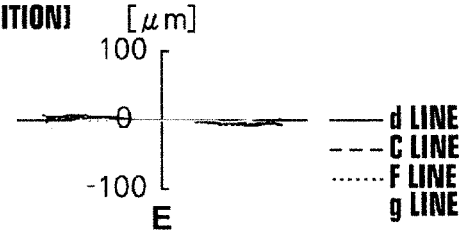
D     E
[WITH 0.3° CAMERA SHAKE CORRECTION]
ω = 0.3°  [μm]  [CENTRAL POSITION]
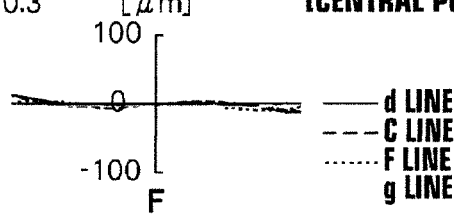
F
ω = 37.4°  [μm]  [+80% IMAGE HEIGHT POSITION]  [μm]
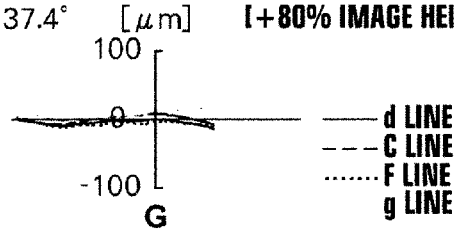 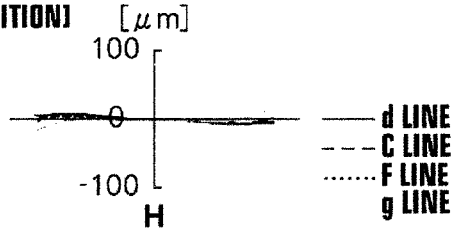
G     H
ω = 36.8°  [μm]  [−80% IMAGE HEIGHT POSITION]  [μm]
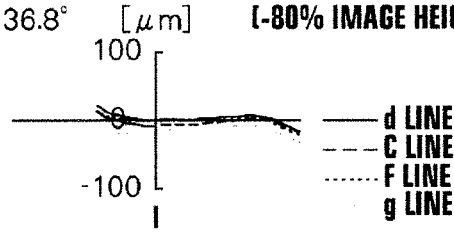 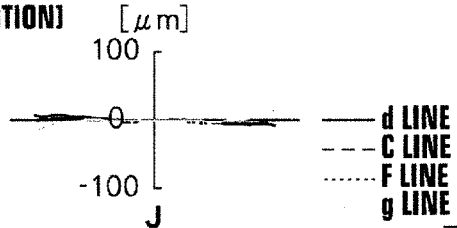
I     J

FIG.30
EXAMPLE 3
INTERMEDIATE
[WITHOUT CAMERA SHAKE CORRECTION]
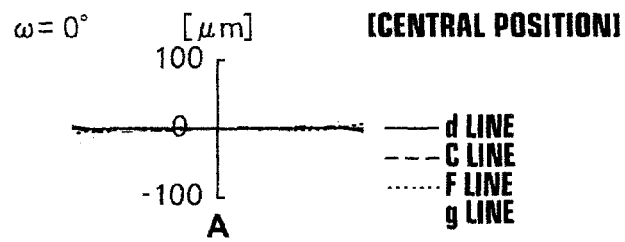
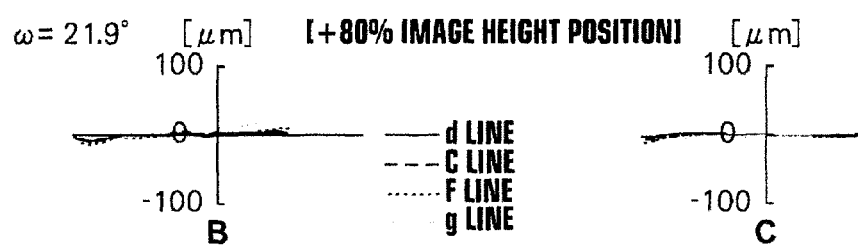 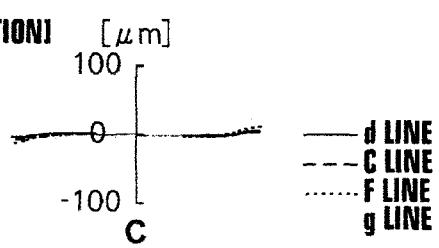
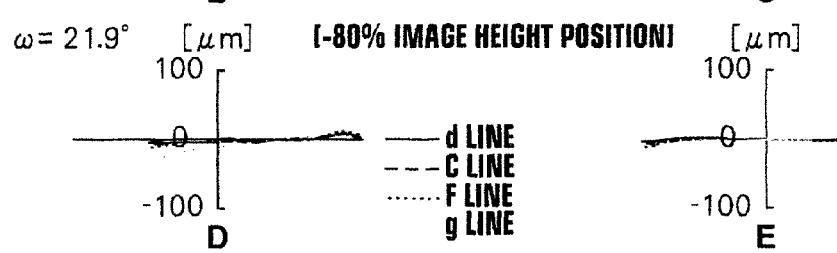 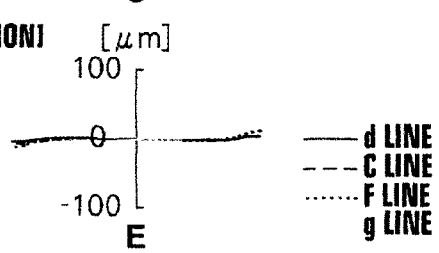
[WITH 0.3° CAMERA SHAKE CORRECTION]
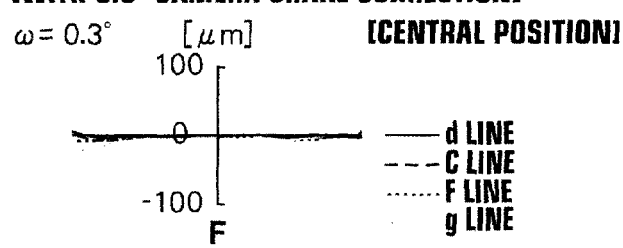
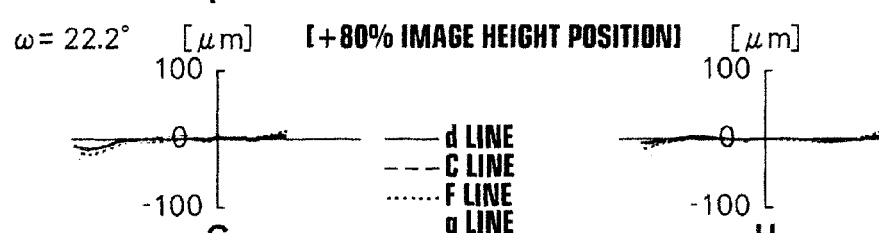 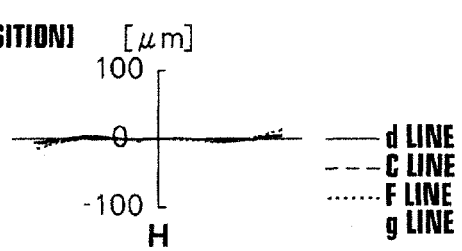
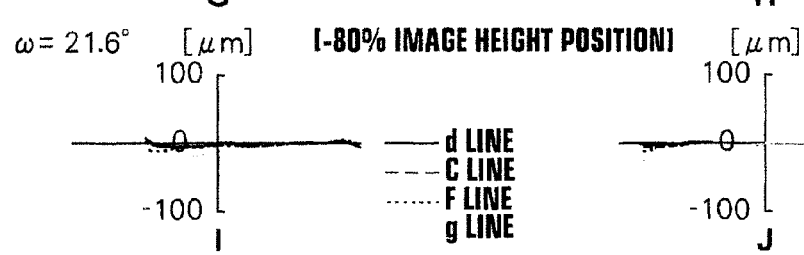 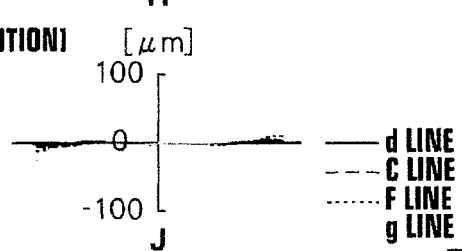

FIG.31
TELEPHOTO END     <u>EXAMPLE 3</u>
[WITHOUT CAMERA SHAKE CORRECTION]
$\omega = 0°$    [µm]    [CENTRAL POSITION]
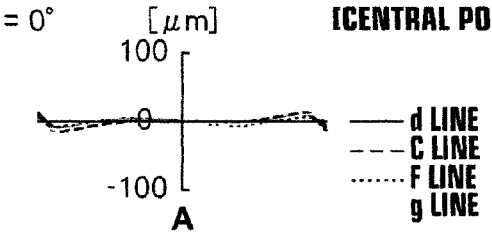
A
$\omega = 13.2°$    [µm]    [+80% IMAGE HEIGHT POSITION]    [µm]
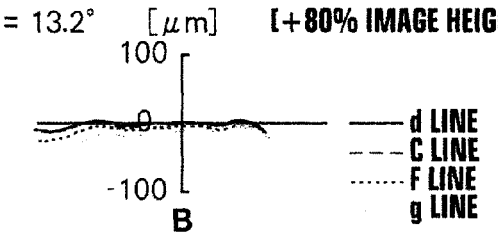 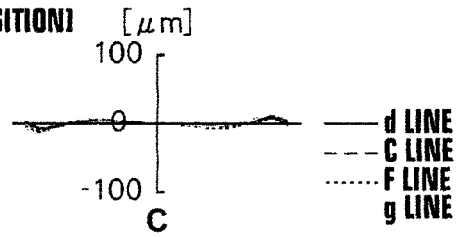
B                           C
$\omega = 13.2°$    [µm]    [-80% IMAGE HEIGHT POSITION]    [µm]
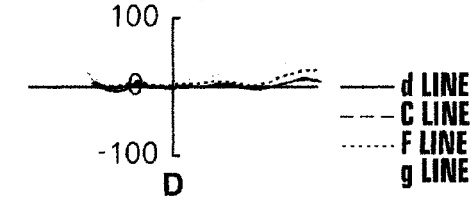 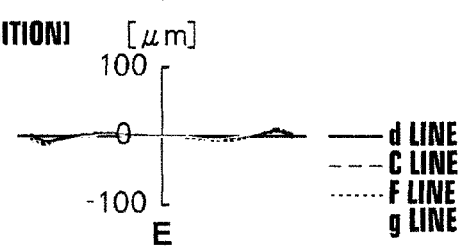
D                           E
[WITH 0.3° CAMERA SHAKE CORRECTION]
$\omega = 0.3°$    [µm]    [CENTRAL POSITION]
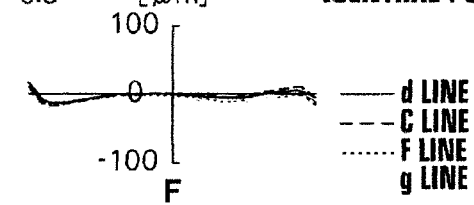
F
$\omega = 13.5°$    [µm]    [+80% IMAGE HEIGHT POSITION]    [µm]
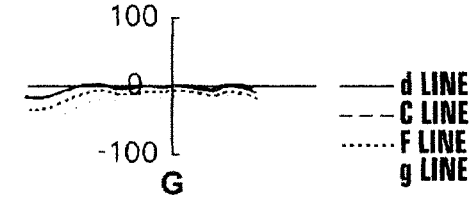 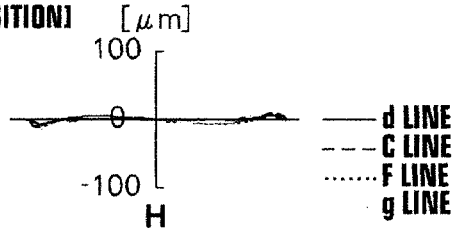
G                           H
$\omega = 12.9°$    [µm]    [-80% IMAGE HEIGHT POSITION]    [µm]
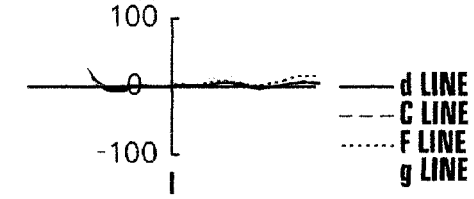 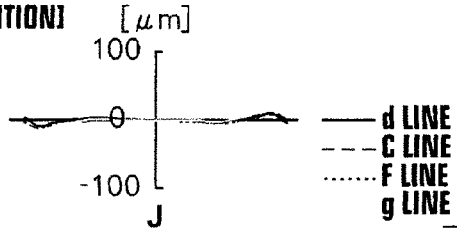
I                           J

FIG.32
EXAMPLE 4
WIDE ANGLE END
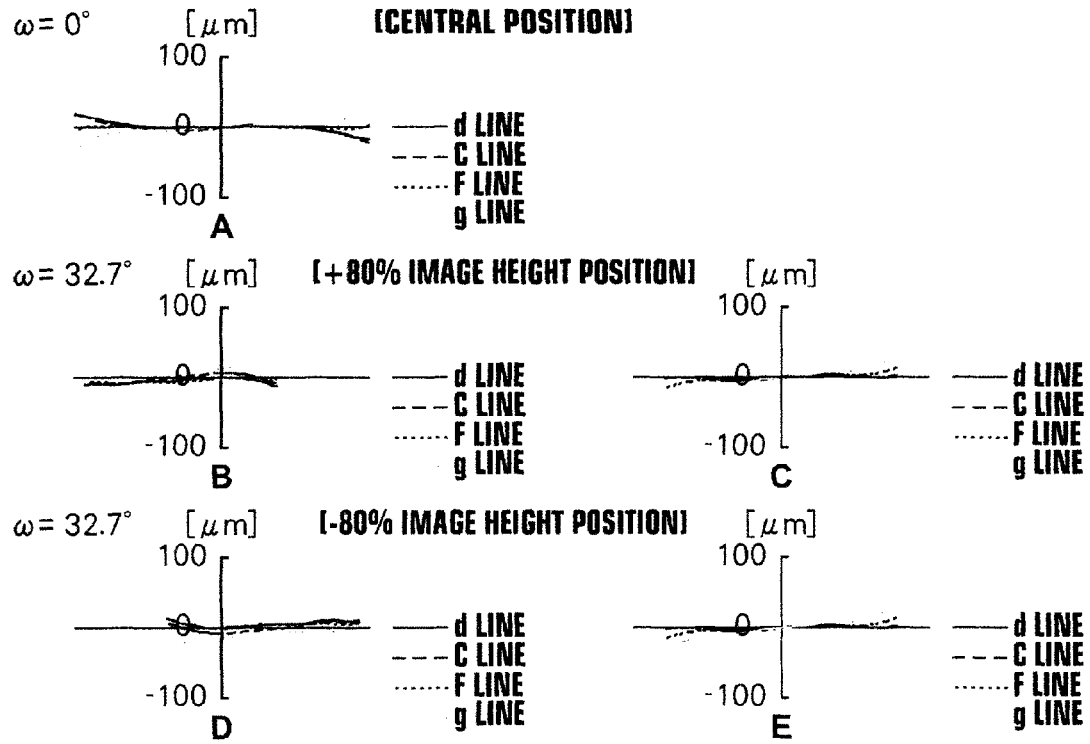
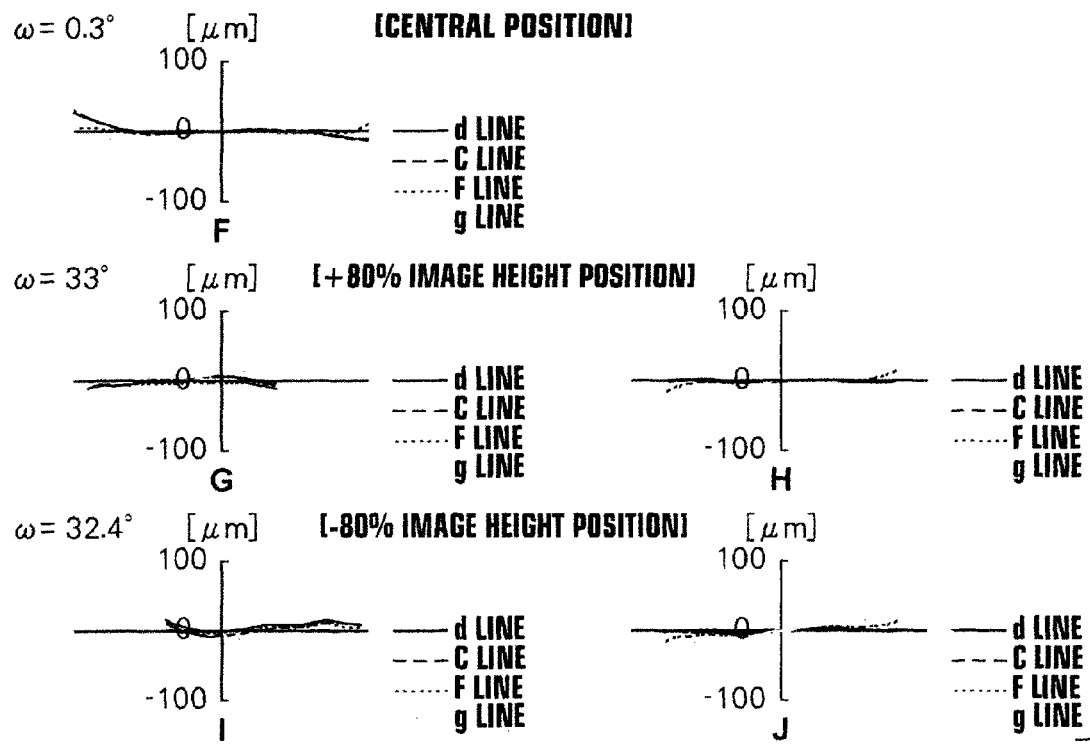

FIG.33
INTERMEDIATE  EXAMPLE 4
[WITHOUT CAMERA SHAKE CORRECTION]
$\omega = 0°$  [CENTRAL POSITION]
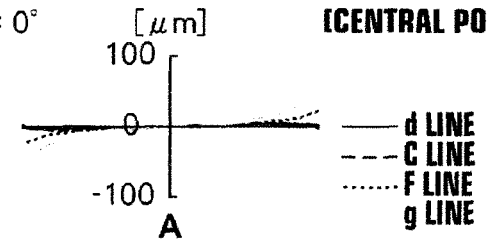
A
$\omega = 19.4°$  [+80% IMAGE HEIGHT POSITION]
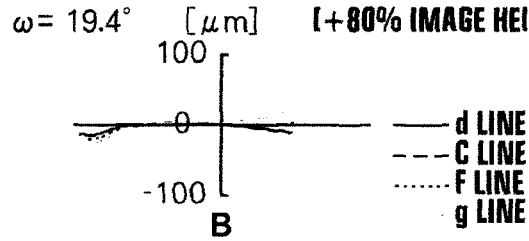 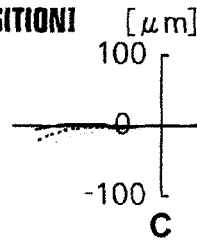
B  C
$\omega = 19.4°$  [-80% IMAGE HEIGHT POSITION]
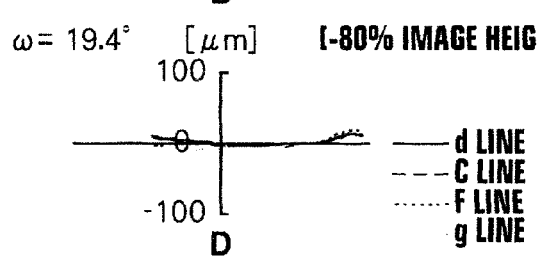 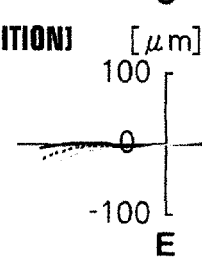
D  E
[WITH 0.3° CAMERA SHAKE CORRECTION]
$\omega = 0.3°$  [CENTRAL POSITION]
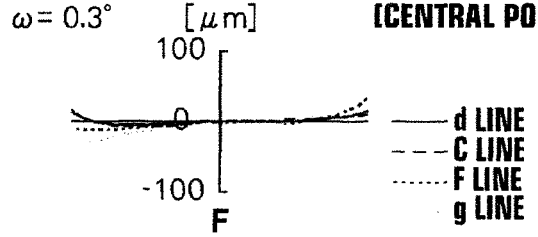
F
$\omega = 19.7°$  [+80% IMAGE HEIGHT POSITION]
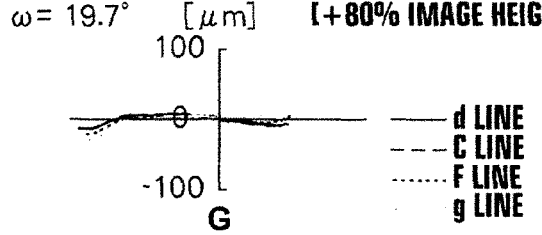 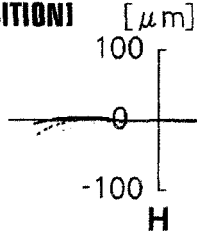
G  H
$\omega = 19.1°$  [-80% IMAGE HEIGHT POSITION]
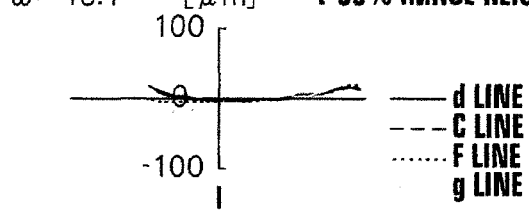 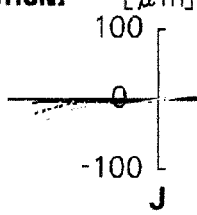
I  J

FIG.34
TELEPHOTO END      <u>EXAMPLE 4</u>
[WITHOUT CAMERA SHAKE CORRECTION]
$\omega = 0°$   [μm]     [CENTRAL POSITION]
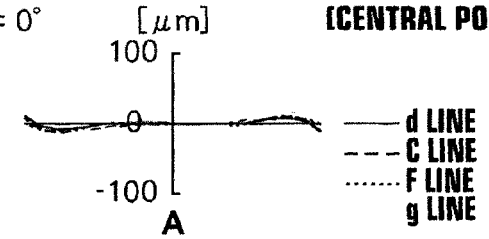
A
$\omega = 11.6°$   [μm]    [+80% IMAGE HEIGHT POSITION]   [μm]
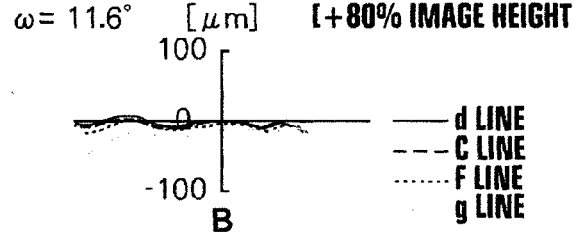 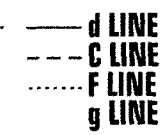
B                  C
$\omega = 11.6°$   [μm]    [-80% IMAGE HEIGHT POSITION]   [μm]
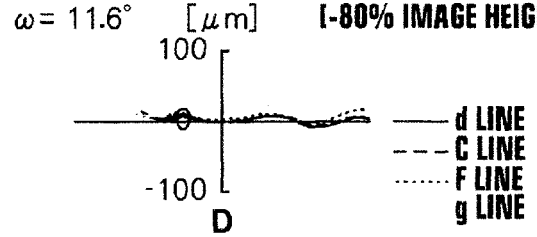 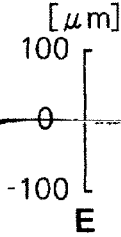
D                  E
[WITH 0.3° CAMERA SHAKE CORRECTION]
$\omega = 0.3°$   [μm]     [CENTRAL POSITION]
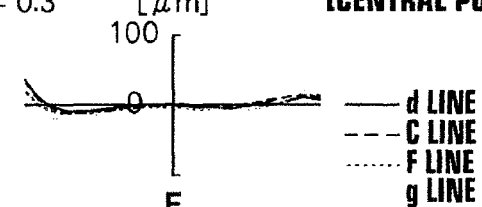
F
$\omega = 11.9°$   [μm]    [+80% IMAGE HEIGHT POSITION]   [μm]
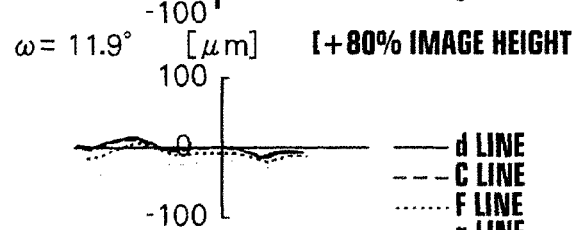 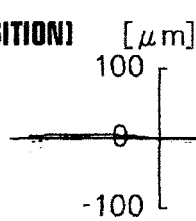
G                  H
$\omega = 11.3°$   [μm]    [-80% IMAGE HEIGHT POSITION]   [μm]
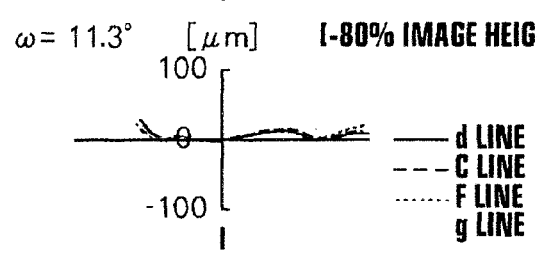 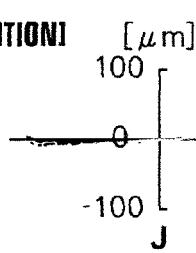
I                  J

FIG.35
WIDE ANGLE END  EXAMPLE 5
[WITHOUT CAMERA SHAKE CORRECTION]
ω= 0°  [μm]  [CENTRAL POSITION]
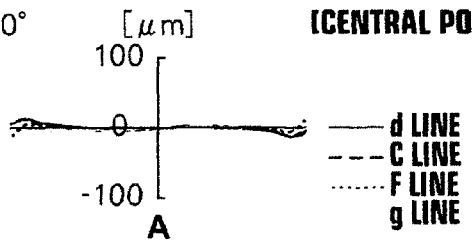
A
ω= 33.3°  [μm]  [+80% IMAGE HEIGHT POSITION]  [μm]
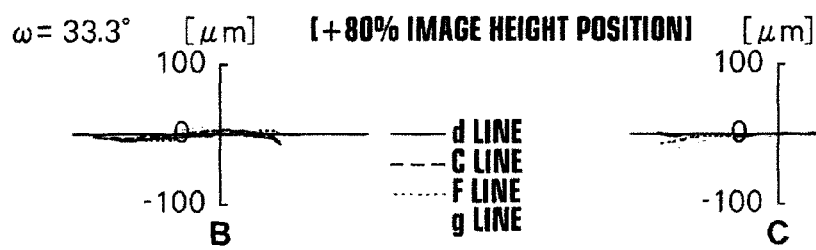 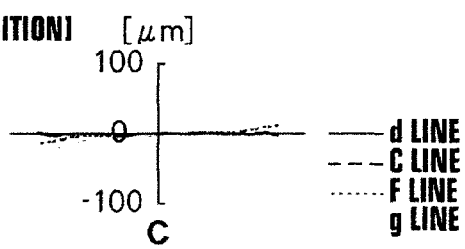
B  C
ω= 33.3°  [μm]  [-80% IMAGE HEIGHT POSITION]  [μm]
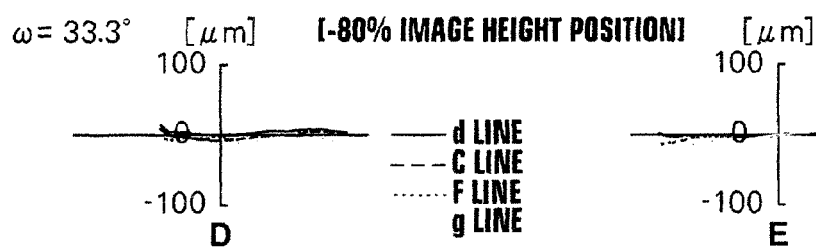 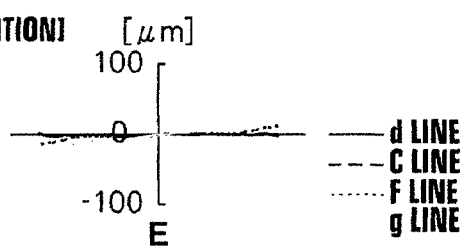
D  E
[WITH 0.3° CAMERA SHAKE CORRECTION]
ω= 0.3°  [μm]  [CENTRAL POSITION]
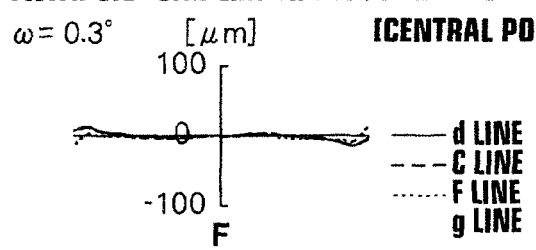
F
ω= 33.6°  [μm]  [+80% IMAGE HEIGHT POSITION]  [μm]
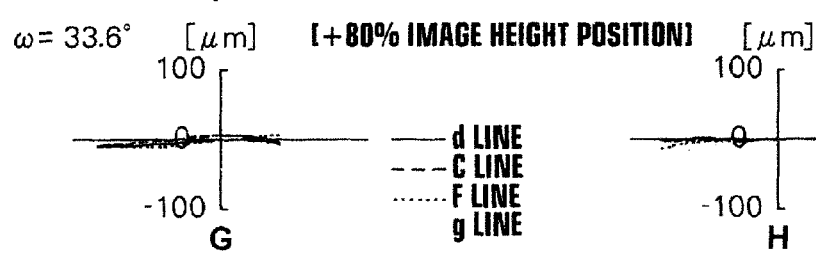 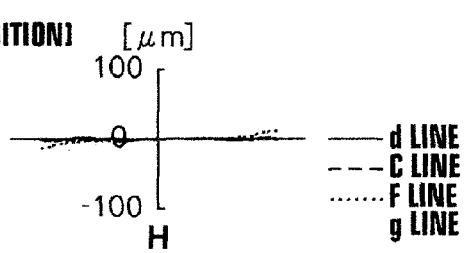
G  H
ω= 33°  [μm]  [-80% IMAGE HEIGHT POSITION]  [μm]
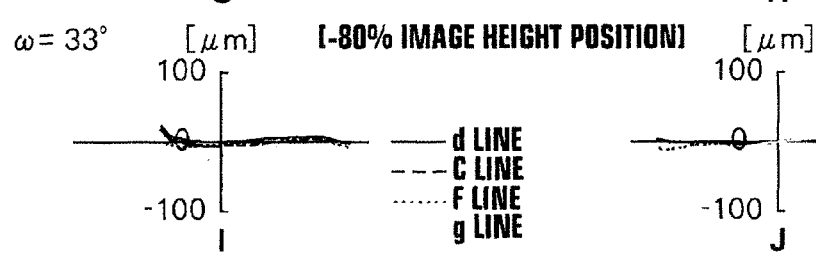 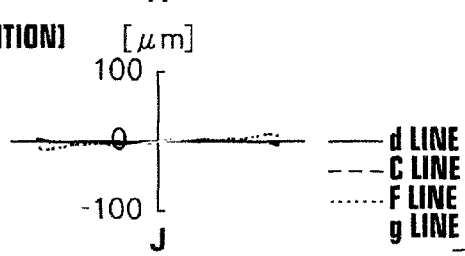
I  J

FIG.36
EXAMPLE 5
INTERMEDIATE
[WITHOUT CAMERA SHAKE CORRECTION]
[CENTRAL POSITION]
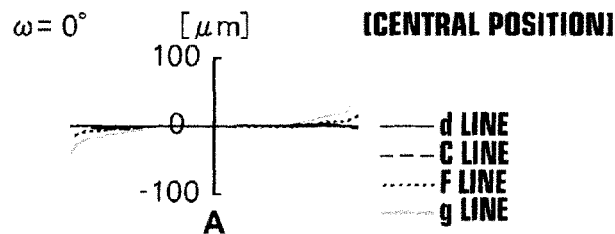
A — ω=0° [μm]
[+80% IMAGE HEIGHT POSITION]
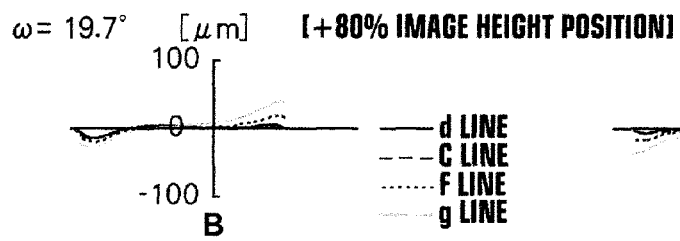
B — ω=19.7° [μm]
[-80% IMAGE HEIGHT POSITION]
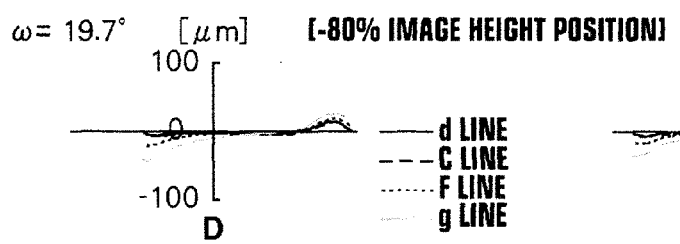
D — ω=19.7° [μm]
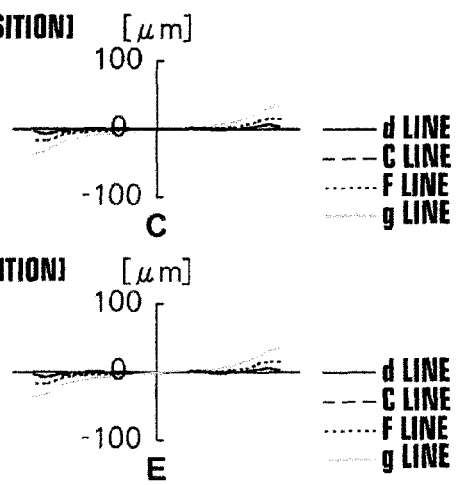
C, E
[WITH 0.3° CAMERA SHAKE CORRECTION]
[CENTRAL POSITION]
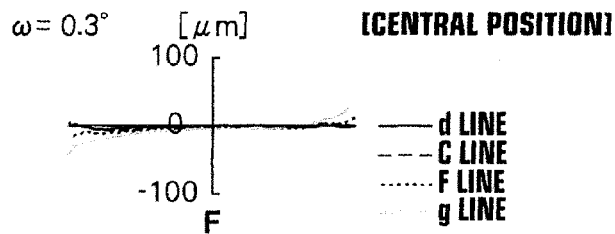
F — ω=0.3° [μm]
[+80% IMAGE HEIGHT POSITION]
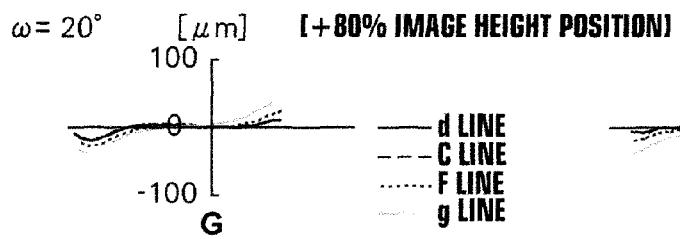
G — ω=20° [μm]
[-80% IMAGE HEIGHT POSITION]
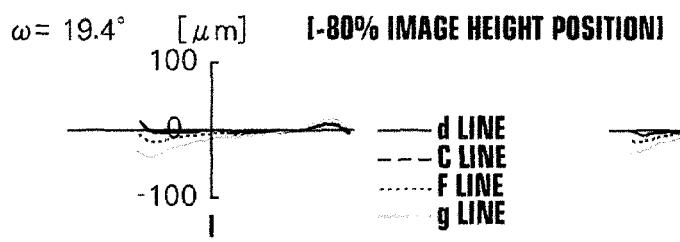
I — ω=19.4° [μm]
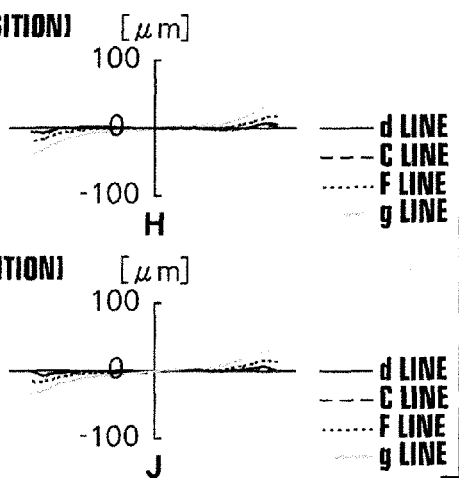
H, J

FIG.37
TELEPHOTO END     EXAMPLE 5
[WITHOUT CAMERA SHAKE CORRECTION]
$\omega = 0°$   [CENTRAL POSITION]
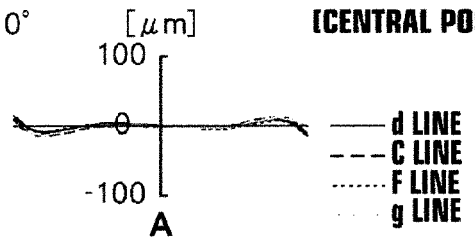
A
$\omega = 11.8°$   [+80% IMAGE HEIGHT POSITION]
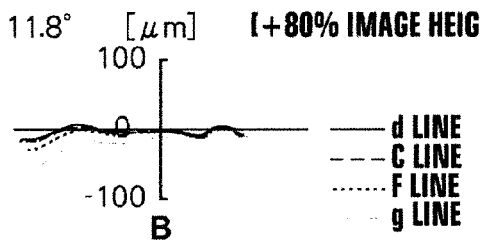 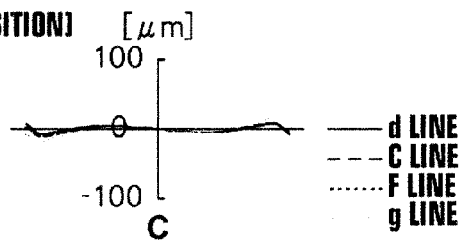
B          C
$\omega = 11.8°$   [-80% IMAGE HEIGHT POSITION]
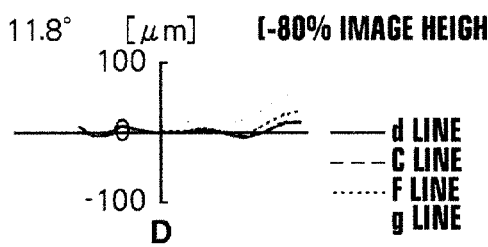 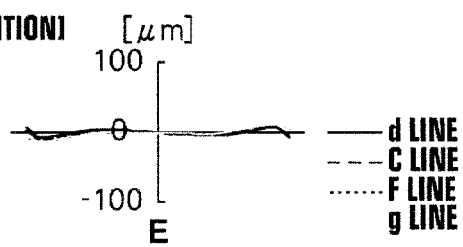
D          E
[WITH 0.3° CAMERA SHAKE CORRECTION]
$\omega = 0.3°$   [CENTRAL POSITION]
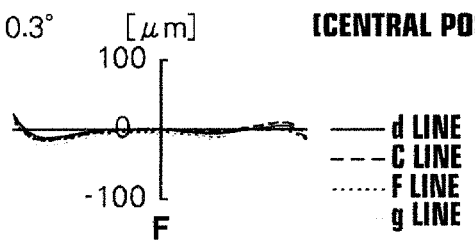
F
$\omega = 12.1°$   [+80% IMAGE HEIGHT POSITION]
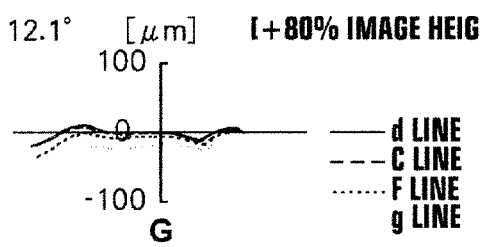 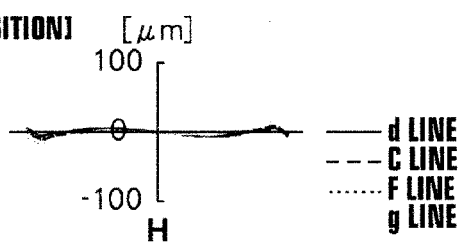
G          H
$\omega = 11.5°$   [-80% IMAGE HEIGHT POSITION]
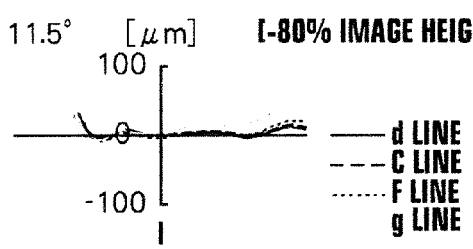 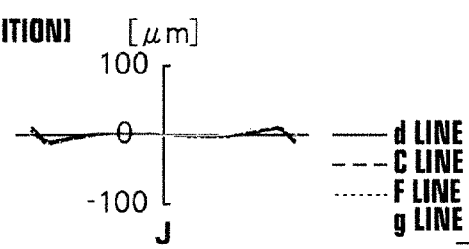
I          J

FIG.38
WIDE ANGLE END     EXAMPLE 6
[WITHOUT CAMERA SHAKE CORRECTION]
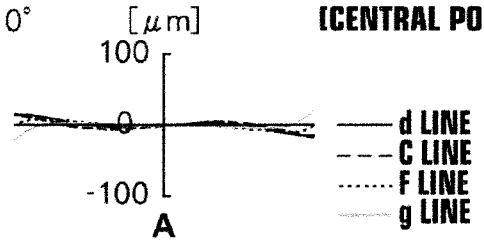
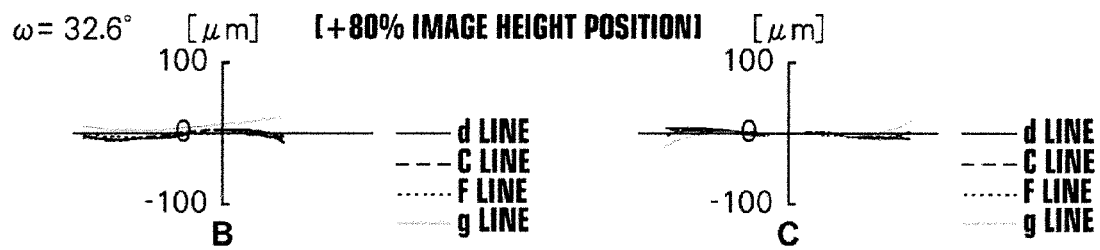
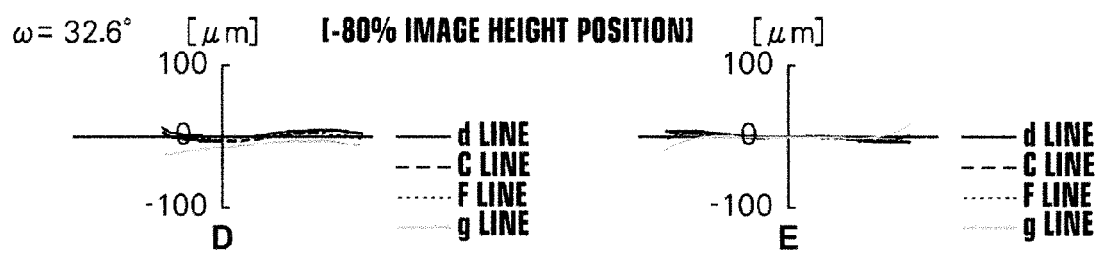
[WITH 0.3° CAMERA SHAKE CORRECTION]
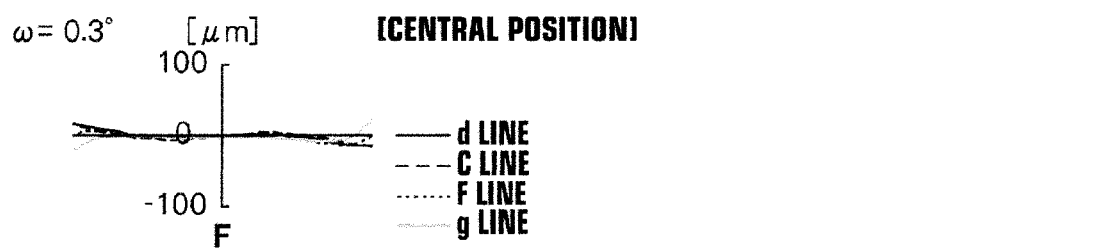
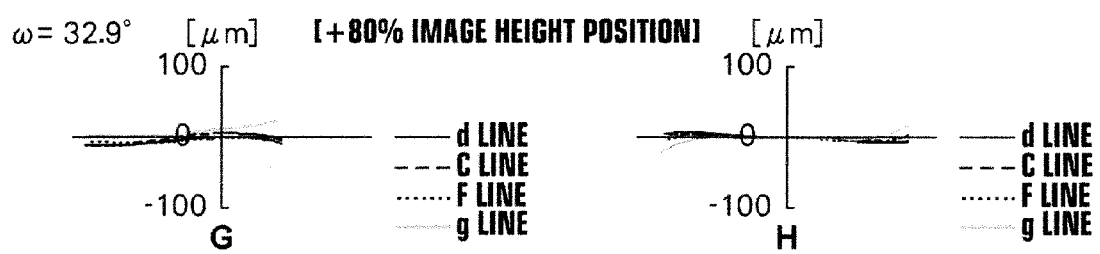
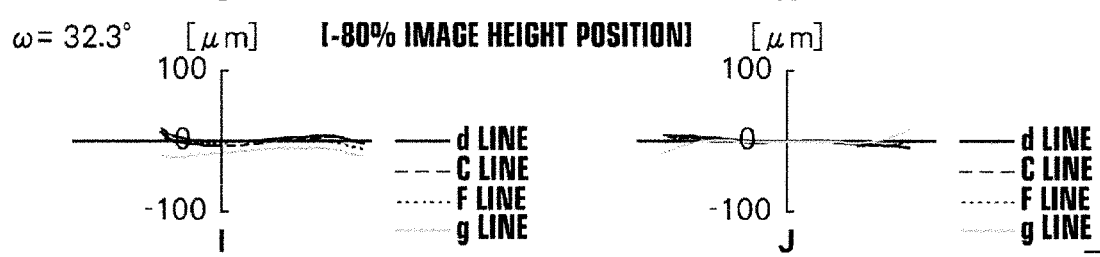

FIG.39
EXAMPLE 6
INTERMEDIATE
[WITHOUT CAMERA SHAKE CORRECTION]
ω = 0°   [CENTRAL POSITION]
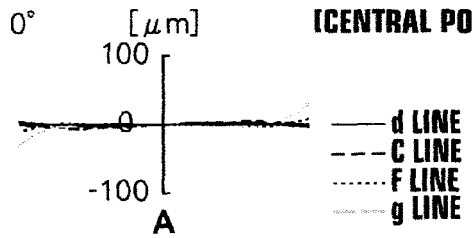
A
ω = 19.2°   [+80% IMAGE HEIGHT POSITION]
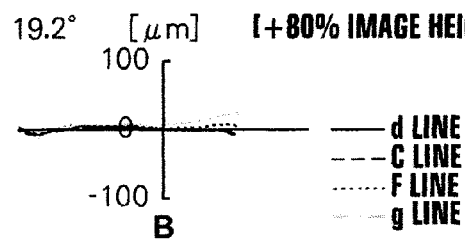
B
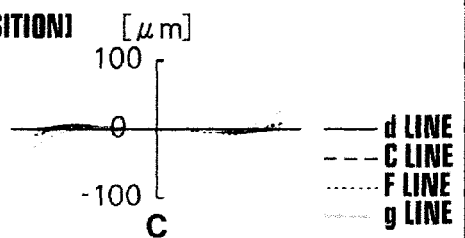
C
ω = 19.2°   [-80% IMAGE HEIGHT POSITION]
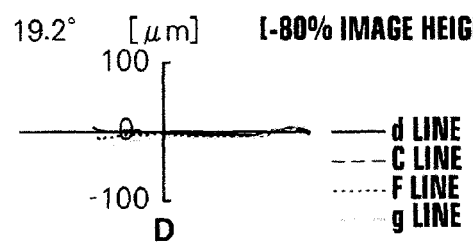
D
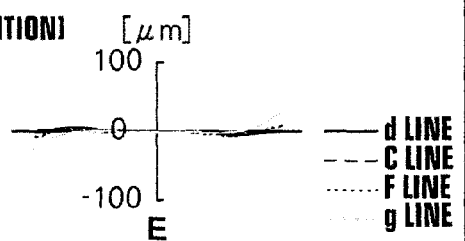
E
[WITH 0.3° CAMERA SHAKE CORRECTION]
ω = 0.3°   [CENTRAL POSITION]
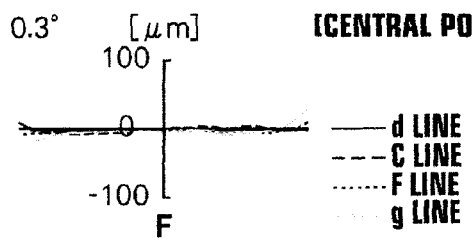
F
ω = 19.5°   [+80% IMAGE HEIGHT POSITION]
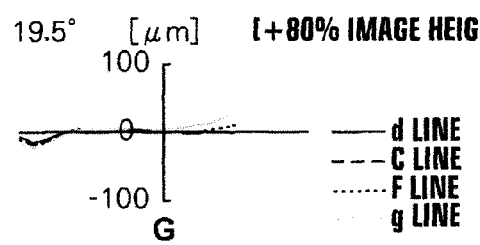
G
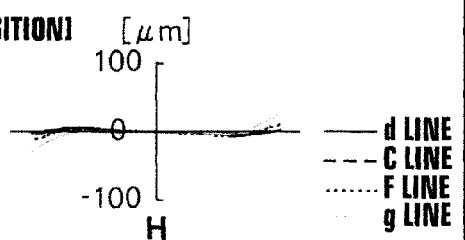
H
ω = 18.9°   [-80% IMAGE HEIGHT POSITION]
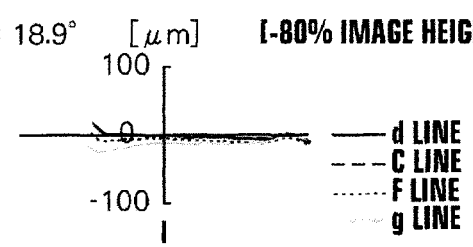
I
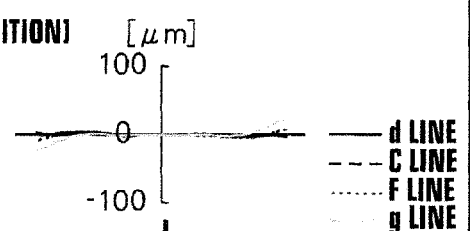
J

FIG.40
TELEPHOTO END     EXAMPLE 6
[WITHOUT CAMERA SHAKE CORRECTION]
ω = 0° [μm]    [CENTRAL POSITION]
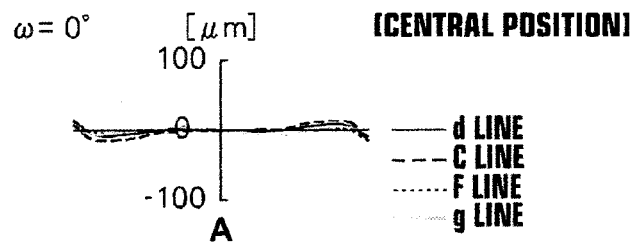
A
ω = 11.4° [μm]    [+80% IMAGE HEIGHT POSITION]    [μm]
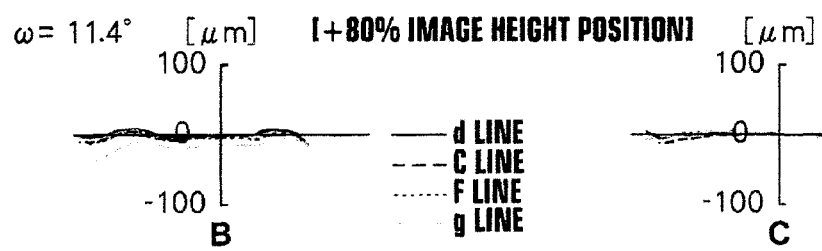
B
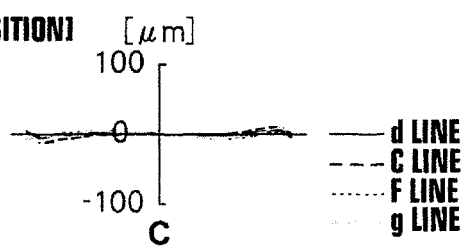
C
ω = 11.4° [μm]    [-80% IMAGE HEIGHT POSITION]    [μm]
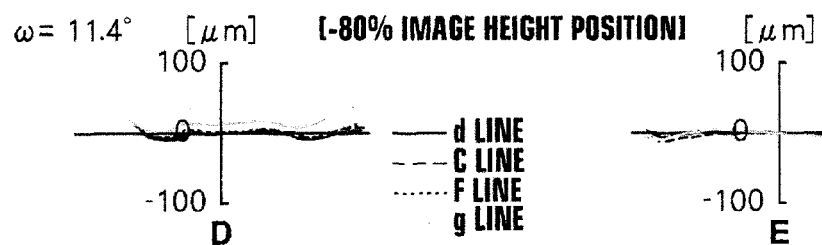
D
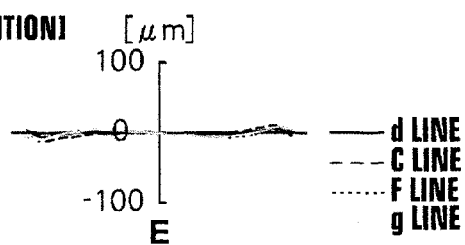
E
[WITH 0.3° CAMERA SHAKE CORRECTION]
ω = 0.3° [μm]    [CENTRAL POSITION]
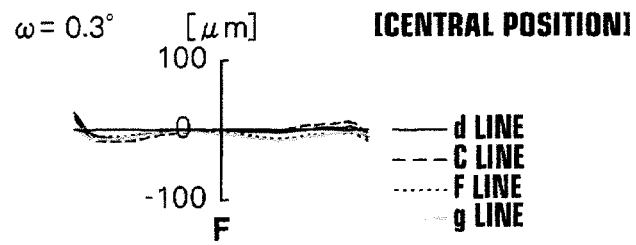
F
ω = 11.7° [μm]    [+80% IMAGE HEIGHT POSITION]    [μm]
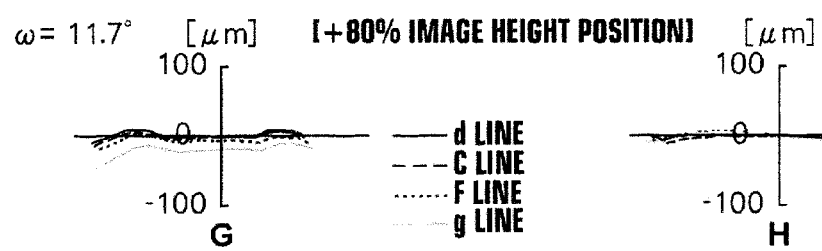
G
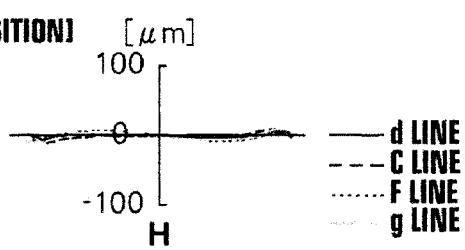
H
ω = 11.1° [μm]    [-80% IMAGE HEIGHT POSITION]    [μm]
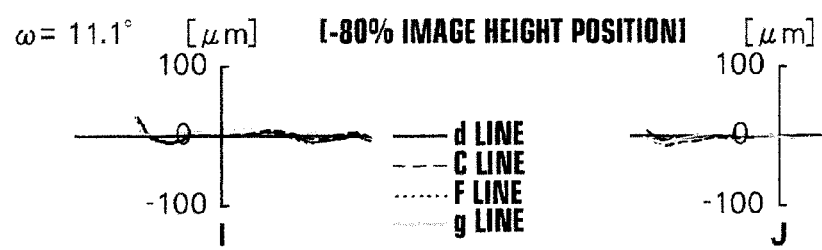
I
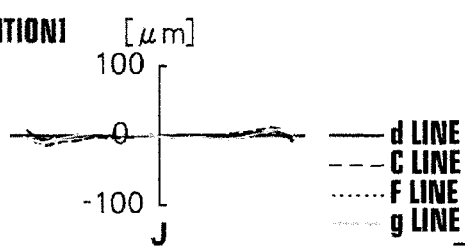
J

FIG.41
EXAMPLE 7
WIDE ANGLE END
[WITHOUT CAMERA SHAKE CORRECTION]
ω = 0°  [μm]  [CENTRAL POSITION]
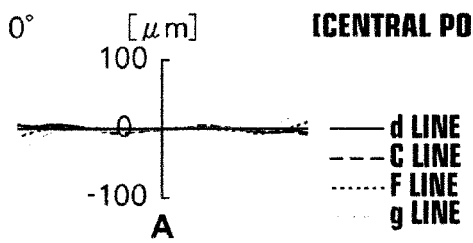
A
ω = 33.9°  [μm]  [+80% IMAGE HEIGHT POSITION]  [μm]
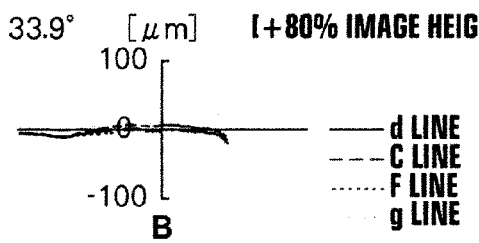 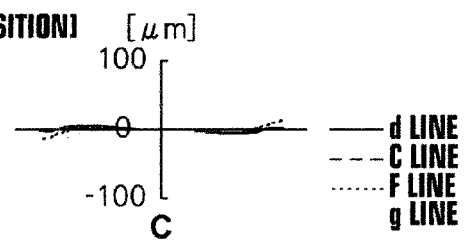
B  C
ω = 33.9°  [μm]  [-80% IMAGE HEIGHT POSITION]  [μm]
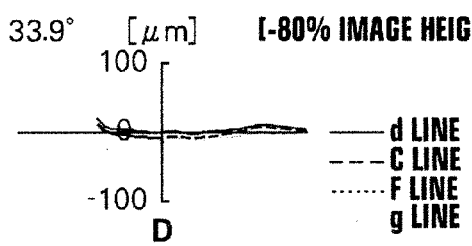 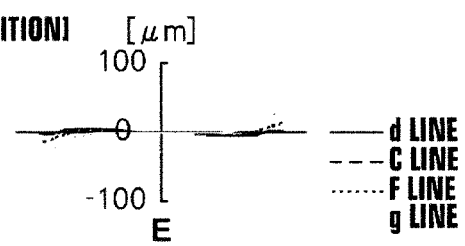
D  E
[WITH 0.3° CAMERA SHAKE CORRECTION]
ω = 0.3°  [μm]  [CENTRAL POSITION]
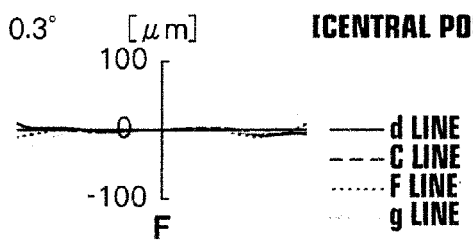
F
ω = 34.2°  [μm]  [+80% IMAGE HEIGHT POSITION]  [μm]
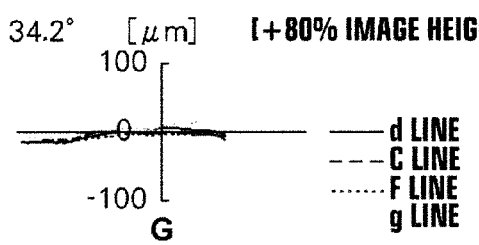 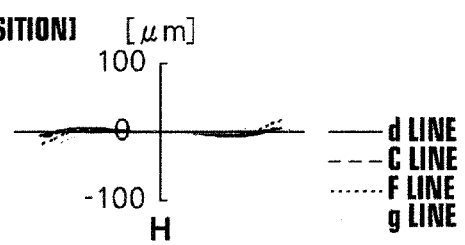
G  H
ω = 33.6°  [μm]  [-80% IMAGE HEIGHT POSITION]  [μm]
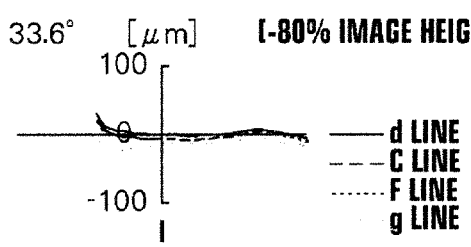 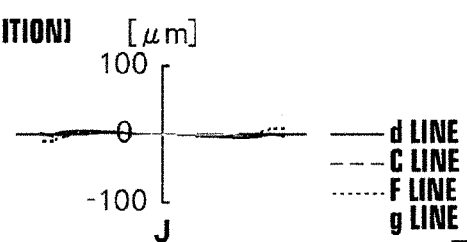
I  J

FIG.42
EXAMPLE 7
INTERMEDIATE
[WITHOUT CAMERA SHAKE CORRECTION]
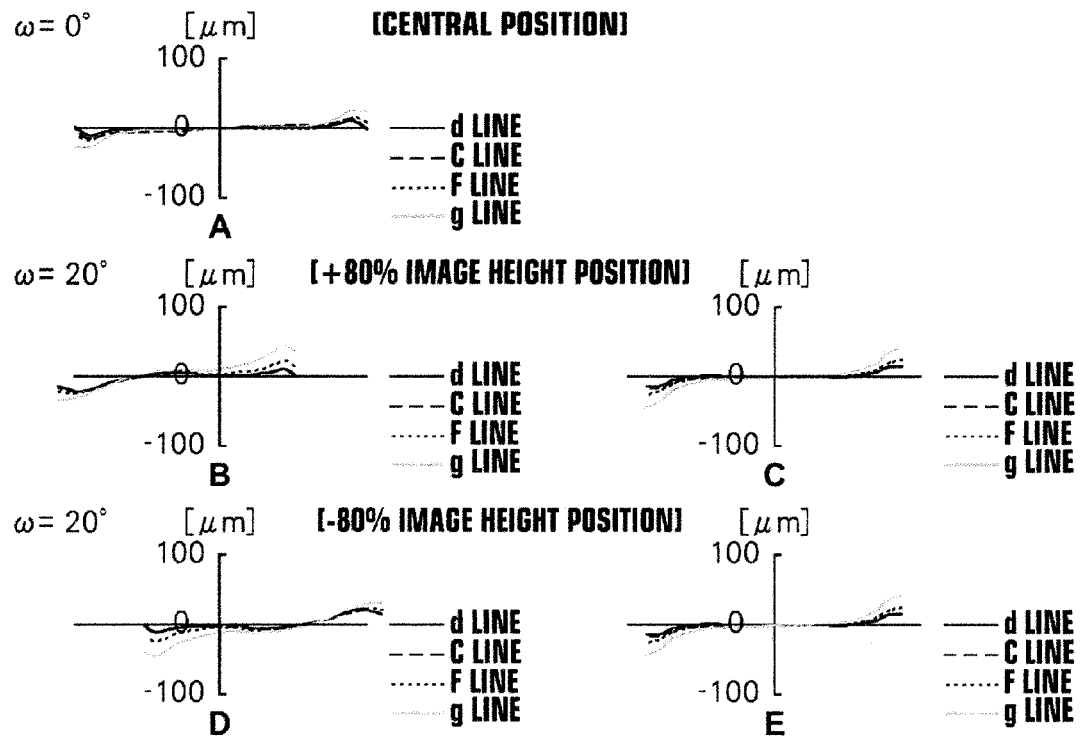
[WITH 0.3° CAMERA SHAKE CORRECTION]
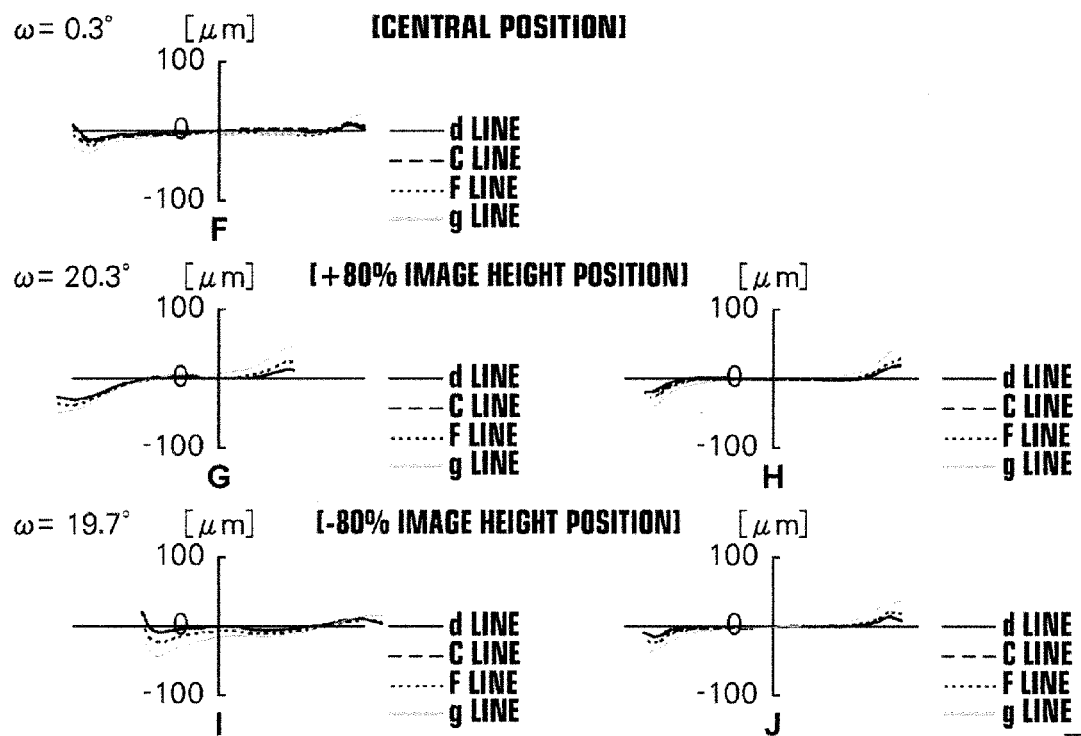

FIG.43
TELEPHOTO END     <u>EXAMPLE 7</u>
[WITHOUT CAMERA SHAKE CORRECTION]
ω = 0°  [μm]  [CENTRAL POSITION]
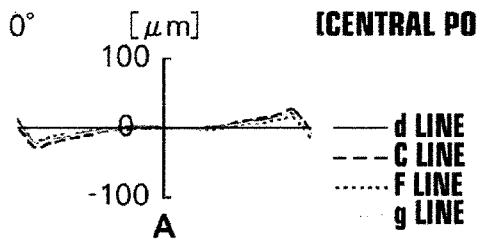
A
ω = 11.9°  [μm]  [+80% IMAGE HEIGHT POSITION]  [μm]
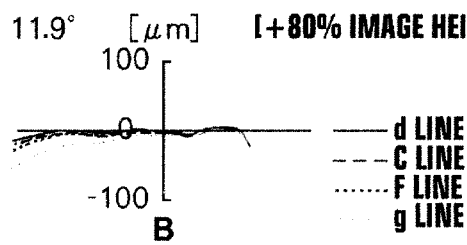 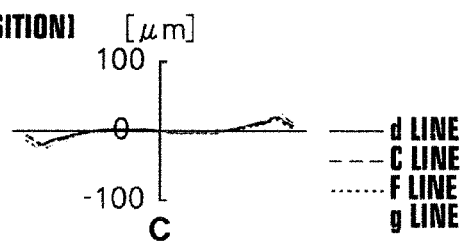
B        C
ω = 11.9°  [μm]  [-80% IMAGE HEIGHT POSITION]  [μm]
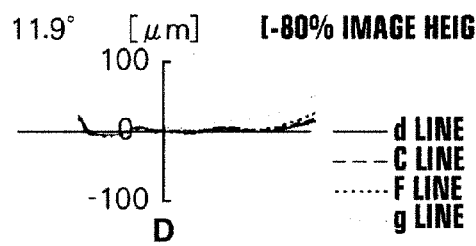 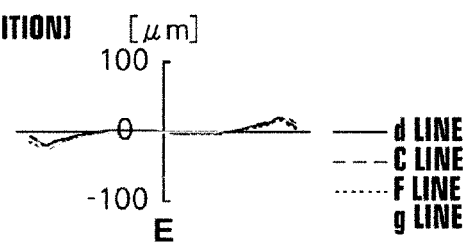
D        E
[WITH 0.3° CAMERA SHAKE CORRECTION]
ω = 0.3°  [μm]  [CENTRAL POSITION]
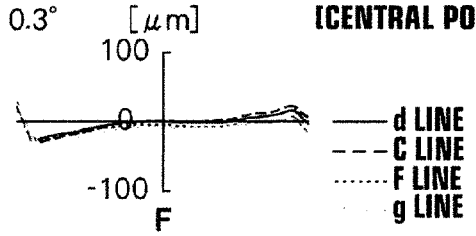
F
ω = 12.2°  [μm]  [+80% IMAGE HEIGHT POSITION]  [μm]
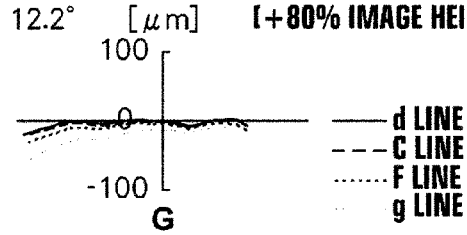 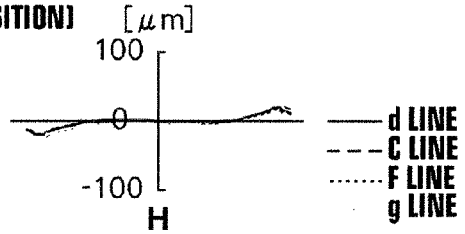
G        H
ω = 11.6°  [μm]  [-80% IMAGE HEIGHT POSITION]  [μm]
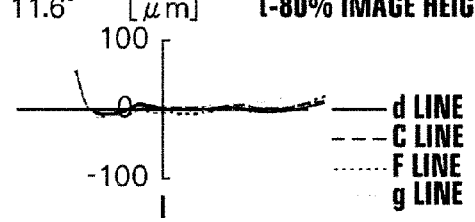 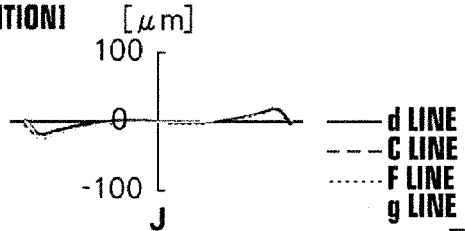
I        J

FIG.44
EXAMPLE 8
WIDE ANGLE END
[WITHOUT CAMERA SHAKE CORRECTION]
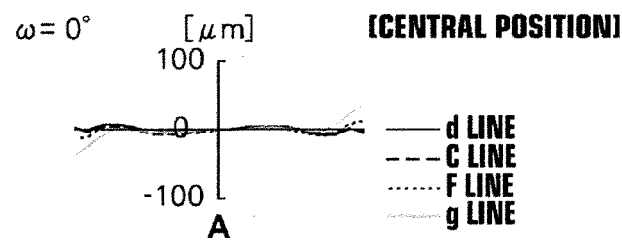
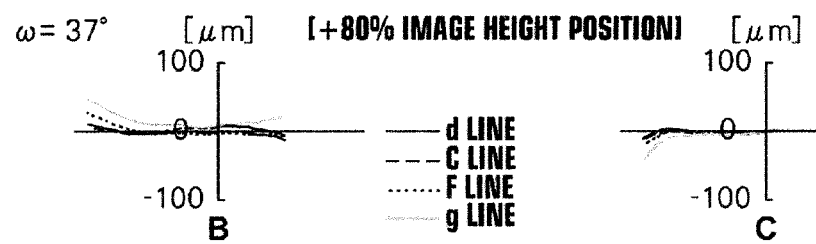
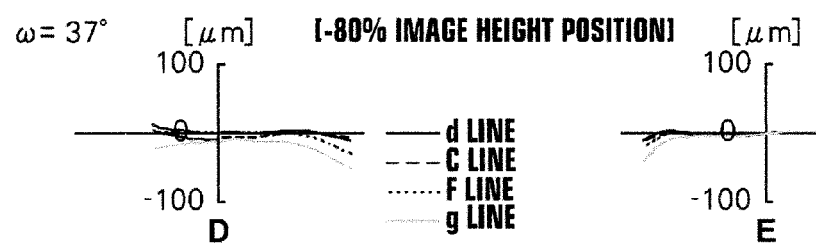
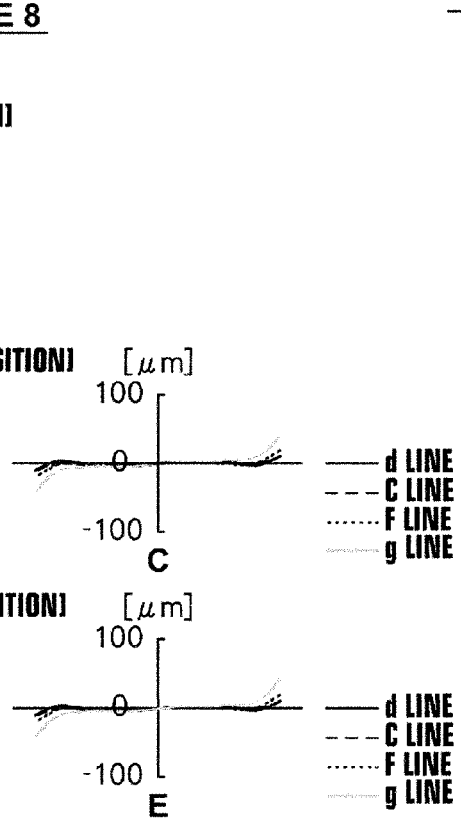
[WITH 0.3° CAMERA SHAKE CORRECTION]
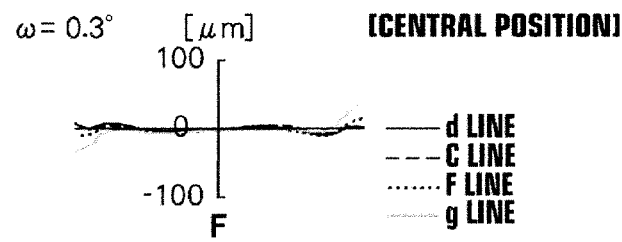
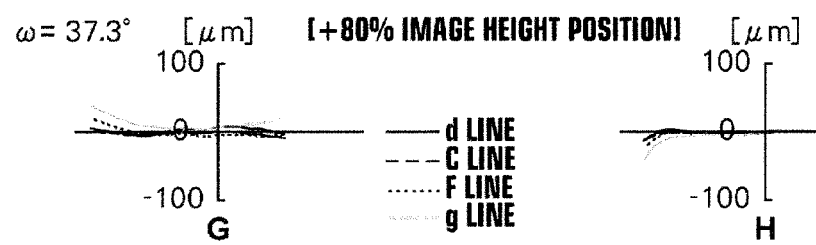
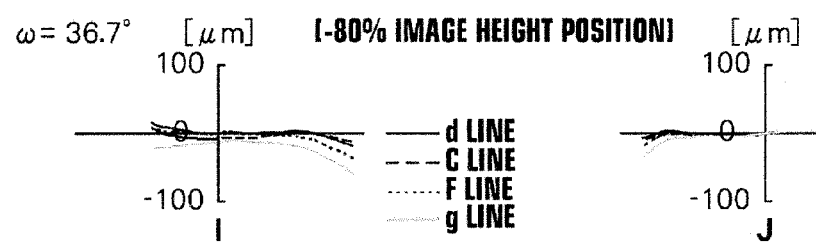
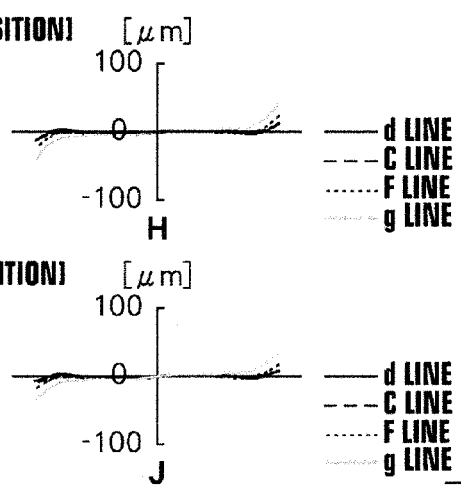

FIG.45
INTERMEDIATE        <u>EXAMPLE 8</u>
[WITHOUT CAMERA SHAKE CORRECTION]
ω = 0°  [μm]  [CENTRAL POSITION]
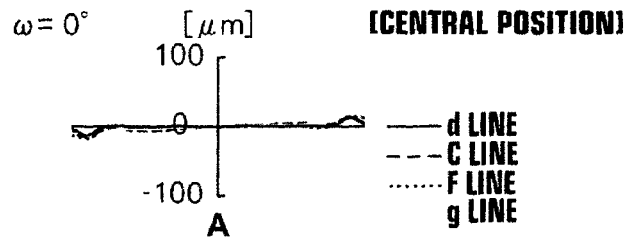
A
ω = 22.2°  [μm]  [+80% IMAGE HEIGHT POSITION]  [μm]
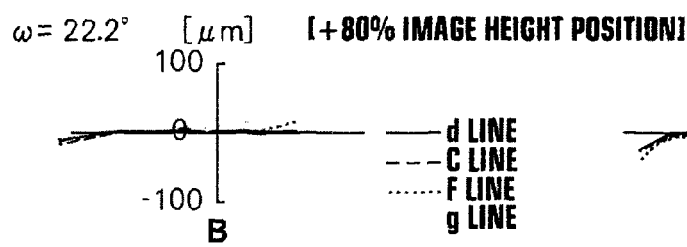 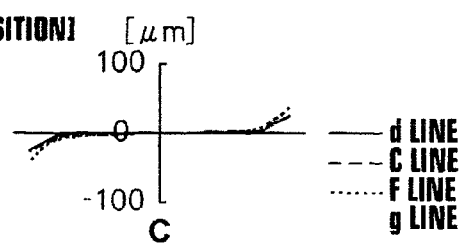
B      C
ω = 22.2°  [μm]  [-80% IMAGE HEIGHT POSITION]  [μm]
 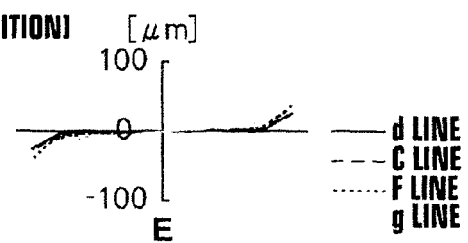
D      E
[WITH 0.3° CAMERA SHAKE CORRECTION]
ω = 0.3°  [μm]  [CENTRAL POSITION]
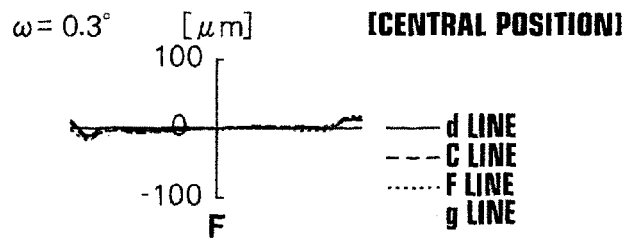
F
ω = 22.5°  [μm]  [+80% IMAGE HEIGHT POSITION]  [μm]
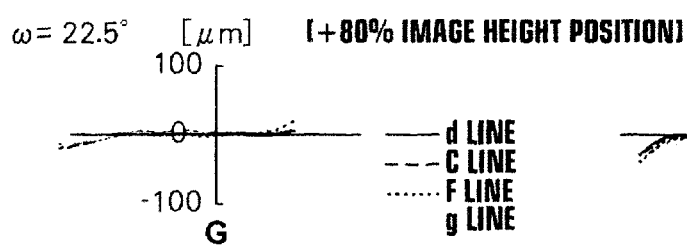 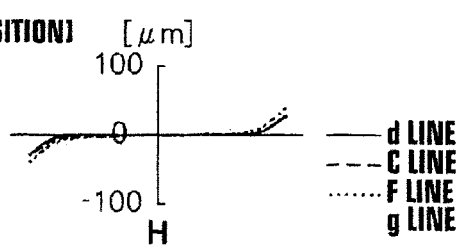
G      H
ω = 21.9°  [μm]  [-80% IMAGE HEIGHT POSITION]  [μm]
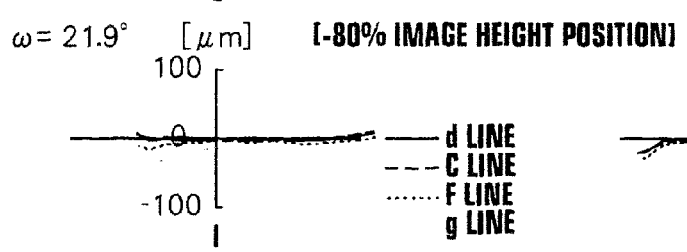 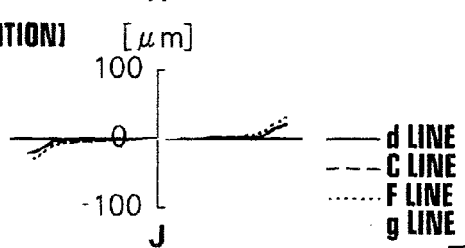
I      J

FIG.46
TELEPHOTO END     EXAMPLE 8
[WITHOUT CAMERA SHAKE CORRECTION]
$\omega = 0°$    [μm]    [CENTRAL POSITION]
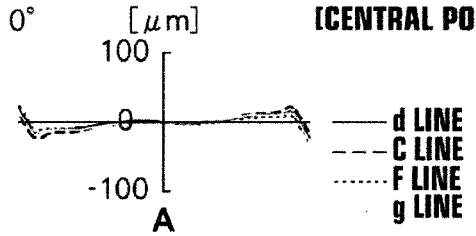
A
$\omega = 13.3°$   [μm]   [+80% IMAGE HEIGHT POSITION]   [μm]
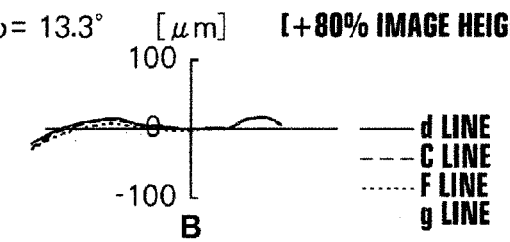 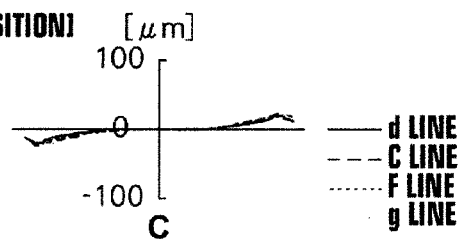
B                  C
$\omega = 13.3°$   [μm]   [-80% IMAGE HEIGHT POSITION]   [μm]
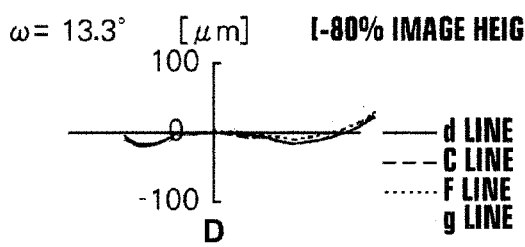 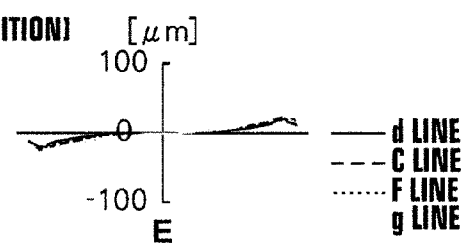
D                  E
[WITH 0.3° CAMERA SHAKE CORRECTION]
$\omega = 0.3°$   [μm]    [CENTRAL POSITION]
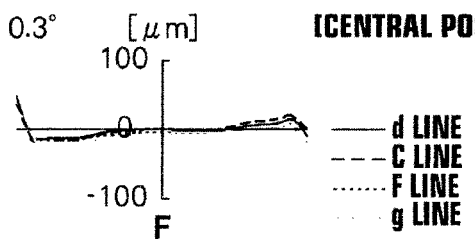
F
$\omega = 13.6°$   [μm]   [+80% IMAGE HEIGHT POSITION]   [μm]
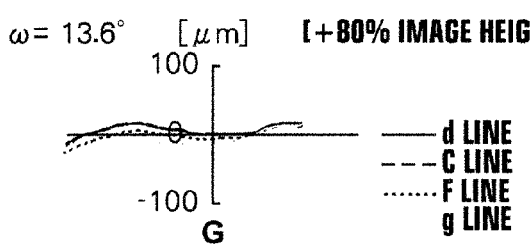 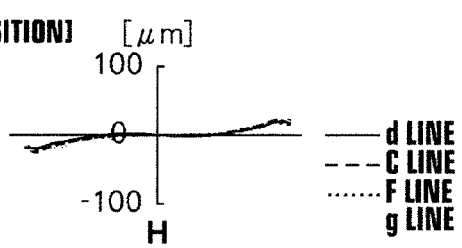
G                  H
$\omega = 13°$   [μm]   [-80% IMAGE HEIGHT POSITION]   [μm]
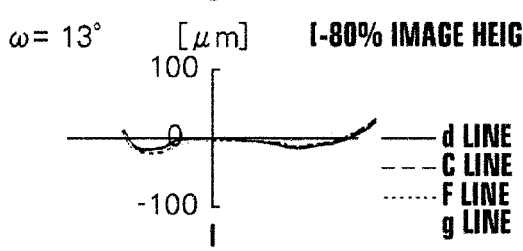 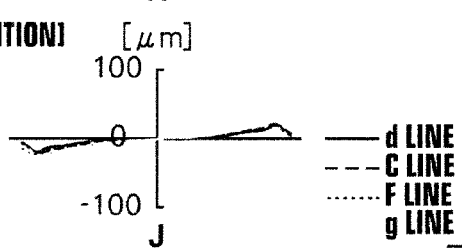
I                  J

FIG.47
WIDE ANGLE END      EXAMPLE 9
[WITHOUT CAMERA SHAKE CORRECTION]
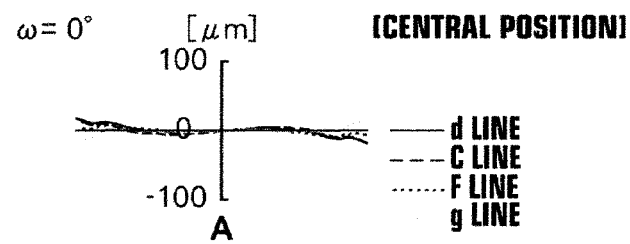
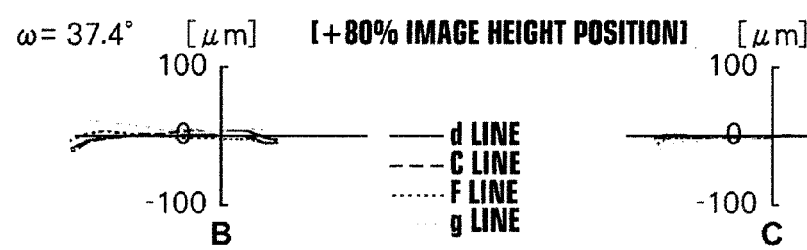 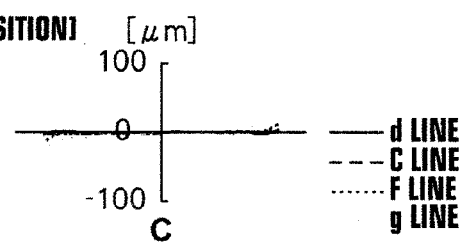
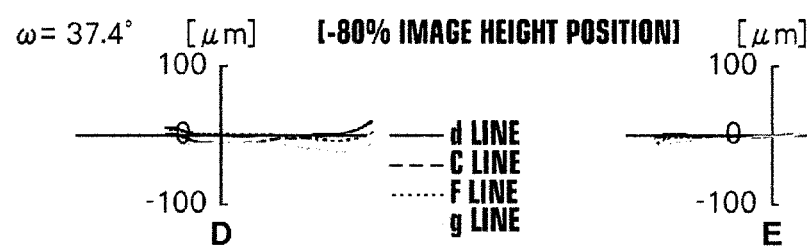 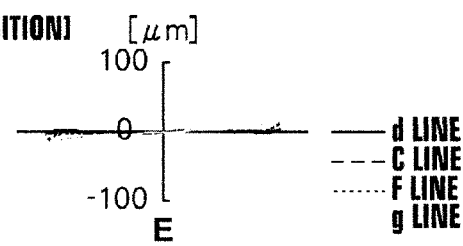
[WITH 0.3° CAMERA SHAKE CORRECTION]
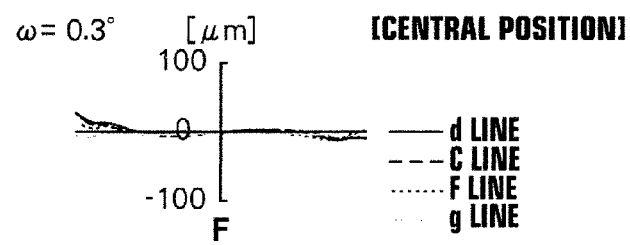
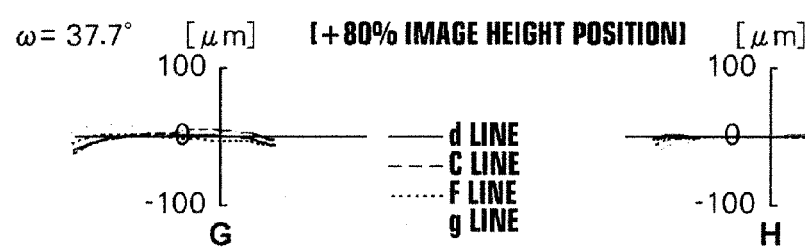 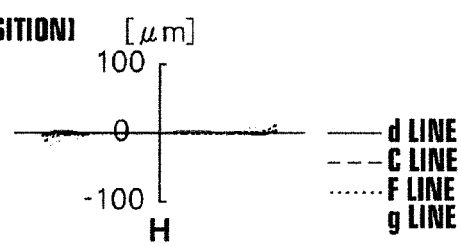
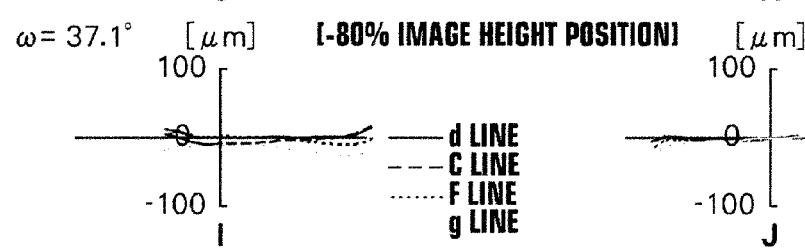 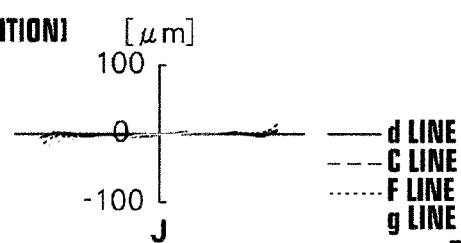

FIG.48
INTERMEDIATE     <u>EXAMPLE 9</u>
[WITHOUT CAMERA SHAKE CORRECTION]
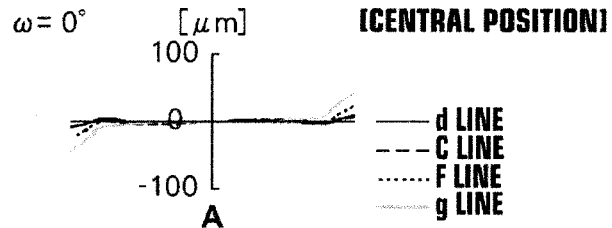
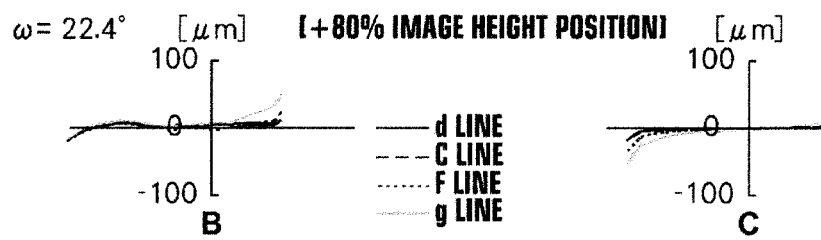
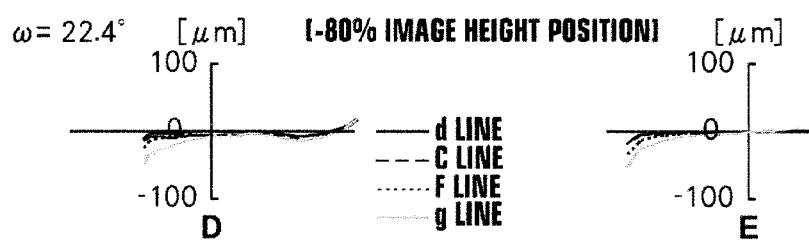
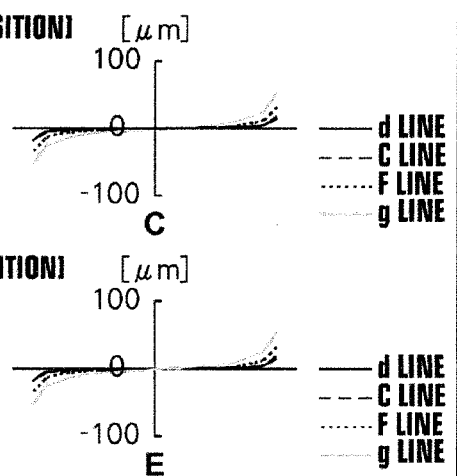
[WITH 0.3° CAMERA SHAKE CORRECTION]
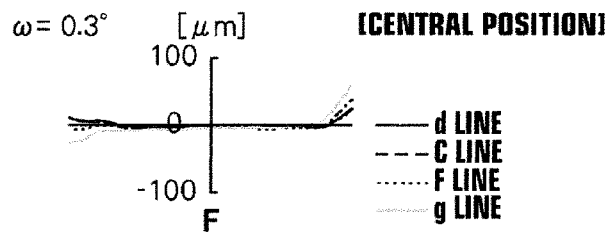
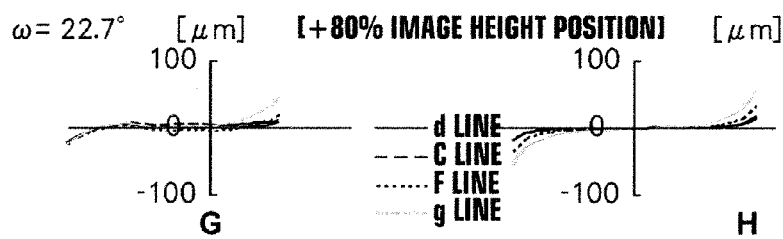
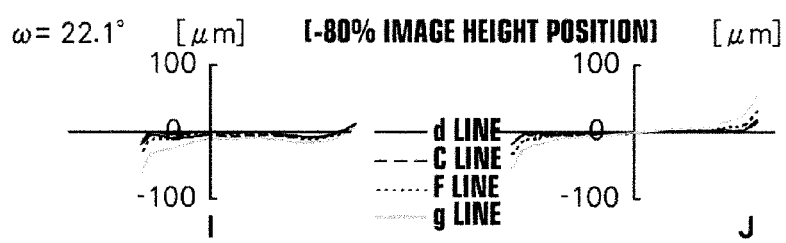

FIG.49
EXAMPLE 9
TELEPHOTO END
[WITHOUT CAMERA SHAKE CORRECTION]
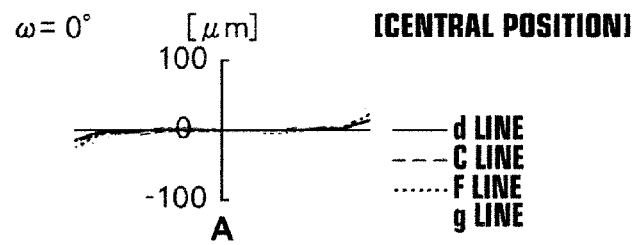
A — ω=0° [CENTRAL POSITION]
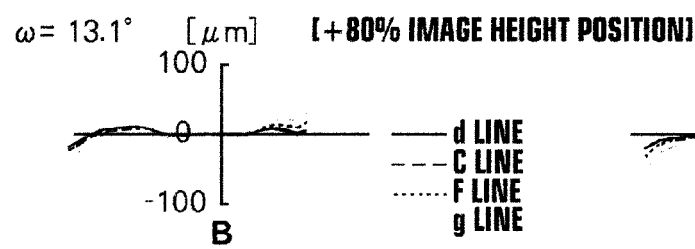
B — ω=13.1° [+80% IMAGE HEIGHT POSITION]
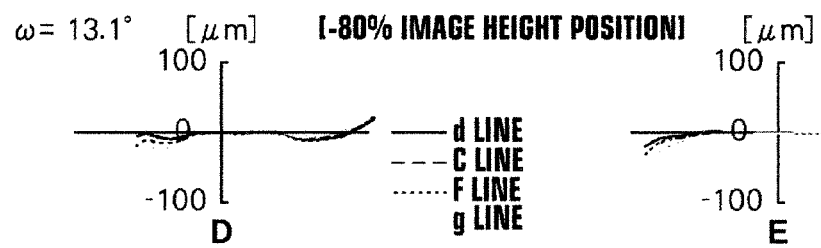
D — ω=13.1° [-80% IMAGE HEIGHT POSITION]
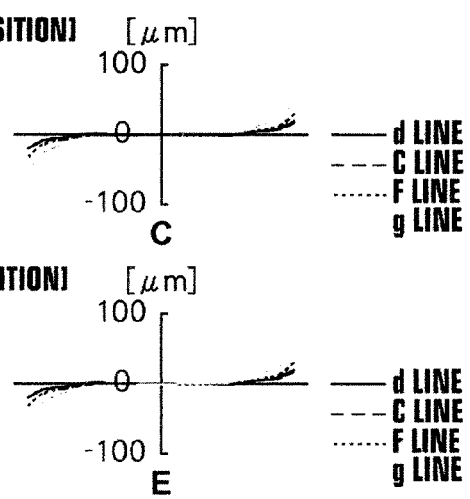
C, E
[WITH 0.3° CAMERA SHAKE CORRECTION]
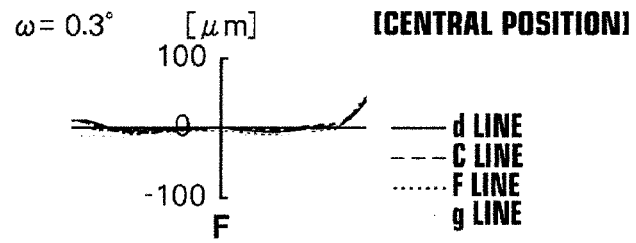
F — ω=0.3° [CENTRAL POSITION]
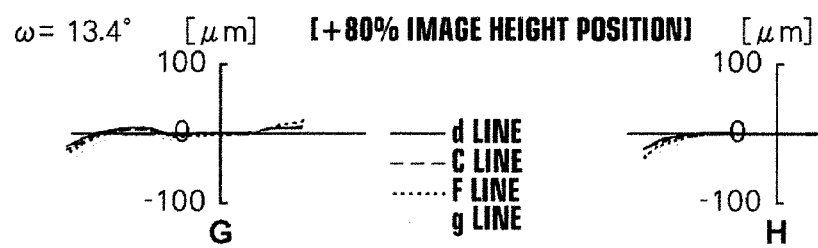
G — ω=13.4° [+80% IMAGE HEIGHT POSITION]
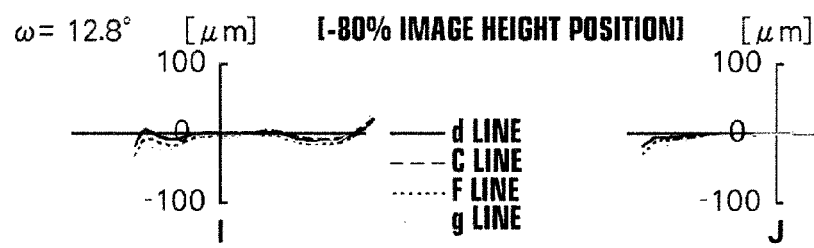
I — ω=12.8° [-80% IMAGE HEIGHT POSITION]
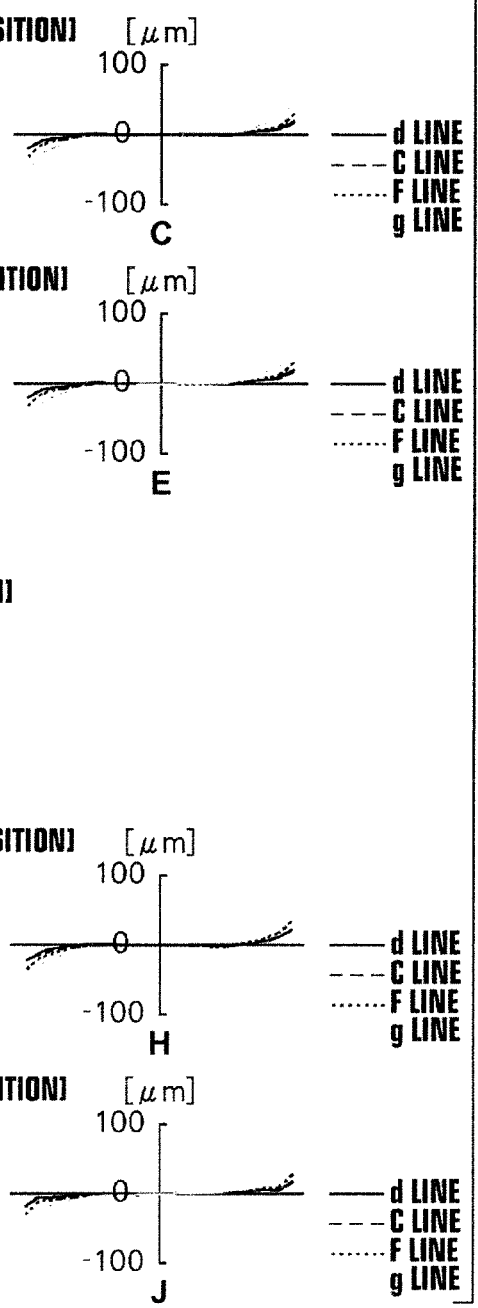
H, J
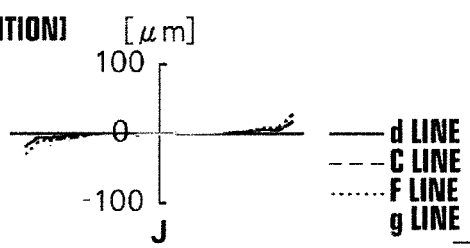

FIG.50
WIDE ANGLE END     EXAMPLE 10
[WITHOUT CAMERA SHAKE CORRECTION]
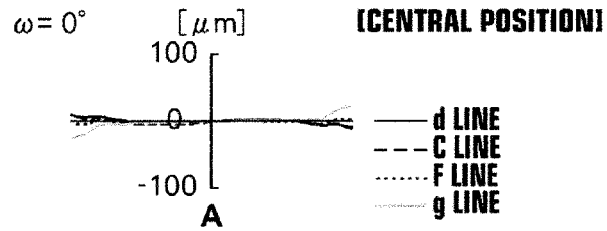
[CENTRAL POSITION] — A
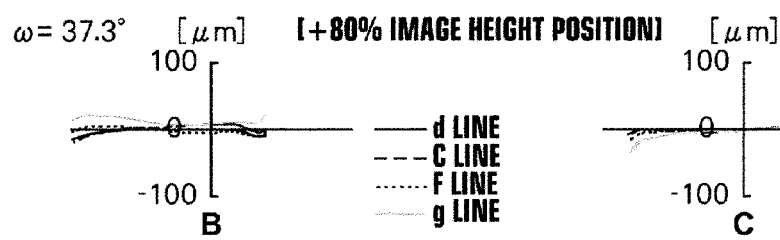
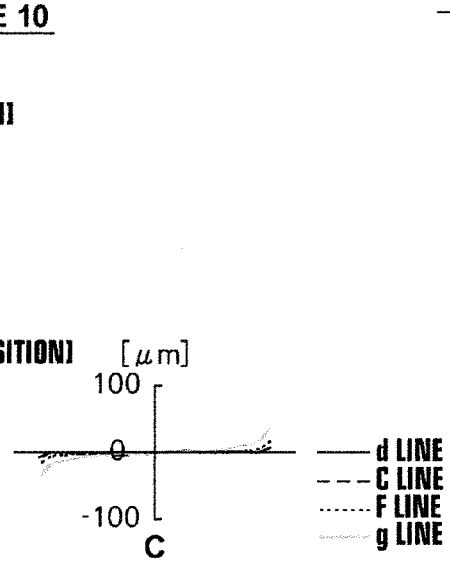
[+80% IMAGE HEIGHT POSITION] — B, C
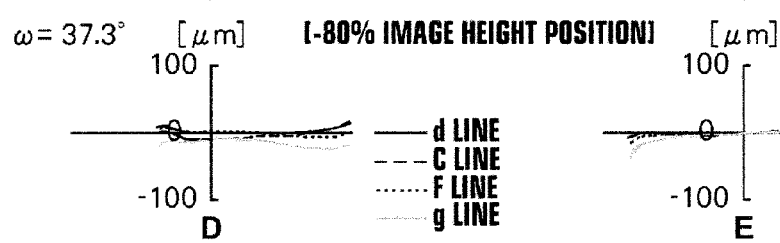
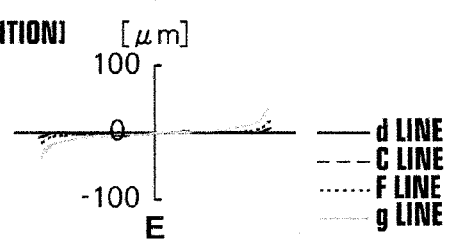
[−80% IMAGE HEIGHT POSITION] — D, E
[WITH 0.3° CAMERA SHAKE CORRECTION]
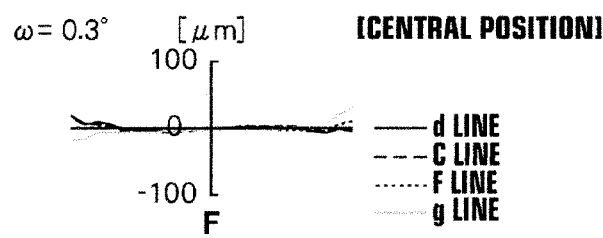
[CENTRAL POSITION] — F
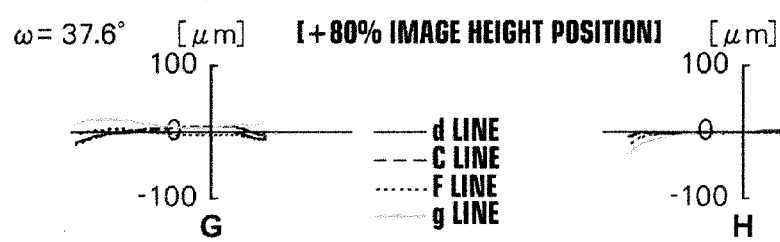
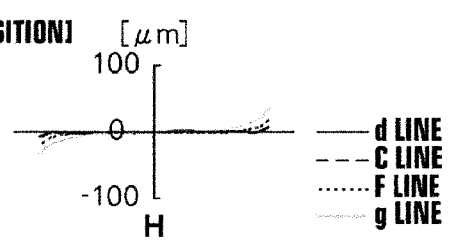
[+80% IMAGE HEIGHT POSITION] — G, H
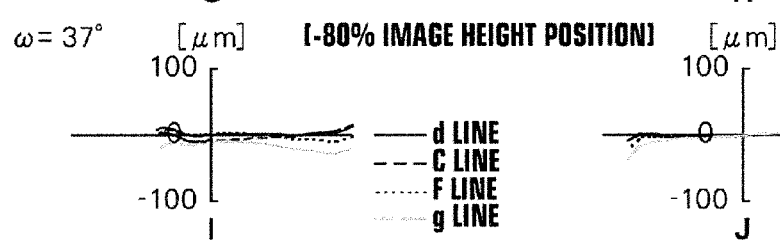
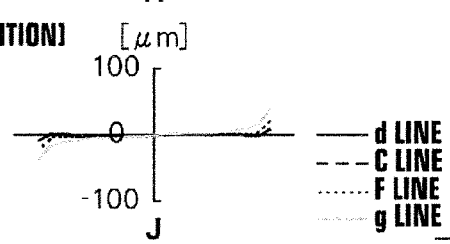
[−80% IMAGE HEIGHT POSITION] — I, J

FIG.51
INTERMEDIATE     EXAMPLE 10
[WITHOUT CAMERA SHAKE CORRECTION]
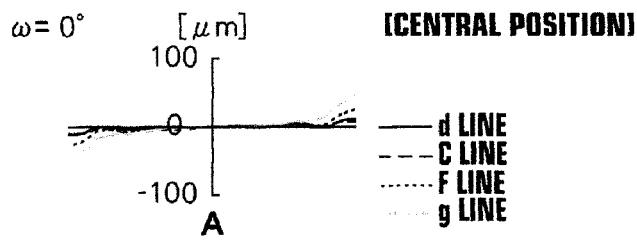
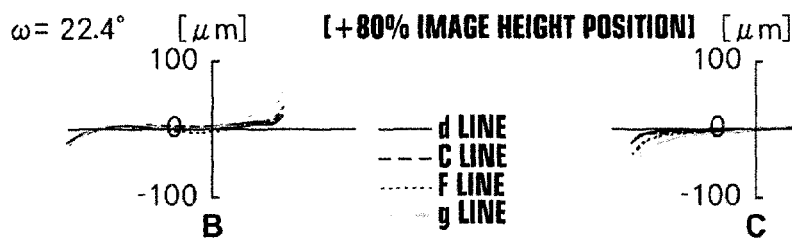
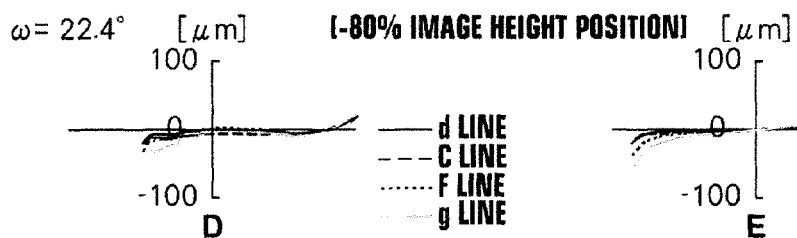
[WITH 0.3° CAMERA SHAKE CORRECTION]
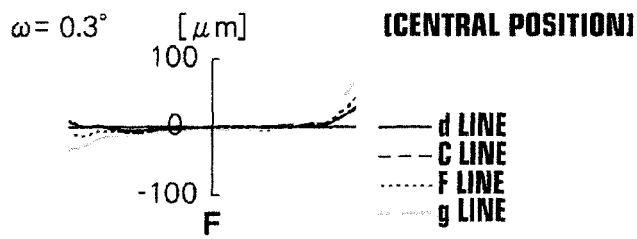
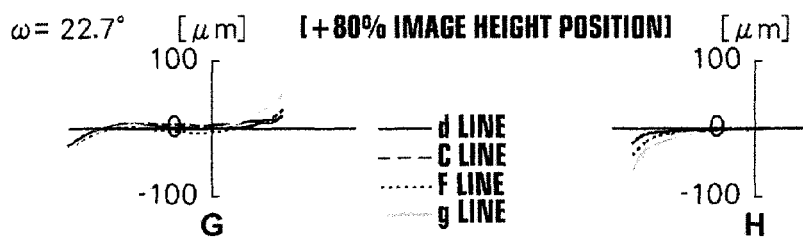
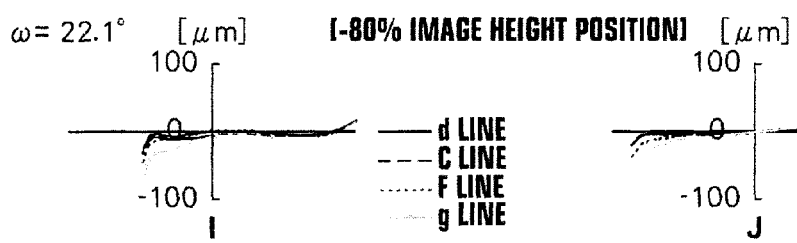

FIG.52
TELEPHOTO END      EXAMPLE 10
[WITHOUT CAMERA SHAKE CORRECTION]
$\omega = 0°$   [μm]    [CENTRAL POSITION]
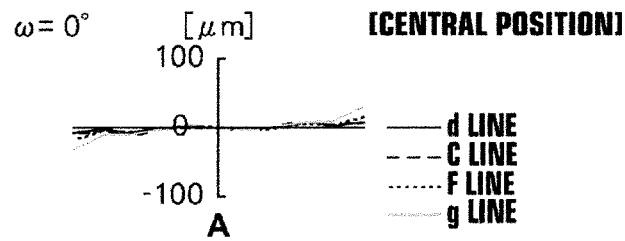
A
$\omega = 13.1°$   [μm]    [+80% IMAGE HEIGHT POSITION]   [μm]
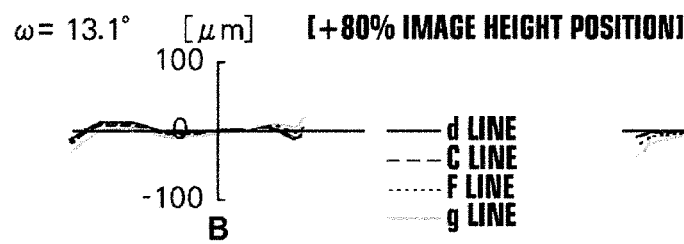 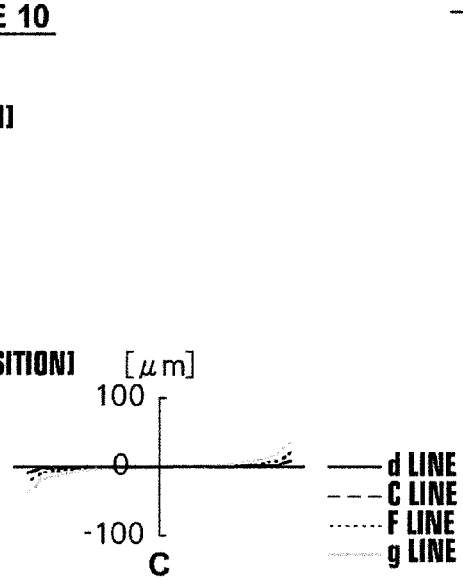
B            C
$\omega = 13.1°$   [μm]    [−80% IMAGE HEIGHT POSITION]   [μm]
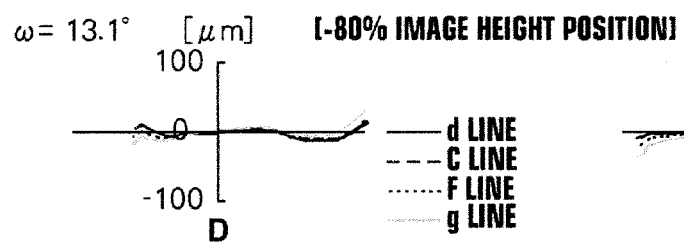
D            E
[WITH 0.3° CAMERA SHAKE CORRECTION]
$\omega = 0.3°$   [μm]    [CENTRAL POSITION]
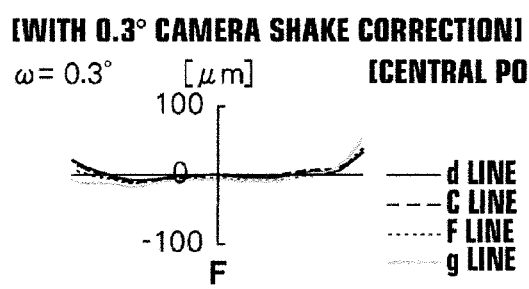
F
$\omega = 13.4°$   [μm]    [+80% IMAGE HEIGHT POSITION]   [μm]
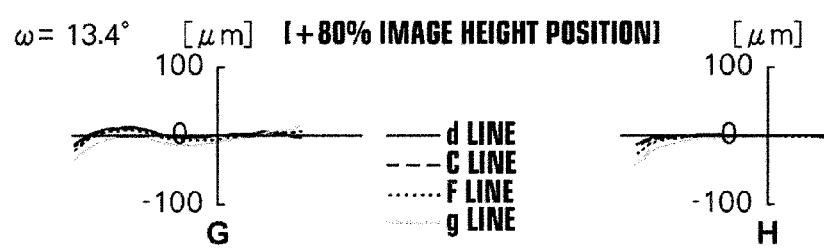 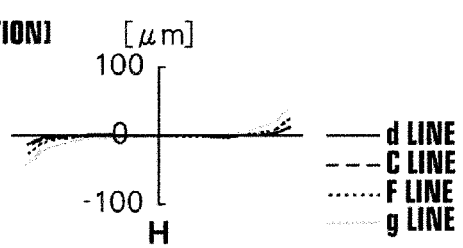
G            H
$\omega = 12.8°$   [μm]    [−80% IMAGE HEIGHT POSITION]   [μm]
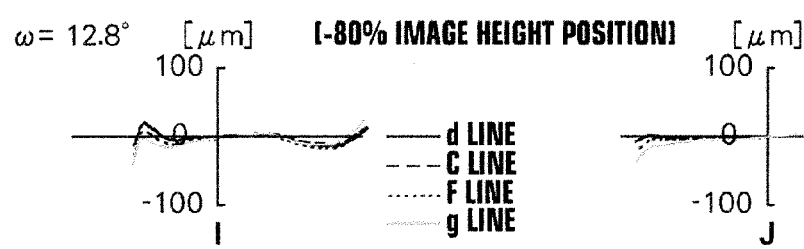 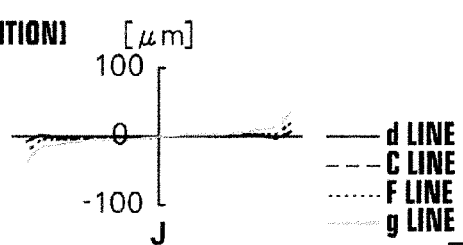
I            J
— d LINE
--- C LINE
...... F LINE
— g LINE

ZOOM LENS AND IMAGING APPARATUS

CROSS REFERENCE TO RELATED APPLICATIONS

The present application claims priority under 35 USC §119 to Japanese Patent Application No. 2013-124347 filed on Jun. 13, 2013. Each of the above application(s) is hereby expressed incorporated by reference, in its entirety, into the present application.

TECHNICAL FIELD

The present invention is related to a zoom lens. More particularly, the present invention is related to a zoom lens which is suited for use in compact digital cameras, exchangeable lens digital camera, etc.

In addition, the present invention is related to an imaging apparatus equipped with such a zoom lens.

BACKGROUND ART

Achieving miniaturization and weight reduction of focusing lens groups and shake preventing (camera shake correcting) lens groups is an important objective in zoom lenses which are employed in digital cameras and video cameras. Recently, many zoom lenses have been proposed, in which the entirety of a single lens group or a partial sub lens group is moved in a direction perpendicular to an optical axis in order to correct images in the case that camera shake occurs.

For example, Japanese Unexamined Patent Publication No. 2001-117000 discloses a zoom lens having four zoom lens groups, each having a positive, a negative, a positive, and a positive refractive power, provided in this order from the object side. This zoom lens corrects camera shake by moving the entire third lens group in a direction perpendicular to the optical axis.

Japanese Unexamined Patent Publication No. 2008-181147 discloses a zoom lens having four zoom lens groups, each having a positive, a negative, a positive, and a positive refractive power, provided in this order from the object side. This zoom lens corrects camera shake by moving a partial lens group that constitutes the third lens group in a direction perpendicular to the optical axis.

Japanese Unexamined Patent Publication No. 2009-150970 discloses a zoom lens having four zoom lens groups, each having a positive, a negative, a positive, and a positive refractive power, provided in this order from the object side. This zoom lens corrects camera shake by moving one lens provided within the third lens group in a direction perpendicular to the optical axis.

Japanese Unexamined Patent Publication No. 2002-006217 discloses a zoom lens having four zoom lens groups, each having a positive, a negative, a positive, and a positive refractive power, provided in this order from the object side. This zoom lens corrects camera shake by moving one lens provided within the third lens group in a direction perpendicular to the optical axis.

DISCLOSURE OF THE INVENTION

In the zoom lens disclosed in Japanese Unexamined Patent Publication No. 2001-117000, the third lens group that moves to correct camera shape is constituted by four lenses. In compact cameras and video cameras for consumers, in which sizes of imaging elements are small, the weights of lenses are not excessively great even if the shake preventing lens group is constituted by a plurality of lenses in this manner. Therefore, there are many cases in which such a configuration is adopted.

However, in the case that such a configuration is adopted for a zoom lens for use in a digital camera that employs a large imaging element, such as that of the APS-C type (23.6 mm·15.6 mm), the weight of the shake preventing lens group will be several times that compared to a case in which this configuration is adopted for an imaging apparatus that employs a compact imaging element. As a result, the load on a shake preventing drive system (camera shake correcting drive system) will become extremely large. At the same time, the lens holding frame will become large, and in turn, the entire lens system will become large. In addition, the response time when camera shake occurs will become slow. The above also applies to focusing lens groups. There is demand to reduce the sizes and weights of lenses that move during focusing operations in order to reduce the load on a focusing drive system and also to accelerate auto focusing operations.

Meanwhile, the shake preventing lens group in all of the examples of the zoom lens disclosed in Japanese Unexamined Patent Publication No. 2008-181147 is constituted by two lenses. As described above, in the case that the imaging size is large, the weight of each individual lens becomes great. Therefore, it is preferable for the shake preventing lenses to be reduced to about two lenses as in Japanese Unexamined Patent Publication No. 2008-181147.

The shake preventing lens group of the zoom lens disclosed in Japanese Unexamined Patent Publication No. 2008-181147 is designed to be comparatively compact and lightweight, as described above. However, with respect to a configuration for performing focusing operations, Japanese Unexamined Patent Publication No. 2008-181147 discloses that it is preferable for the entire first lens group, the entire second lens group, or both the first lens group and the second lens group to be moved. That is, the configuration for performing focusing operations is not designed to be sufficiently lightweight.

The shake preventing lens group of the zoom lens disclosed in Japanese Unexamined Patent Publication No. 2009-150970 is also designed to be sufficiently lightweight. However, the configuration for performing focusing operations moves the entire second lens group, and the configuration for performing focusing operations is not designed to be sufficiently lightweight.

The zoom lens disclosed in Japanese Unexamined Patent Publication No. 2002-006217 corrects camera shake by moving a single lens, and it can be said that the camera shake preventing lens group is designed to be sufficiently lightweight. However, Japanese Unexamined Patent Publication No. 2002-006217 does not explicitly disclose a focusing lens group.

The present invention has been developed in view of the foregoing circumstances. It is an object of the present invention to provide a zoom lens which is miniaturized and simplified, and which is capable of reducing the load on a shake preventing drive system and a focusing drive system.

In addition, it is an object of the present invention to provide an imaging apparatus that can achieve reductions in size and weight, in which the response times of camera shake correcting operations and focusing operations are fast, by employing the above zoom lens.

A zoom lens of the present invention achieves the above objects by designating a single lens provided in a third lens group as a shake preventing (camera shake correcting) lens group, and by designating a portion of the lenses in a fourth lens group to be a focusing lens group.

That is, a first zoom lens of the present invention comprises:

a first lens group having a positive refractive power;
a second lens group having a negative refractive power;
a third lens group having a positive refractive power; and
a fourth lens group having a positive or a negative refractive power; provided in this order from an object side;
the first lens group, the second lens group, and the third lens group moving such that the distance between the first lens group and the second lens group is greater while the distance between the second lens group and the third lens group is less at the telephoto end compared to the wide angle end, and the fourth lens moving integrally with the third lens group;
the third lens group substantially consisting of a fixed third lens group having a positive refractive power as a whole, constituted by at least one lens having a positive refractive power and at least one lens having a negative refractive power, and a movable third lens group provided more toward an image side than the fixed third lens group constituted by a single lens having a negative refractive power that moves in a direction perpendicular to an optical axis to correct an image plane when camera shake occurs; and
the fourth lens group substantially consisting of a movable fourth lens group that moves along the optical axis during focusing operations and a fixed fourth lens group which is fixed with respect to the direction of the optical axis during focusing operations.

Here, the expression "substantially consists of" above and the expression "substantially constituted by" to be described later means that the zoom lens may also include lenses that practically do not have any power, optical elements other than lenses such as an aperture stop and a cover glass, and mechanical components such as lens flanges, a lens barrel, a blur correcting mechanism, etc., in addition to the constituent elements listed above.

A second zoom lens of the present invention comprises:
a first lens group having a positive refractive power;
a second lens group having a negative refractive power;
a third lens group having a positive refractive power; and
a fourth lens group having a positive or a negative refractive power; provided in this order from an object side;
the first lens group, the second lens group, and the third lens group moving such that the distance between the first lens group and the second lens group is greater while the distance between the second lens group and the third lens group is less at the telephoto end compared to the wide angle end, and the fourth lens moving along a trajectory different from that of the third lens group;
the third lens group substantially consisting of a fixed third lens group having a positive refractive power as a whole, constituted by at least one lens having a positive refractive power and at least one lens having a negative refractive power, and a movable third lens group provided more toward an image side than the fixed third lens group constituted by a single lens having a negative refractive power that moves in a direction perpendicular to an optical axis to correct an image plane when camera shake occurs; and
the fourth lens group substantially consisting of a movable fourth lens group that moves along the optical axis during focusing operations and a fixed fourth lens group which is fixed with respect to the direction of the optical axis during focusing operations.

Note that hereinafter, the expression "the zoom lenses of the present invention" will be used when the first zoom lens and the second zoom lens are collectively referred to.

In the zoom lenses of the present invention, it is desirable for the movable fourth lens group and the fixed fourth lens group to have refractive powers of signs different from each other.

In the zoom lenses of the present invention, it is desirable for the fixed third lens group to comprise at least two lenses having positive refractive powers.

It is desirable for the zoom lenses of the present invention to satisfy Conditional Formula (1) below:

$$0.8 < |f3IS/f3| < 2.6 \tag{1}$$

wherein f3IS is the focal length of the movable third lens group, and f3 is the focal length of the third lens group.

In this case, it is more preferable for Conditional Formula (1-2) below, and even more preferable for Conditional Formula (1-3) below to be satisfied.

$$0.9 < |f3IS/f3| < 2.4 \tag{1-2}$$

$$1.0 < |f3IS/f3| < 2.3 \tag{1-3}$$

It is desirable for the zoom lenses of the present invention to satisfy Conditional Formulae (2) and (3) below:

$$1.2 < |f3IS/fw| < 3.5 \tag{2}$$

$$0.3 < |f3IS/ft| < 1.3 \tag{3}$$

wherein f3IS is the focal length of the movable third lens group, fw is the focal length of the entire system at the wide angle end, and ft is the focal length of the entire system at the telephoto end.

In this case, it is more preferable for Conditional Formula (2-2) below, and even more preferable for Conditional Formula (2-3) below to be satisfied.

$$1.3 < |f3IS/fw| < 3.4 \tag{2-2}$$

$$1.4 < |f3IS/fw| < 3.3 \tag{2-3}$$

In addition, it is preferable for Conditional Formula (3-2) to be satisfied.

$$0.4 < |f3IS/ft| < 1.1 \tag{3-2}$$

In the zoom lenses of the present invention, it is desirable for the first lens group to substantially consist of two lenses, which are a lens having a negative refractive power, and a lens having a positive refractive power, provided in this order from the object side.

In the zoom lens of the present invention, it is desirable for the fourth lens group to have a positive refractive power, and for the movable fourth lens group to have a positive refractive power.

It is desirable for the zoom lenses of the present invention to satisfy Conditional Formula (4) below:

$$0.05 < |f4F/f4| < 1.00 \tag{4}$$

wherein f4F is the focal length of the movable fourth lens group and f4 is the focal length of the fourth lens group.

In this case, it is more desirable for Conditional Formula (4-2) below to be satisfied.

$$0.08 < |f4F/f4| < 0.90 \tag{4-2}$$

In the zoom lenses of the present invention, it is desirable for the second lens group to substantially consist of three lenses, which are a lens having a negative refractive power, a lens having a negative refractive power, and a lens having a positive refractive power, provided in this order from the object side.

In the zoom lenses of the present invention, it is desirable for only a fifth lens group, which is constituted by a single lens having a positive refractive power and which is fixed in the direction of the optical axis while changing magnification and during focusing operations, to be provided as a lens group arranged more toward the image side than the fourth lens group.

In the zoom lenses of the present invention, it is desirable for the movable fourth lens group to substantially consist of a single lens.

In the zoom lenses of the present invention, it is desirable for the fixed third lens group to substantially consist of a lens having a positive refractive power, a lens having a negative refractive power, and a lens having a positive refractive power, provided in this order from the object side.

In the zoom lenses of the present invention, it is desirable for the angle of view at the wide angle end to be 70 degrees or greater, and for the zoom lens to satisfy Conditional Formulae (5) and (6) below:

$$3.6 < f1/fw < 7.2 \quad (5)$$

$$1.2 < f1/ft < 2.6 \quad (6)$$

wherein f1 is the focal length of the first lens group, fw is the focal length of the entire system at the wide angle end, and ft is the focal length of the entire system at the telephoto end.

In this case, it is more preferable for Conditional Formula (5-2) below, and even more preferable for Conditional Formula (5-3) below to be satisfied.

$$3.9 < f1/fw < 6.7 \quad (5\text{-}2)$$

$$4.2 < f1/fw < 6.4 \quad (5\text{-}3)$$

In addition, it is more preferable for Conditional Formula (6-2) below, and even more preferable for Conditional Formula (6-3) below to be satisfied.

$$1.3 < f1/ft < 2.4 \quad (6\text{-}2)$$

$$1.4 < f1/ft < 2.3 \quad (6\text{-}3)$$

It is desirable for the zoom lenses of the present invention to satisfy Conditional Formula (7) below:

$$0.15 < BFw/TLw < 0.42 \quad (7)$$

wherein TLw is the distance from the lens surface most toward the object side to the lens surface most toward the image side along the optical axis at the wide angle end, and BFw is the amount of back focus from the lens surface most toward the image side to an imaging surface as an air converted length at the wide angle end.

In this case, it is more preferable for Conditional Formula (7-2) below, and even more preferable for Conditional Formula (7-3) below to be satisfied.

$$0.18 < BFw/TLw < 0.40 \quad (7\text{-}2)$$

$$0.20 < BFw/TLw < 0.37 \quad (7\text{-}3)$$

Meanwhile, an imaging apparatus of the present invention is characterized by being equipped with the first zoom lens of the present invention or the second zoom lens of the present invention described above.

As described above, the movable third lens group is constituted by a single lens in the zoom lenses of the present invention. Therefore, the load of a shake preventing drive system can be decreased. In addition, the movable third lens group has a negative refractive power, which is opposite in sign from the refractive power of the fixed third lens group. Therefore, refractive power can be obtained efficiently as a shake preventing lens group, and the sensitivity of camera shake correction can be set appropriately.

Further, the signs of the refractive powers of the movable third lens group and the fixed third lens groups are opposite each other. Thereby, an advantageous effect that various aberrations which are generated in each of the groups cancel each other out is obtained.

In addition, the focusing lens group is only a portion (the movable fourth lens group) of the fourth lens group. Therefore, the load on a focusing drive system can also be decreased. When automatic focus is applied, the operation thereof can be accelerated.

Meanwhile, the imaging apparatus of the present invention is equipped with a zoom lens of the present invention that exhibits the advantageous effects described above. Therefore, the response times of camera shake correcting operations and focusing operations are fast, and reductions in size and weight can be achieved.

BRIEF DESCRIPTION OF THE DRAWINGS

FIG. 1 is a collection of sectional diagrams that illustrate the lens configuration of a zoom lens according to Example 1 of the present invention.

FIG. 2 is a collection of sectional diagrams that illustrate the lens configuration of a zoom lens according to Example 2 of the present invention.

FIG. 3 is a collection of sectional diagrams that illustrate the lens configuration of a zoom lens according to Example 3 of the present invention.

FIG. 4 is a collection of sectional diagrams that illustrate the lens configuration of a zoom lens according to Example 4 of the present invention.

FIG. 5 is a collection of sectional diagrams that illustrate the lens configuration of a zoom lens according to Example 5 of the present invention.

FIG. 7 is a collection of sectional diagrams that illustrate the lens configuration of a zoom lens according to Example 7 of the present invention.

FIG. 8 is a collection of sectional diagrams that illustrate the lens configuration of a zoom lens according to Example 8 of the present invention.

FIG. 9 is a collection of sectional diagrams that illustrate the lens configuration of a zoom lens according to Example 9 of the present invention.

FIG. 10 is a collection of sectional diagrams that illustrate the lens configuration of a zoom lens according to Example 10 of the present invention.

Figure 13:
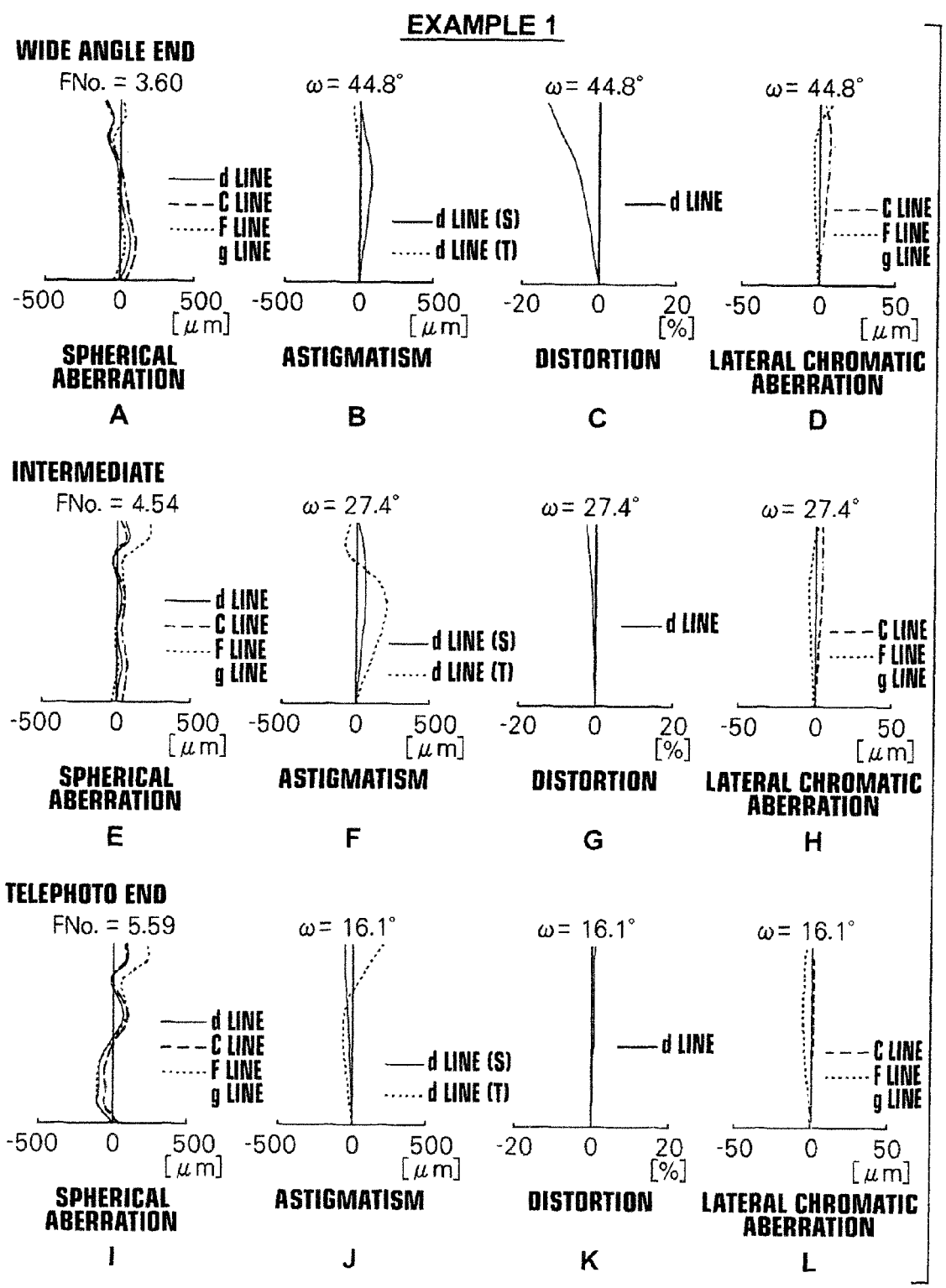

A through L of FIG. 13 are diagrams that illustrate various aberrations of the zoom lens according to Example 1.

A through L of FIG. 14 are diagrams that illustrate various aberrations of the zoom lens according to Example 2.

A through L of FIG. 15 are diagrams that illustrate various aberrations of the zoom lens according to Example 3.

A through L of FIG. 16 are diagrams that illustrate various aberrations of the zoom lens according to Example 4.

A through L of FIG. 17 are diagrams that illustrate various aberrations of the zoom lens according to Example 5.

A through L of FIG. 18 are diagrams that illustrate various aberrations of the zoom lens according to Example 6.

A through L of FIG. 19 are diagrams that illustrate various aberrations of the zoom lens according to Example 7.

A through L of FIG. 20 are diagrams that illustrate various aberrations of the zoom lens according to Example 8.

A through L of FIG. 21 are diagrams that illustrate various aberrations of the zoom lens according to Example 9.

A through L of FIG. 22 are diagrams that illustrate various aberrations of the zoom lens according to Example 10.

A through E of FIG. 23 are diagrams that illustrate transverse aberration of the zoom lens according to Example 1 at the wide angle end without camera shake correction, and F through J of FIG. 23 are diagrams that illustrate transverse aberration of the zoom lens according to Example 1 at the wide angle end with camera shake correction.

A through E of FIG. 24 are diagrams that illustrate transverse aberration of the zoom lens according to Example 1 at an intermediate position without camera shake correction, and F through J of FIG. 24 are diagrams that illustrate transverse aberration of the zoom lens according to Example 1 at the intermediate position with camera shake correction.

A through E of FIG. 25 are diagrams that illustrate transverse aberration of the zoom lens according to Example 1 at the telephoto end without camera shake correction, and F through J of FIG. 25 are diagrams that illustrate transverse aberration of the zoom lens according to Example 1 at the telephoto end with camera shake correction.

A through E of FIG. 26 are diagrams that illustrate transverse aberration of the zoom lens according to Example 2 at the wide angle end without camera shake correction, and F through J of FIG. 26 are diagrams that illustrate transverse aberration of the zoom lens according to Example 2 at the wide angle end with camera shake correction.

A through E of FIG. 27 are diagrams that illustrate transverse aberration of the zoom lens according to Example 2 at an intermediate position without camera shake correction, and F through J of FIG. 27 are diagrams that illustrate transverse aberration of the zoom lens according to Example 2 at the intermediate position with camera shake correction.

A through E of FIG. 28 are diagrams that illustrate transverse aberration of the zoom lens according to Example 2 at the telephoto end without camera shake correction, and F through J of FIG. 28 are diagrams that illustrate transverse aberration of the zoom lens according to Example 2 at the telephoto end with camera shake correction.

A through E of FIG. 29 are diagrams that illustrate transverse aberration of the zoom lens according to Example 3 at the wide angle end without camera shake correction, and F through J of FIG. 29 are diagrams that illustrate transverse aberration of the zoom lens according to Example 3 at the wide angle end with camera shake correction.

A through E of FIG. 30 are diagrams that illustrate transverse aberration of the zoom lens according to Example 3 at an intermediate position without camera shake correction, and F through J of FIG. 30 are diagrams that illustrate transverse aberration of the zoom lens according to Example 3 at the intermediate position with camera shake correction.

A through E of FIG. 31 are diagrams that illustrate transverse aberration of the zoom lens according to Example 3 at the telephoto end without camera shake correction, and F through J of FIG. 31 are diagrams that illustrate transverse aberration of the zoom lens according to Example 3 at the telephoto end with camera shake correction.

A through E of FIG. 32 are diagrams that illustrate transverse aberration of the zoom lens according to Example 4 at the wide angle end without camera shake correction, and F through J of FIG. 32 are diagrams that illustrate transverse aberration of the zoom lens according to Example 4 at the wide angle end with camera shake correction.

A through E of FIG. 33 are diagrams that illustrate transverse aberration of the zoom lens according to Example 4 at an intermediate position without camera shake correction, and F through J of FIG. 33 are diagrams that illustrate transverse aberration of the zoom lens according to Example 4 at the intermediate position with camera shake correction.

A through E of FIG. 34 are diagrams that illustrate transverse aberration of the zoom lens according to Example 4 at the telephoto end without camera shake correction, and F through J of FIG. 34 are diagrams that illustrate transverse aberration of the zoom lens according to Example 4 at the telephoto end with camera shake correction.

A through E of FIG. 35 are diagrams that illustrate transverse aberration of the zoom lens according to Example 5 at the wide angle end without camera shake correction, and F through J of FIG. 35 are diagrams that illustrate transverse aberration of the zoom lens according to Example 5 at the wide angle end with camera shake correction.

A through E of FIG. 36 are diagrams that illustrate transverse aberration of the zoom lens according to Example 5 at an intermediate position without camera shake correction, and F through J of FIG. 36 are diagrams that illustrate transverse aberration of the zoom lens according to Example 5 at the intermediate position with camera shake correction.

A through E of FIG. 37 are diagrams that illustrate transverse aberration of the zoom lens according to Example 5 at the telephoto end without camera shake correction, and F through J of FIG. 37 are diagrams that illustrate transverse aberration of the zoom lens according to Example 5 at the telephoto end with camera shake correction.

A through E of FIG. 38 are diagrams that illustrate transverse aberration of the zoom lens according to Example 6 at the wide angle end without camera shake correction, and F through J of FIG. 38 are diagrams that illustrate transverse aberration of the zoom lens according to Example 6 at the wide angle end with camera shake correction.

A through E of FIG. 39 are diagrams that illustrate transverse aberration of the zoom lens according to Example 6 at an intermediate position without camera shake correction, and F through J of FIG. 39 are diagrams that illustrate transverse aberration of the zoom lens according to Example 6 at the intermediate position with camera shake correction.

A through E of FIG. 40 are diagrams that illustrate transverse aberration of the zoom lens according to Example 6 at the telephoto end without camera shake correction, and F through J of FIG. 40 are diagrams that illustrate transverse aberration of the zoom lens according to Example 6 at the telephoto end with camera shake correction.

A through E of FIG. 41 are diagrams that illustrate transverse aberration of the zoom lens according to Example 7 at the wide angle end without camera shake correction, and F through J of FIG. 41 are diagrams that illustrate transverse aberration of the zoom lens according to Example 7 at the wide angle end with camera shake correction.

A through E of FIG. 42 are diagrams that illustrate transverse aberration of the zoom lens according to Example 7 at an intermediate position without camera shake correction, and F through J of FIG. 42 are diagrams that illustrate transverse aberration of the zoom lens according to Example 7 at the intermediate position with camera shake correction.

A through E of FIG. 43 are diagrams that illustrate transverse aberration of the zoom lens according to Example 7 at the telephoto end without camera shake correction, and F through J of FIG. 43 are diagrams that illustrate transverse aberration of the zoom lens according to Example 7 at the telephoto end with camera shake correction.

A through E of FIG. 44 are diagrams that illustrate transverse aberration of the zoom lens according to Example 8 at the wide angle end without camera shake correction, and F through J of FIG. 44 are diagrams that illustrate transverse aberration of the zoom lens according to Example 8 at the wide angle end with camera shake correction.

A through E of FIG. 45 are diagrams that illustrate transverse aberration of the zoom lens according to Example 8 at an intermediate position without camera shake correction, and F through J of FIG. 45 are diagrams that illustrate transverse aberration of the zoom lens according to Example 8 at the intermediate position with camera shake correction.

A through E of FIG. 46 are diagrams that illustrate transverse aberration of the zoom lens according to Example 8 at the telephoto end without camera shake correction, and F through J of FIG. 46 are diagrams that illustrate transverse aberration of the zoom lens according to Example 8 at the telephoto end with camera shake correction.

A through E of FIG. 47 are diagrams that illustrate transverse aberration of the zoom lens according to Example 9 at the wide angle end without camera shake correction, and F through J of FIG. 47 are diagrams that illustrate transverse aberration of the zoom lens according to Example 9 at the wide angle end with camera shake correction.

A through E of FIG. 48 are diagrams that illustrate transverse aberration of the zoom lens according to Example 9 at an intermediate position without camera shake correction, and F through J of FIG. 48 are diagrams that illustrate transverse aberration of the zoom lens according to Example 9 at the intermediate position with camera shake correction.

A through E of FIG. 49 are diagrams that illustrate transverse aberration of the zoom lens according to Example 9 at the telephoto end without camera shake correction, and F through J of FIG. 49 are diagrams that illustrate transverse aberration of the zoom lens according to Example 9 at the telephoto end with camera shake correction.

A through E of FIG. 50 are diagrams that illustrate transverse aberration of the zoom lens according to Example 10 at the wide angle end without camera shake correction, and F through J of FIG. 50 are diagrams that illustrate transverse aberration of the zoom lens according to Example 10 at the wide angle end with camera shake correction.

A through E of FIG. 51 are diagrams that illustrate transverse aberration of the zoom lens according to Example 10 at an intermediate position without camera shake correction, and F through J of FIG. 51 are diagrams that illustrate transverse aberration of the zoom lens according to Example 10 at the intermediate position with camera shake correction.

A through E of FIG. 52 are diagrams that illustrate transverse aberration of the zoom lens according to Example 10 at the telephoto end without camera shake correction, and F through J of FIG. 52 are diagrams that illustrate transverse aberration of the zoom lens according to Example 10 at the telephoto end with camera shake correction.

Figure 53:
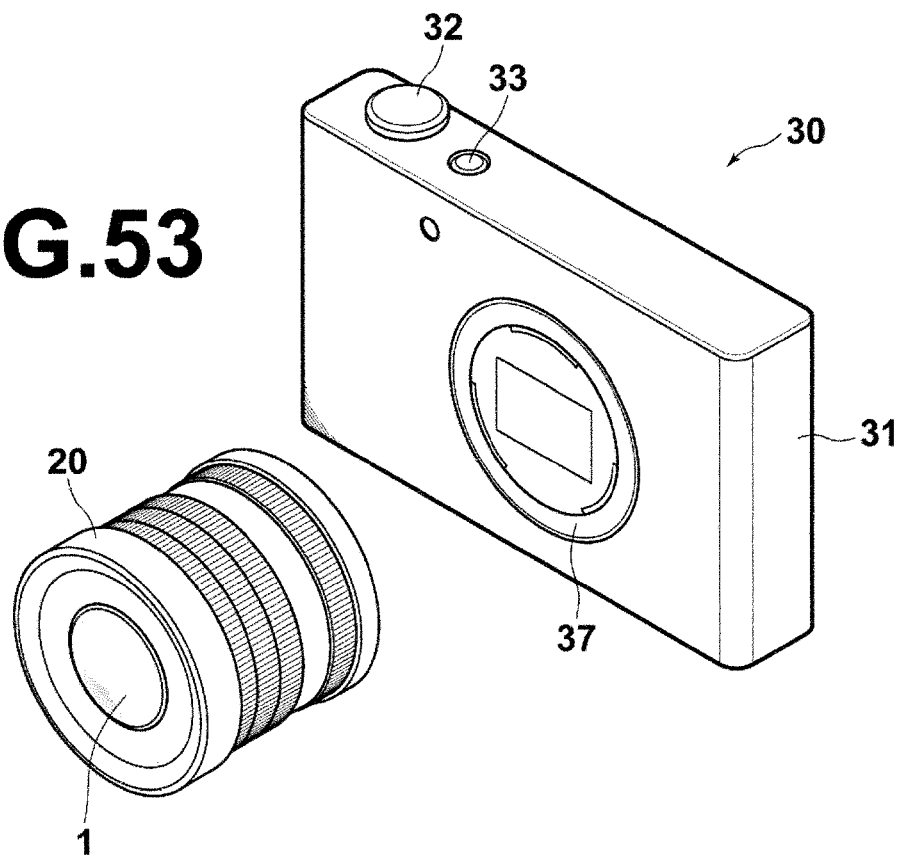

FIG. 53 is a perspective view that illustrates the front side of an imaging apparatus according to an embodiment of the present invention.

Figure 54:
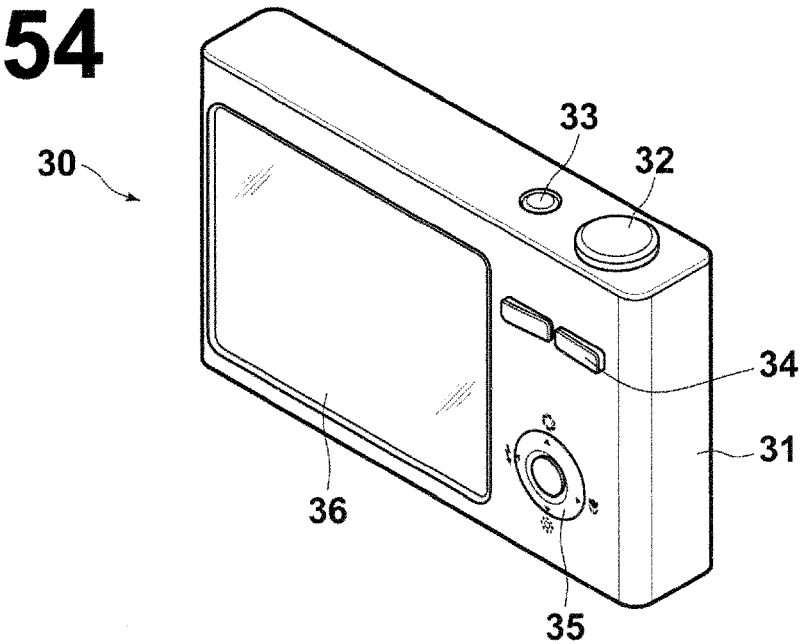

FIG. 54 is a perspective view that illustrates the rear side of an imaging apparatus according to an embodiment of the present invention.

BEST MODE FOR CARRYING OUT THE INVENTION

Hereinafter, embodiments of the present invention will be described in detail with reference to the attached drawings.

FIG. 1 is a collection of cross sectional diagrams that illustrate the configuration of a zoom lens according to an embodiment of the present invention, and corresponds to a zoom lens of Example 1 to be described later. FIG. 2 through FIG. 10 are cross sectional diagrams that illustrate configurations of zoom lenses according to other embodiments of the present invention, and correspond to zoom lenses of Examples 2 through 10 to be described later. The basic configurations of the embodiments illustrated in FIG. 1 through FIG. 10 are the same unless points of difference are particularly noted. The manners in which the configurations are illustrated are also the same. Therefore, the zoom lenses according to the embodiments of the present invention will be described mainly with reference to FIG. 1.

In FIG. 1, the left side is the object side and the right side is the image side. The uppermost portion of FIG. 1 illustrates the arrangement of the optical system in a state focused on infinity at the wide angle end (shortest focal length state). The middle portion of FIG. 1 illustrates the arrangement of the optical system focused on infinity at an intermediate position. The lowermost portion of FIG. 1 illustrates the arrangement of the optical system in a state focused on infinity a state focused on infinity at the telephoto end (longest focal length state). The same applies to FIGS. 2 through 10 to be described later.

The zoom lens according to the embodiment of the present invention substantially consists of: a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, provided in this order from the object side.

This zoom lens may be mounted in an imaging apparatus such as a digital camera, a cinematic camera, and a broadcast camera. In the imaging apparatus, an imaging element such as a CCD (Charge Coupled Device) and a CMOS (Complementary Metal Oxide Semiconductor) is provided such that the imaging surface thereof is positioned at an imaging plane Sim of the zoom lens. It is preferable for a cover glass for protecting the imaging surface of the imaging element and various filters, such as a low pass filter and an infrared cutoff filter, depending on the specification of the imaging apparatus, to be provided between the zoom lens and the imaging surface. FIG. 1 illustrates an example in which a optical member PP is provided assuming the presence of the cover glass, the various types of filters, and the like between the lens system and the imaging plane Sim.

The first lens group G1 has a positive power as a whole, and substantially consists of a lens L11 having a negative refractive power and a lens L12 having a positive refractive power, provided in this order from the object side. Note that the lens L11 and the lens L12 are cemented together. Here, the lens L11 may be a lens having a negative meniscus shape, and the lens L12 may be a lens having a positive meniscus shape, as in the example illustrated in FIG. 1.

Generally, the first lens group G1 is constituted by lenses having large diameters. However, if the first lens group G1 is substantially constituted by the two lenses L11 and L12 as described above, reductions in size and weight of the zoom lens can be realized.

The second lens group is a lens group having a negative refractive power as a whole, constituted by a lens L21 having a negative refractive power, a lens L22 having a negative refractive power, and a lens L23 having a positive refractive power, provided in this order from the object side along an optical axis Z. Here, the lens L21 may be a lens having a negative meniscus shape, the lens L22 may be a lens having aspherical surfaces both toward the object side and toward the image side, and the lens L23 may be a lens having a positive meniscus shape, as in the example illustrated in FIG. 1.

The size of the zoom lens can be reduced and a reduction in cost can also be achieved if the second lens group G2 substantially consists of the lenses L21, L22, and L23 having the refractive powers as described above. That is, it is preferable for at least two negative lenses and one positive lens to be provided in a second lens group in order to miniaturize the zoom lens and to correct field curvature at the wide angle end. The present embodiment does not employ lenses exceeding this number. Therefore, reductions in the size and the cost of the zoom lens can be realized.

The third lens group G3 is a lens group having a positive refractive power as a whole, substantially consisting of a lens L31 having a positive refractive power, a lens L32 having a negative refractive power, a lens L33 having a positive refractive power, and a lens L34 having a negative refractive power, provided in this order from the object side along the optical axis Z. Note that the lens L32 and the lens L33 are cemented together. Here, the lens L31 may be a lens having aspherical surfaces both toward the object side and toward the image side, the lens L32 may be a planoconcave lens, the lens L33 may be a biconvex lens, and the lens L34 may be a lens having aspherical surfaces both toward the object side and toward the image side, as in the example illustrated in FIG. 1.

The lenses L31, L32, and L33 substantially constitute a fixed third lens group (that is, a fixed lens group having a positive refractive power as a whole that includes at least one lens having a positive refractive power and at least one lens having a negative refractive power) of the present invention. In addition, the lens L34, which is a single lens having a negative refractive power provided more toward the image side than the fixed third lens group, substantially constitutes a movable third lens group of the present invention.

An aperture stop St that moves along with the third lens group G3 while changing magnification is provided between the second lens group G2 and the third lens group G3. Note that the aperture stop St illustrated in FIG. 1 does not represent the size or the shape thereof, but illustrates the position thereof along the optical axis.

In the zoom lenses of the present invention, it is preferable for the aperture stop St to be provided at the side most toward the object side of the third lens group G3. That is, if this configuration is adopted, interference between the aperture stop mechanism and the camera shake mechanism can be prevented.

The fourth lens group G4 is a lens group having a positive refractive power as a whole, substantially consisting of a lens L41 having a positive refractive power and a lens L42 having a negative refractive power, provided in this order from the object side along the optical axis Z. Here, the lens L41 may be a biconvex lens, and the lens L42 may be a planoconcave lens, as in the example illustrated in FIG. 1.

The fifth lens group G5 is a lens group having a positive refractive power, and substantially consists of a lens L5 having a positive refractive power. Here, the lens L5 may be a planoconvex lens, as in the example illustrated in FIG. 1.

The lens L41 moves along the optical axis during focusing operations, and substantially constitutes a movable fourth lens group of the present invention. In addition, the lens L42 is fixed in the direction of the optical axis during focusing operations, and substantially constitutes a fixed fourth lens group of the present invention.

Figure 11:
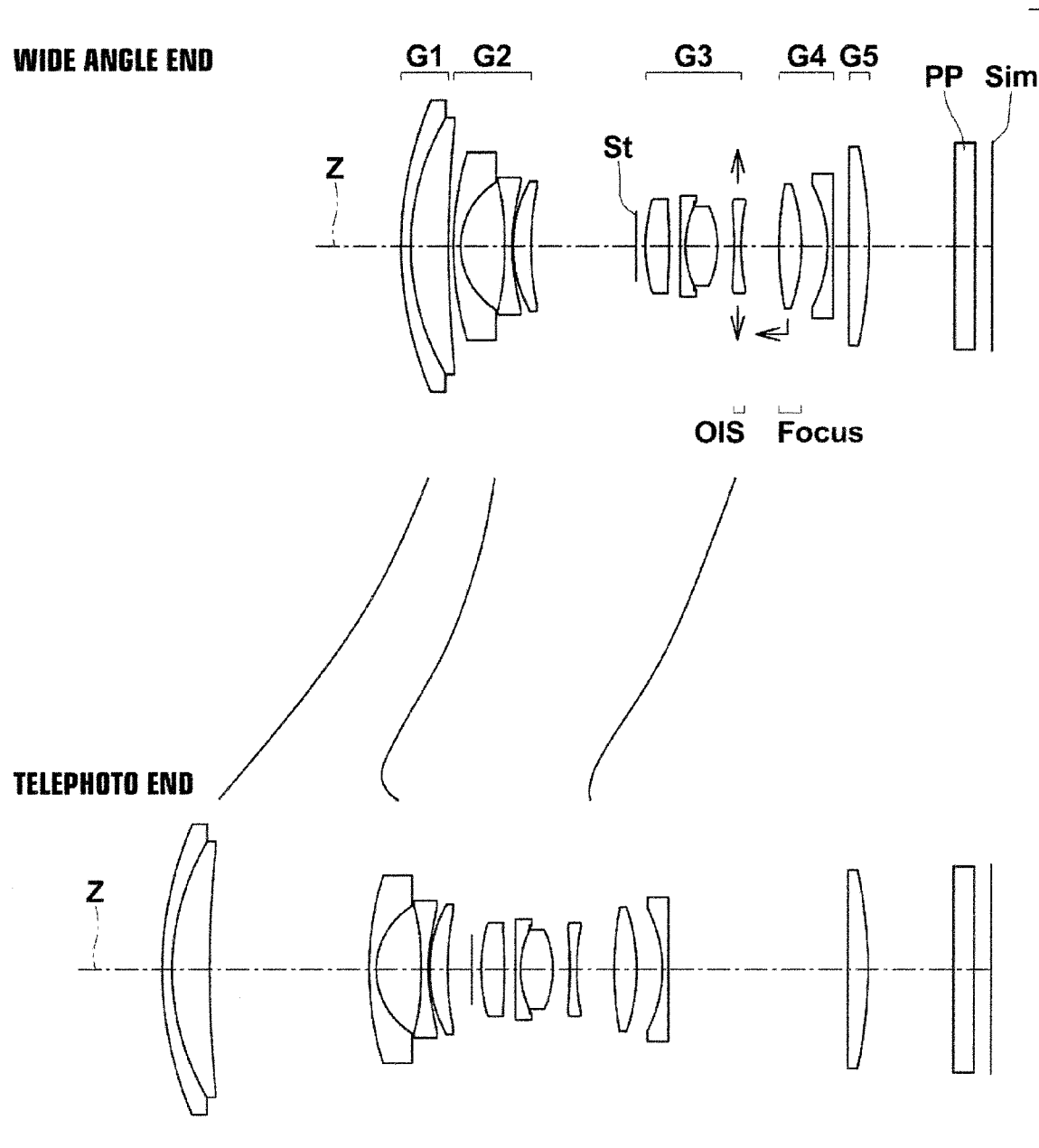
FIG. 11 is a diagram that schematically illustrates an example of the movement paths of lenses while changing magnification of a zoom lens of the present invention.

FIG. 11 is a diagram that schematically indicates the movement paths of lenses of the zoom lens of the present embodiment while changing magnification from the wide angle end to the telephoto end, by the curved lines drawn between the sectional diagram of the zoom lens at the wide angle end at the upper portion, and the sectional diagram of the zoom lens at the telephoto end at the lower portion thereof. Note that the movement paths illustrated in FIG. 11 and FIG. 12 to be described later are merely examples, and the lens groups may move along other movement paths.

As illustrated in FIG. 11, the first through third lens groups G1 through G3 move along the optical axis Z such that the distance between the first lens group G1 and the second lens group G2 is greater, while the distance between the second lens group G2 and the third lens group G3 is less at the telephoto end compared to the wide angle end, and the fourth lens group G4 moves integrally with the third lens group G3, in the zoom lens of the present embodiment.

Figure 12:
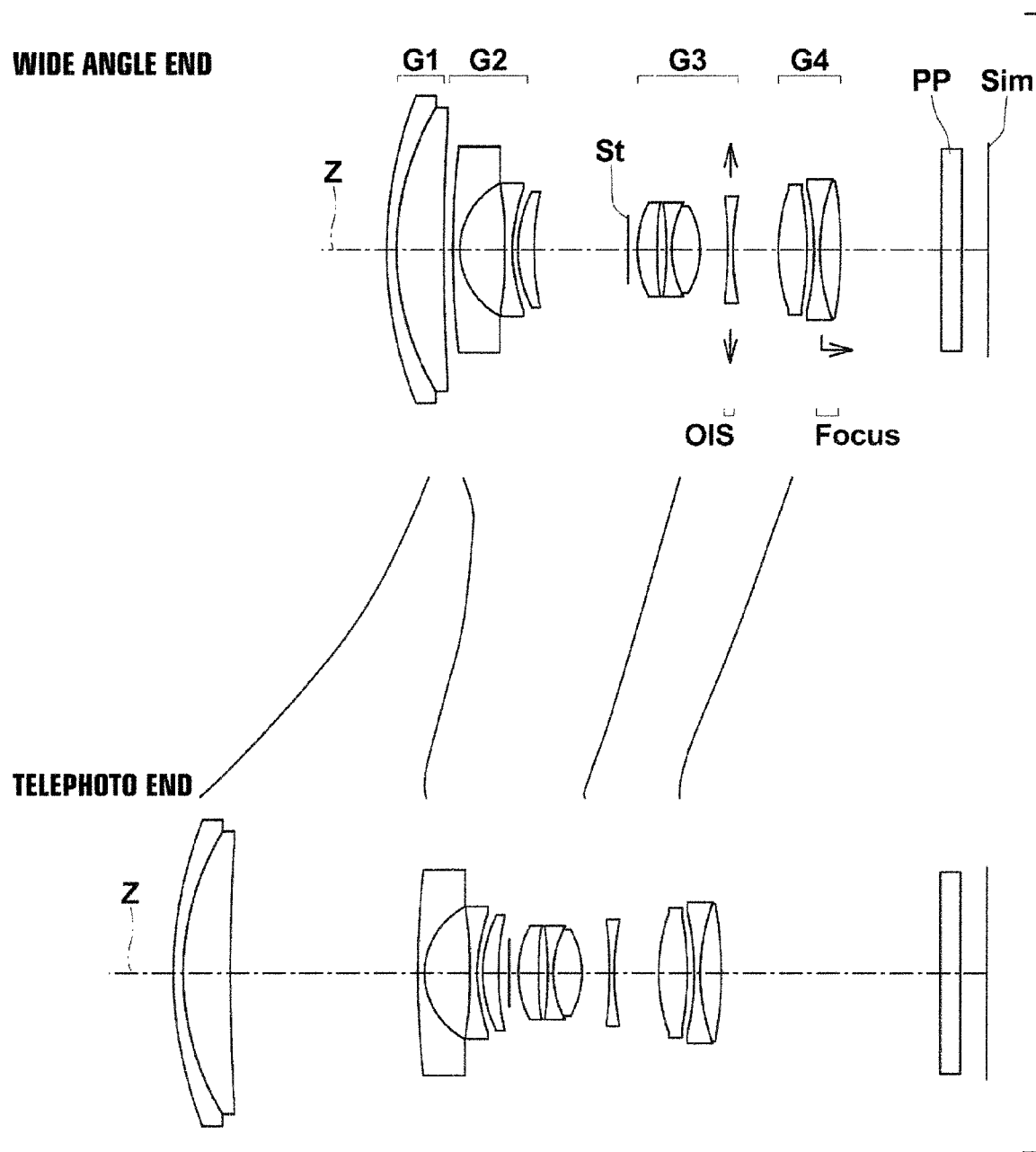
FIG. 12 is a diagram that schematically illustrates another example of the movement paths of lenses while changing magnification of a zoom lens of the present invention.

Note that the fourth lens group G4 moves integrally with the third lens group G3 to change magnification in Examples 1, 8, and 9. In Examples 2 through 7, magnification is changed by the fourth lens group G4 moving along a different movement path than that of the third lens group G3. FIG. 12 illustrates the movement paths of each of the lens groups in the case that the fourth lens group G4 moves along a movement path different from that of the third lens group G3 in the same manner as FIG. 11.

In the case that a configuration is adopted in which the fourth lens group G4 moves integrally with the third lens group G3 as described above, the number of components of the zoom lens can be decreased, and a reduction in cost can be realized.

In the zoom lens of the present embodiment, the movable third lens group G3 is constituted by only the lens L34, which is a single lens, as described above. Therefore, the load of a shake preventing drive system (camera shake correcting drive system) can be decreased. In addition, the lens L34 has a negative refractive power, which is opposite in sign from the refractive power of the fixed third lens group having a positive power as a whole, constituted by the lenses L31, L32, and L33. Therefore, refractive power can be obtained efficiently as a shake preventing lens group, and the sensitivity of camera shake correction can be set appropriately.

Further, the signs of the refractive powers of the lens L34, which is the shake preventing movable third lens group, and the fixed third lens groups are opposite each other. Thereby, an advantageous effect that various aberrations which are generated in each of the groups cancel each other out is obtained.

Further, the fixed third lens group has at least two lenses having positive refractive powers (the lenses L31 and L33), and therefore the following advantageous effects can also be obtained. That is, it is necessary to increase the power of the fixed third lens group in order to increase the power of the third lens group G3 as a whole while increasing the negative power of the shake preventing lens L34 such that the entirety of the zoom lens can be miniaturized. However, various aberrations that occur in such cases can be favorably corrected by providing the two lenses L31 and L33 having positive refractive powers.

In greater detail, the fixed third lens group is constituted by the lens L31 having a positive refractive power, the lens L32 having a negative refractive power, and the lens L33 having a positive refractive power, provided in this order from the object side. Therefore, chromatic aberrations and variations in chromatic aberrations during camera shake correction can be suppressed. At the same time, reductions in the size and cost of the zoom lens are realized. That is, it is necessary for the third lens group G3 to have a strong power in order to miniaturize the zoom lens. At least two lenses having positive refractive powers are necessary in order to increase the power of the third lens group G3. in this case, chromatic aberration and variations in chromatic aberrations during camera shake correction which are generated in the third lens group G3 can be suppressed by the lens L32 having a negative refractive power. If the fixed third lens group is constituted only by three lenses, which is the minimum number of necessary lenses for the reasons stated above, reductions in the size and cost of the zoom lens can be realized.

The zoom lens of the present embodiment satisfies the aforementioned conditional formula:

$$0.8 < |f3IS/f3| < 2.6 \tag{1}$$

wherein f3IS is the focal length of the lens L34 as the movable third lens group, and f3 is the focal length of the third lens group G3.

Note that Table 31 shows the values related to Conditional Formula (1), as well as values related to the other Conditional Formulae (2) through (7) which were described previously for each of the Examples. As shown in Table 31, Conditional Formula (1) is satisfied in all of Examples 1 through 10. Correction of spherical aberration and comatic aberration is facilitated Conditional Formula (1) being satisfied. In addition, the configuration for preventing camera shake can be miniaturized. Therefore, the response properties for camera shake correcting operations can be improved, and further, power consumption can be reduced. Hereinafter, the reasons why these advantageous effects are obtained will be described.

Conditional Formula (1) defines the ratio between the focal length of the shake preventing movable third lens group and the focal length of the third lens group G3. As the power of the movable third lens group becomes excessively strong to a degree that the value of |f3IS/f3| becomes lower than the lower limit defined in Conditional Formula (1), it will become necessary to increase the power of the fixed third lens group accompanying the increase in the power of the movable third lens group, and correction of spherical aberration and comatic aberration will become difficult. Inversely, as the power of the movable third lens group becomes excessively weak to a degree that the value of |f3IS/f3| becomes greater than the upper limit defined in Conditional Formula (1), the amount of movement of the movable third lens group when correcting camera shake will increase, the effective diameter thereof will increase to secure peripheral light, and the configuration for preventing camera shake will become large.

As shown in Table 31, the present embodiment satisfies the following conditional formulae.

$$0.9 < |f3IS/f3| < 2.4 \tag{1-2}$$

$$1.0 < |f3IS/f3| < 2.3 \tag{1-3}$$

This applies to all of Examples 1 through 10. Thereby, the advantageous effects described above, which are obtained by satisfying Conditional Formula (1), become more prominent in the present embodiment.

As shown in Table 31, the zoom lens of the present embodiment also satisfies the conditional formulae:

$$1.2 < |f3IS/fw| < 3.5 \tag{2}$$

$$0.3 < |f3IS/ft| < 1.3 \tag{3}$$

wherein f3IS is the focal length of the lens L34 as the movable third lens group, fw is the focal length of the entire system at the wide angle end, and ft is the focal length of the entire system at the telephoto end. This applies to all of Examples 1 through 10. Thereby, variations in aberrations during camera shake correction can be suppressed, and the configuration for preventing camera shake can be miniaturized. Therefore, the response properties for camera shake correcting operations can be improved, and further, power consumption can be reduced. Hereinafter, the reasons why these advantageous effects are obtained will be described.

Conditional Formula (2) and Conditional Formula (3) define the ratio between the focal length of the shake preventing movable third lens group and the focal length of the entire system at the wide angle end and at the telephoto end, respectively. As the power of the movable third lens group becomes excessively strong to a degree that the values of |f3IS/fw| and |f3IS/ft| become lower than the lower limits defined in Conditional Formula (2) and Conditional Formula (3), variations in aberrations during camera shake correcting operations will become great. Inversely, as the power of the movable third lens group becomes excessively weak to a degree that the values of |f3IS/fw| and |f3IS/ft| become greater than the upper limits defined in Conditional Formula (2) and Conditional Formula (3), the amount of movement of the movable third lens group when correcting camera shake will increase, the effective diameter thereof will increase to secure peripheral light, and the configuration for preventing camera shake will become large.

As shown in Table 31, the present embodiment also satisfies all of the following conditional formulae.

$$1.3 < |f3IS/fw| < 3.4 \tag{2-2}$$

$$1.4 < |f3IS/fw| < 3.3 \tag{2-3}$$

$$0.4 < |f3IS/ft| < 1.1 \tag{3-2}$$

This applies to all of Examples 1 through 10. Thereby, the advantageous effects described above, which are obtained by satisfying Conditional Formula (2) and Conditional Formula (3), become more prominent in the present embodiment.

In the present embodiment, only a partial lens group within the fourth lens group G4 is a focusing lens group. Therefore, the load on a focusing drive system can be decreased, and an advantageous effect that automatic focusing operations can be accelerated if an automatic focusing configuration is applied is obtained. Particularly, the partial lens group is constituted only by a single lens L41 in the present embodiment. Therefore the above advantageous effect is more prominent.

In addition, the lens L41 of the fourth lens group has a refractive power, which is opposite in sign from the refractive power of the lens L42, which is fixed during focusing operations. Therefore, refractive power can be obtained efficiently as a focusing lens group, and the amount of movement during focusing operations can be suppressed. Further, an advantageous effect that various aberrations which are generated in each of the groups cancel each other out is obtained.

In addition, in the zoom lens of the present embodiment, the fourth lens group G4 has a positive refractive power, and the lens L41, which is the movable fourth lens group, has a positive refractive power. Therefore, miniaturization of the zoom lens is realized, and the amount of movement of the lens L41 during focusing operations can be suppressed. That is, it is preferable for the refractive power of the fourth lens group G4 to be positive as a whole from the viewpoint of miniaturization of the lens system. In addition, the power of the lens group can be made greater if a lens group having a positive refractive power is moved when performing focusing operations using a partial lens group within the fourth lens group G4. Therefore, the amount of movement of the lens during focusing operations can be decreased. Note that the above applies to all of the Examples except for Examples 2 and 4.

In addition, as shown in Table 31, the zoom lens of the present embodiment satisfies the conditional formula:

$$0.05<|f4F/f4|<1.00 \tag{4}$$

wherein f4F is the focal length of the lens L41 as the movable fourth lens group and f4 is the focal length of the fourth lens group G4. This applies to all of Examples 1 through 10.

Thereby, variations in spherical aberration and comatic aberration during focusing operations can be suppressed, and miniaturization of the zoom lens can be achieved. The reasons why these advantageous effects are obtained will be described below. Conditional Formula (4) defines the ratio of the focal length of the movable fourth lens group and the focal length of the entire fourth lens group G4. As the power of the movable fourth lens group becomes excessively strong to a degree that the value of |f4F/f4| becomes lower than the lower limit defined in Conditional Formula (4), suppressing variations in spherical aberration and comatic aberration becomes difficult. Inversely, as the power of the movable fourth lens group becomes excessively weak to a degree that the value of |f4F/f4| becomes greater than the upper limit defined in Conditional Formula (4), the amount of movement of the movable fourth lens group during focusing operations will increase, and the lens system will become large.

As shown in Table 31, the present embodiment satisfies the following conditional formula.

$$0.08<|f4F/f4|<0.90 \tag{4-2}$$

This applies to all of Examples 1 through 10. Thereby, the advantageous effects described above, which are obtained by satisfying Conditional Formula (4), become more prominent in the present embodiment.

In addition, in the zoom lens of the present embodiment, only the fifth lens group, which is constituted by the single lens L5 having a positive refractive power and which is fixed in the direction of the optical axis while changing magnification and during focusing operations, is provided as a lens group arranged more toward the image side than the fourth lens group G4. This configuration enables miniaturization of the zoom lens to be realized while maintaining telecentric properties. In addition, the lens L5 is fixed in the direction of the optical axis while changing magnification and during focusing operations. Therefore, the lens L5 can prevent dirt, dust, and the like from entering the interior of the lens system.

In addition, in the zoom lens of the present embodiment, the angle of view at the wide angle end is 70 degrees or greater (this point is common among Examples 1 through 10, as shown in Tables 2, 5, 8, 11, 14, 17, 20, 23, 26, and 29 to be described later), and satisfies the conditional formulae below, as shown in Table 31.

$$3.6<f1/fw<7.2 \tag{5}$$

$$1.2<f1/ft<2.6 \tag{6}$$

wherein f1 is the focal length of the first lens group G1, fw is the focal length of the entire system at the wide angle end, and ft is the focal length of the entire system at the telephoto end. Thereby, spherical aberration at the vicinity of the telephoto end can be suppressed, and miniaturization of the zoom lens can be realized. Hereinafter, the reasons why these advantageous effects can be obtained will be described.

Conditional Formula (5) and Conditional Formula (6) define the relationship between the focal length of the first lens group G1 and the focal length of the entire system at the wide angle end and at the telephoto end, respectively. As the power of the first lens group G1 becomes excessively strong to a degree that the values of f1/fw and f1/ft become lower than the lower limits defined in Conditional Formula (5) and Conditional Formula (6), the amount of spherical aberration at the vicinity of the telephoto end will increase. Inversely, as the power of the first lens group G1 becomes excessively weak to a degree that the values of f1/fw and f1/ft become greater than the upper limits defined in Conditional Formula (5) and Conditional Formula (6), the total length of the optical system will increase, and the lens system will become large.

Note that as shown in Table 31, the present embodiment satisfies the following conditional formulae.

$$3.9<f1/fw<6.7 \tag{5-2}$$

$$4.2<f1/fw<6.4 \tag{5-3}$$

$$1.3<f1/ft<2.4 \tag{6-2}$$

$$1.4<f1/ft<2.3 \tag{6-3}$$

This applies to all of Examples 1 through 10. Thereby, the advantageous effects described above, which are obtained by satisfying Conditional Formula (5) and Conditional Formula (6), become more prominent in the present embodiment.

In addition, as shown in Table 31, the zoom lens of the present embodiment satisfies the conditional formula:

$$0.15<BFw/TLw<0.42 \tag{7}$$

wherein TLw is the distance along the optical axis from the lens surface most toward the object side (the surface of the lens L11 toward the object side) to the lens surface most toward the image side (the surface of the lens L5 toward the image side) at the wide angle end, and BFw is the amount of back focus from the lens surface most toward the image side to an imaging surface as an air converted length at the wide angle end. Thereby, in the case that the present zoom lens is employed as an exchangeable lens for a so called mirrorless camera, a sufficient amount of space for arranging necessary mechanical systems can be secured, while miniaturization of the zoom lens can also be achieved. That is, Conditional Formula (7) defines the relationship between the lens most toward the object side to the lens most toward the image side at the wide angle end and the amount of backfocus. If the value of BFw/TLw is less than the lower limit defined in Conditional Formula (7), it will become difficult to secure space for arranging necessary mechanical systems. Inversely, if the value of BFw/TLw is greater than the upper limit defined in Conditional Formula (7), the lens system will become large.

As shown in Table 31, the present embodiment satisfies the following conditional formulae.

$$0.18<BFw/TLw<0.40 \tag{7-2}$$

$$0.20<BFw/TLw<0.37 \tag{7-3}$$

This applies to all of Examples 1 through 10. Thereby, the advantageous effects described above, which are obtained by satisfying Conditional Formula (7), become more prominent in the present embodiment.

Note that FIG. 1 illustrates an example in which the optical member PP is provided between the lens system and the imaging surface Sim. Alternatively, various filters such as low pass filters and filters that cut off specific wavelength bands may be provided among each of the lenses. As a further alternative, coatings that have the same functions as the various filters may be administered on the surfaces of the lenses.

In addition, a description has been given above mainly of the example illustrated in FIG. 1. However, the number of lenses that constitute each of the lens group and the shapes of the lenses in the zoom lens of the present invention are not limited to those of the example illustrated in FIG. 1, and other configurations may be adopted. In addition, arbitrary combinations of the preferred configurations and the possible configurations described above are possible. It is preferable for the configurations to be selectively adopted as appropriate, according to specifications required of the zoom lens.

Next, examples of numerical values of the zoom lens of the present invention will be described.

Example 1

The zoom lens of Example 1 is of the configuration illustrated in FIG. 1. The zoom lens of the present example is of a five group configuration substantially consisting of the first lens group G1, the second lens group G2, the third lens group G3, the fourth lens group G4, and the fifth lens group G5, provided in this order from the object side. The signs of the refractive powers of the lens groups are positive, negative, positive, positive, and positive, in this order from the first lens group G1. The first lens group G1 through the fourth lens group G4 move along the optical axis Z while changing magnification, and the third lens group G3 and the fourth lens group G4 move integrally. In addition, the shake preventing lens (movable third lens group) is the lens L34 within the third lens group G3, and the focusing lens (movable fourth lens group) is the lens L41, which has a positive refractive power, within the fourth lens group G4.

Basic lens data of Example 1 are shown in Table 1, items and variable distances among surfaces of Example 1 are shown in Table 2, and aspherical surface coefficients of Example 1 are shown in Table 3.

In the basic lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, the distances between an ith surface and an i+1st surface along the optical axis Z are shown in the column Di. Note that the signs of the radii of curvature are positive in cases that the surface shape is convex toward the object side, and negative in cases that the surface shape is convex toward the image side. The refractive indices of jth (j=1, 2, 3, . . . ) constituent elements that sequentially increase from the object side to the image side, with the lens at the most object side designated as first, with respect to the d line (wavelength: 587.56 nm) are shown in the column Ndj. The Abbe's numbers of the jth constituent element with respect to the d line are shown in the column vdj. Note that the aperture stop St is also included in the basic lens data, and the radius of curvature of the surface corresponding to the aperture stop St is shown as "∞".

DD[3], DD[9], and DD[21] in Column Di of Table 1 are the distances between surfaces that change while changing magnification. DD[3] is the distance between the first lens group G1 and the second lens group G2, DD[9] is the distance between the second lens group G2 and the aperture stop St, and DD[21] is the distance between the fourth lens group G4 and the fifth lens group G5.

Table 2 shows various items with respect to the d line and the values of the above variable distances among surfaces at the wide angle end, an intermediate focal distance (abbreviated to "Intermediate" in Table 2, etc.), and at the telephoto end. The item "Focal Length" in Table 2 is the focal length of the entire system, the item. "F No." is the F number, and the item. "2 ω" is the full angle of view (in units of degrees).

In the lens data of Table 1, surface numbers of aspherical surfaces are denoted with the mark "*", and radii of curvature of paraxial regions are shown as the radii of curvature of the aspherical surfaces. The aspherical surface data of Table 3 show the surface numbers of the aspherical surfaces, and the aspherical surface coefficients related to each of the aspherical surfaces. In the numerical values of the aspherical surface data of Table 3, "E-n (n: integer)" means "·10$^{-n}$". Note that the aspherical surface coefficients are the values of the coefficients KA and Am (m=3, 4, 5, . . . , 20) in the following aspherical surface formula:

$$Zd = C \cdot h^2 / \{1 + (1 - KA \cdot C^2 \cdot h^2)^{1/2}\} + \Sigma Am \cdot h^m$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Am are aspherical surface coefficients (m=1, 2, 3, . . . , 20).

Table 1 through Table 3 show numerical values which are rounded off at a predetermined number of digits. In addition, mm are used as the units for lengths in the data of the tables below. However, it is possible for optical systems to be proportionately enlarged or proportionately reduced and utilized. Therefore, other appropriate units may be used.

TABLE 1

Example 1: Lens Data

| Si (Surface Number) | Ri (Radius of Curvature) | Di (Distance) | Ndj (Refractive Index) | Ndj (Abbe's Number) |
|---|---|---|---|---|
| 1 | 51.2772 | 1.37 | 1.92286 | 18.90 |
| 2 | 34.9710 | 5.20 | 1.83481 | 42.73 |
| 3 | 170.9704 | DD[3] | | |
| 4 | 45.0553 | 1.00 | 1.88300 | 40.76 |
| 5 | 10.3764 | 6.20 | | |
| *6 | −74.2538 | 1.05 | 1.58254 | 59.47 |
| *7 | 24.3554 | 0.10 | | |
| 8 | 18.4578 | 2.50 | 1.94595 | 17.98 |
| 9 | 41.9811 | DD[9] | | |
| 10 (aperture stop) | ∞ | 1.30 | | |
| *11 | 21.0609 | 3.30 | 1.80348 | 40.44 |
| *12 | −81.0221 | 1.56 | | |
| 13 | ∞ | 0.71 | 1.80000 | 29.84 |
| 14 | 13.1140 | 4.50 | 1.49700 | 81.54 |
| 15 | −13.1140 | 2.32 | | |
| *16 | −49.8789 | 1.00 | 1.58517 | 59.41 |
| *17 | 38.0025 | 5.20 | | |
| 18 | 48.9365 | 3.10 | 1.61800 | 63.33 |
| 19 | −26.6016 | 3.60 | | |
| 20 | −18.1159 | 0.80 | 1.54072 | 47.23 |
| 21 | ∞ | DD[21] | | |
| 22 | ∞ | 2.80 | 1.71299 | 53.87 |
| 23 | −65.0336 | 11.95 | | |
| 24 | ∞ | 2.85 | 1.51680 | 64.20 |
| 25 | ∞ | | | |

TABLE 2

Example 1: Items (related to d Line)

|  | Wide Angle End | Intermediate | Telephoto End |
|---|---|---|---|
| Zoom Magnification | 1.000 | 1.697 | 2.946 |
| Focal Length | 16.49 | 27.98 | 48.56 |
| F No. | 3.60 | 4.54 | 5.59 |
| 2ω (°) | 89.6 | 54.8 | 32.2 |
| DD[3] | 0.70 | 8.67 | 22.21 |
| DD[9] | 14.58 | 7.72 | 3.40 |
| DD[21] | 2.20 | 13.24 | 25.01 |

TABLE 3

Example 1: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | 4.0933323E−04 | −1.2811739E−04 | 8.4079418E−05 |
| A4 | −6.0888867E−04 | −2.6404611E−04 | −1.5884117E−04 |
| A5 | 1.4419977E−04 | 4.0381724E−05 | 5.0163675E−05 |
| A6 | −1.4619676E−05 | 5.5734993E−07 | −8.3478199E−06 |
| A7 | 8.0416169E−08 | −6.1603008E−07 | −2.0759316E−06 |
| A8 | 6.1299999E−08 | −1.5625782E−09 | 8.7628996E−07 |
| A9 | 3.1292229E−09 | 6.4187304E−09 | −1.0381980E−07 |
| A10 | −1.7635605E−10 | 5.3217493E−10 | 3.9240483E−09 |
| A11 | −4.1002904E−11 | −1.9789871E−11 | −6.6439218E−10 |
| A12 | −3.4140583E−12 | −9.6388463E−12 | 5.2203771E−11 |
| A13 | −6.6094040E−14 | −1.0319722E−12 | 3.0635548E−11 |
| A14 | 2.4538915E−14 | −1.3216914E−14 | 1.2779807E−12 |
| A15 | 3.2551846E−15 | 1.0643318E−14 | −9.2825959E−13 |
| A16 | 3.5301237E−16 | 1.7477013E−15 | −1.4403526E−13 |
| A17 | −2.5050314E−17 | 1.1109141E−16 | −1.4596389E−14 |
| A18 | 3.1545594E−19 | −1.3183865E−17 | 4.0192223E−15 |
| A19 | −1.0455552E−19 | −2.3211123E−18 | 1.7353656E−15 |
| A20 | −1.2392007E−20 | 1.1419089E−19 | −2.0085297E−16 |

| | Surface Number | | |
|---|---|---|---|
| | 12 | 16 | 17 |
| KA | 1.0000000E+00 | 1.0000000E+00 | 1.0000000E+00 |
| A3 | 4.9336044E−05 | −2.2718447E−04 | 6.8549524E−05 |
| A4 | 1.6565053E−05 | 2.5114346E−04 | 8.8501534E−05 |
| A5 | −4.7377075E−05 | −4.9965869E−05 | −6.2564615E−06 |
| A6 | 2.7376819E−05 | 1.9673561E−06 | 5.6102257E−07 |
| A7 | −6.0241034E−06 | 8.9571158E−07 | −1.6412544E−07 |
| A8 | 2.5511112E−07 | 8.1475858E−08 | 7.8367930E−09 |
| A9 | −7.2866935E−09 | −8.8732257E−09 | 8.2051813E−09 |
| A10 | 2.0274318E−08 | −4.0745601E−09 | 1.6270042E−09 |
| A11 | −1.7781414E−10 | −6.4029472E−10 | 1.0734148E−10 |
| A12 | −5.0079019E−10 | −3.1160921E−11 | −3.2465246E−11 |
| A13 | −7.4718603E−11 | 1.2425429E−11 | −1.3240197E−11 |
| A14 | 7.0374446E−12 | 4.5091154E−12 | −2.7277581E−12 |
| A15 | 5.8406459E−12 | 7.7613196E−13 | −2.9460504E−13 |
| A16 | −8.2374230E−13 | 5.1227760E−14 | 1.8727986E−14 |
| A17 | −2.0827410E−14 | −1.5128955E−14 | 1.9093148E−14 |
| A18 | 2.2352161E−15 | −6.5219152E−15 | 4.9610731E−15 |
| A19 | 1.2506994E−15 | −9.7400580E−16 | 4.8546866E−16 |
| A20 | −8.5927388E−17 | 2.4600407E−16 | −2.1226761E−16 |

The spherical aberration, the astigmatic aberration, the distortion, and the lateral chromatic aberration of the zoom lens of Example 1 at the wide angle end are illustrated in A through D of FIG. 13, respectively. The spherical aberration, the astigmatic aberration, the distortion, and the lateral chromatic aberration of the zoom lens of Example 1 at the intermediate focal distance are illustrated in E through H of FIG. 13, respectively. The spherical aberration, the astigmatic aberration, the distortion, and the lateral chromatic aberration of the zoom lens of Example 1 at the telephoto end are illustrated in I through L of FIG. 13, respectively. The aberrations illustrated in A through L of FIG. 13 are all for a state in which the zoom lens of Example 1 is focused on an object at infinity.

Each of the diagrams that illustrate the aberrations are related to the d line. However, the diagrams that illustrate spherical aberration also show aberrations related to the C line (wavelength: 656.27 nm), the F line (wavelength: 486.13 nm), and the g line (wavelength: 435.84 nm). In addition, the diagrams that illustrate lateral chromatic aberration also show aberrations related to the C line, the F line, and the g line. In the diagrams that illustrate astigmatic aberrations, aberrations in the sagittal direction are indicated by solid lines denoted by (S), while aberrations in the tangential direction are indicated by broken lines denoted by (T). In the diagrams that illustrate spherical aberrations, "Fno." denotes F values. In the other diagrams that illustrate the aberrations, ω denotes half angles of view.

A through J of FIG. 23 illustrate lateral aberration of the zoom lens of Example 1 at the wide angle end. Here, the aberrations are illustrated in two columns to the right and left. The diagrams in the left column illustrate aberrations related to the tangential direction, and the diagrams in the right column illustrate aberrations related to the sagittal direction. In addition, the diagrams at the upper half illustrate aberrations when camera shake is not corrected, and the diagrams at the lower half illustrate aberrations when camera shake, in which the optical axis is tilted by 0.3 degrees, is corrected. In FIG. 23, A shows the aberration at the center of the imaging surface, B and C show aberrations at positions 80% of a maximum image height toward a + side, and D and E show aberrations at positions 80% of a maximum image height toward a − side, when camera shake is not corrected. F shows the aberration at the center of the imaging surface, G and H show aberrations at positions 80% of a maximum image height toward a + side, and I and J show aberrations at positions 80% of a maximum image height toward a − side, when camera shake is corrected.

A through J of FIG. 24 illustrate lateral aberration of the zoom lens of Example 1 at the intermediate focal length. A through J of FIG. 25 illustrate lateral aberration of the zoom lens of Example 1 at the telephoto end. The manners in which the aberrations are illustrated in these figures are the same as those in A through J of FIG. 23 described above.

Note that FIG. 23 through FIG. 25 show lateral aberrations related to the d line, the C line, the F line, and the g line. In addition, the lateral aberrations are all for a state in which the zoom lens is focused on an object at infinity. In the diagrams that illustrate the aberrations, ω denotes a half angle of view.

The symbols, the meanings, and the manner in which the data are shown in the description of Example 1 above are the same for the following Examples to be described later, unless particularly noted. Therefore, redundant descriptions thereof will be omitted below.

Example 2

The zoom lens of Example 2 is of the configuration illustrated in FIG. 2. The zoom lens of the present example is of a four group configuration, substantially constituted by a first lens group G1, a second lens group G2, a third lens group G3, and a fourth lens group G4, provided in this order from the object side. The signs of the refractive powers of the lens groups are positive, negative, positive, and positive, in this order from the first lens group G1. The first lens group G1 through the fourth lens group G4 move along the optical axis Z while changing magnification, and the third lens group G3 and the fourth lens group G4 move along different paths. In addition, the shake preventing lens is a lens L34 within the third lens group G3, and the focusing lens is a lens L42 and a lens L43, which are cemented together and have a negative refractive power as a whole, within the fourth lens group G4.

The zoom lens of Example 2 differs from that of Example 1 in that it is of a four group configuration, and that the fourth lens group G4 is constituted by three lenses, which are a lens L41 having a positive refractive power, the lens L42 having a negative refractive power, and the lens L43 having a positive refractive power. As described above, the lenses L42 and L43 constitute the movable fourth lens group that moves along the optical axis Z during focusing operations, and the lens L41 constitutes the fixed fourth lens group which is fixed with respect to the direction of the optical axis Z during focusing operations. Note that the movable fourth lens group of Example 2 differs from that of Example 1 in that it has a negative refractive power.

Basic lens data of Example 2 are shown in Table 4, items and variable distances among surfaces of Example 2 are shown in Table 5, and aspherical surface coefficients of Example 2 are shown in Table 6.

TABLE 4

Example 2: Lens Data

| Si (Surface Number) | Ri (Radius of Curvature) | Di (Distance) | Ndj (Refractive Index) | Ndj (Abbe's Number) |
|---|---|---|---|---|
| 1 | 57.7440 | 1.36 | 1.92286 | 18.90 |
| 2 | 37.8187 | 6.58 | 1.83481 | 42.73 |
| 3 | 296.5015 | DD[3] | | |
| 4 | 124.9944 | 1.00 | 1.61605 | 44.22 |
| 5 | 10.3118 | 6.30 | | |
| *6 | −214748.3648 | 1.05 | 1.69098 | 52.95 |
| *7 | 17.9662 | 0.78 | | |
| 8 | 17.8450 | 2.20 | 1.92286 | 18.90 |
| 9 | 37.0587 | DD[9] | | |
| 10 (aperture stop) | ∞ | 1.30 | | |
| *11 | 15.9066 | 2.80 | 1.80348 | 40.44 |
| *12 | −214748.3648 | 1.26 | | |
| 13 | −45.9992 | 0.71 | 1.67270 | 32.10 |
| 14 | 13.6486 | 4.00 | 1.49700 | 81.54 |
| 15 | −11.8787 | 3.81 | | |
| 16 | −60.6858 | 0.70 | 1.77250 | 49.60 |
| 17 | 37.9994 | DD[17] | | |
| *18 | 26.1687 | 4.00 | 1.69098 | 52.95 |
| *19 | −37.4720 | 1.00 | | |
| 20 | −37.2319 | 0.81 | 1.86985 | 41.02 |
| 21 | 28.1637 | 2.91 | 1.51999 | 51.35 |
| 22 | −55.2020 | DD[22] | | |
| 23 | ∞ | 2.85 | 1.51680 | 64.20 |
| 24 | ∞ | | | |

TABLE 5

Example 2: Items (related to d Line)

| | Wide Angle End | Intermediate | Telephoto End |
|---|---|---|---|
| Zoom Magnification | 1.000 | 1.697 | 2.880 |
| Focal Length | 18.57 | 31.52 | 53.49 |
| F No. | 3.90 | 4.57 | 5.35 |
| 2ω (°) | 82.6 | 48.4 | 28.8 |
| DD[3] | 1.25 | 13.59 | 26.09 |
| DD[9] | 13.07 | 6.27 | 1.50 |
| DD[17] | 6.32 | 5.67 | 6.20 |
| DD[22] | 14.00 | 21.94 | 30.50 |

TABLE 6

Example 2: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | 7.7294095E−04 | 4.5925205E−04 | 5.1822713E−05 |
| A4 | −8.2564030E−04 | −6.4596398E−04 | −1.7928966E−05 |
| A5 | 1.5972175E−04 | 1.0110441E−04 | 5.0025256E−05 |
| A6 | −1.3654064E−05 | −3.5237294E−06 | −8.1365150E−06 |
| A7 | −1.3147131E−08 | −7.2951097E−07 | −1.8257291E−06 |
| A8 | 5.1131495E−08 | 9.8415985E−09 | 9.2380447E−07 |
| A9 | 2.8424922E−09 | 8.6622861E−09 | −1.0318270E−07 |
| A10 | −7.9589785E−11 | 6.6114284E−10 | 2.4485261E−09 |
| A11 | −1.9129804E−11 | −2.5366154E−11 | −9.8842555E−10 |
| A12 | −1.6404664E−12 | −1.1309807E−11 | 1.3106614E−11 |
| A13 | −3.0627354E−14 | −1.2151014E−12 | 3.1547325E−11 |
| A14 | −3.9737941E−15 | −1.1577556E−14 | 3.7271694E−12 |
| A15 | −9.1532184E−16 | 1.2276725E−14 | −3.3313081E−13 |
| A16 | −7.3953235E−17 | 2.0033109E−15 | −7.5200539E−14 |
| A17 | −1.5155446E−17 | 1.0290470E−16 | −1.5656797E−14 |
| A18 | 5.7751296E−18 | −1.7088399E−17 | 1.8010040E−16 |
| A19 | 6.8530249E−19 | −3.0811222E−18 | 6.1160991E−16 |
| A20 | −6.4107984E−20 | 2.2320180E−19 | −4.2102553E−17 |

| | Surface Number | | |
|---|---|---|---|
| | 12 | 18 | 19 |
| KA | 1.0000000E+00 | 1.0000000E+00 | 1.0000000E+00 |
| A3 | 1.0543595E−04 | 2.9904450E−04 | 3.7579612E−04 |
| A4 | 1.4953608E−04 | −1.6447355E−04 | −1.2858181E−04 |
| A5 | −3.1341644E−05 | 4.7685221E−05 | 3.2353339E−05 |
| A6 | 2.6620034E−05 | −7.1990642E−06 | −5.5731177E−06 |
| A7 | −5.7862017E−06 | 4.7821369E−07 | 1.1541917E−06 |
| A8 | 2.7147304E−07 | −7.0083687E−08 | −1.8751492E−07 |
| A9 | −7.6528715E−09 | 2.4434743E−08 | 7.4584887E−09 |
| A10 | 1.9686884E−08 | −2.5285971E−09 | 7.6904217E−10 |
| A11 | −3.2779039E−10 | 3.1135956E−11 | 3.0514843E−10 |
| A12 | −4.9803502E−10 | −2.5915804E−11 | −4.8476910E−11 |
| A13 | −7.1983315E−11 | 5.8328269E−12 | −2.5060090E−12 |
| A14 | 7.3771456E−12 | −9.3790369E−14 | −2.2604863E−13 |
| A15 | 6.0592732E−12 | −3.8333527E−14 | 1.8385382E−13 |
| A16 | −8.0935524E−13 | 2.2304854E−15 | −1.3189289E−14 |
| A17 | −1.6013761E−14 | 2.0129850E−17 | −7.9987896E−17 |
| A18 | −1.1186185E−15 | −1.9021524E−18 | 6.7535924E−18 |
| A19 | 1.3728031E−15 | −9.8623991E−19 | 1.4541716E−18 |
| A20 | −8.4223117E−17 | 7.1041251E−20 | −3.2721937E−20 |

A through L of FIG. 14 are diagrams that illustrate aberrations of the zoom lens of Example 2 (the types of aberrations are the same as those shown for Example 1). In addition, FIG. 26 through FIG. 28 are collections of diagrams that illustrate lateral aberrations of the zoom lens of Example 2.

Example 3

The zoom lens of Example 3 is of the configuration illustrated in FIG. 3. The zoom lens of the present example is of a five group configuration, substantially constituted by a first lens group G1, a second lens group G2, a third lens group G3, a fourth lens group G4, and a fifth lens group G5, provided in this order from the object side. The signs of the refractive powers of the lens groups are positive, negative, positive, positive, and positive, in this order from the first lens group G1. The first lens group G1 through the fourth lens group G4 move along the optical axis Z while changing magnification, and the third lens group G3 and the fourth lens group G4 move along mutually different paths. In addition, the shake preventing lens is a lens L34 within the third lens group G3, and the focusing lens is a lens L41, which has a positive refractive power, within the fourth lens group G4.

The zoom lens of Example 3 differs from that of Example 1 in that the fourth lens group G4 is constituted by three lenses, which are the lens L41 having a positive refractive power, a lens L42 having a negative refractive power, and a lens L43 having a positive refractive power. Note that the lens L42 and the lens L43 are cemented together. As described above, the lens L41 constitutes the movable fourth lens group that moves along the optical axis Z during focusing operations, and the lens L42 and the lens L43 constitute the fixed fourth lens group which is fixed with respect to the direction of the optical axis Z during focusing operations.

Basic lens data of Example 3 are shown in Table 7, items and variable distances among surfaces of Example 3 are shown in Table 8, and aspherical surface coefficients of Example 3 are shown in Table 9.

TABLE 7

Example 3: Lens Data

| Si (Surface Number) | Ri (Radius of Curvature) | Di (Distance) | Ndj (Refractive Index) | Ndj (Abbe's Number) |
|---|---|---|---|---|
| 1 | 61.5783 | 1.36 | 1.92286 | 18.90 |
| 2 | 41.2501 | 5.20 | 1.83481 | 42.73 |
| 3 | 282.4552 | DD[3] | | |
| 4 | 125.0032 | 1.00 | 1.79952 | 42.22 |
| 5 | 10.1000 | 5.00 | | |
| *6 | −90.9225 | 1.05 | 1.69098 | 52.95 |
| *7 | 31.0796 | 1.00 | | |
| 8 | 21.5693 | 2.30 | 1.92286 | 18.90 |
| 9 | 83.5335 | DD[9] | | |
| 10 (aperture stop) | ∞ | 1.30 | | |
| *11 | 13.1073 | 3.30 | 1.80348 | 40.44 |
| *12 | 56.5788 | 1.39 | | |
| 13 | ∞ | 0.71 | 1.82000 | 30.04 |
| 14 | 12.0002 | 4.00 | 1.49700 | 81.54 |
| 15 | −11.8769 | 2.35 | | |
| *16 | −27.4560 | 1.00 | 1.52000 | 61.58 |
| *17 | 38.0004 | DD[17] | | |
| 18 | 44.7479 | 2.70 | 1.82001 | 46.00 |
| 19 | −42.8808 | 2.80 | | |
| 20 | −51.1632 | 0.81 | 1.91999 | 35.85 |
| 21 | 18.4604 | 3.85 | 1.65328 | 46.59 |
| 22 | −163.1412 | DD[22] | | |
| 23 | 690.9746 | 2.80 | 1.82001 | 29.41 |
| 24 | −80.6625 | 11.83 | | |
| 25 | ∞ | 2.85 | 1.51680 | 64.20 |
| 26 | ∞ | | | |

TABLE 8

Example 3: Items (related to d Line)

| | Wide Angle End | Intermediate | Telephoto End |
|---|---|---|---|
| Zoom Magnification | 1.000 | 1.697 | 2.880 |
| Focal Length | 16.51 | 28.02 | 47.56 |
| F No. | 3.72 | 4.59 | 5.88 |
| 2ω (°) | 89.4 | 53.2 | 32.2 |
| DD[3] | 0.60 | 12.50 | 24.46 |
| DD[9] | 14.59 | 7.91 | 3.32 |
| DD[17] | 4.19 | 3.33 | 3.99 |
| DD[22] | 2.70 | 13.08 | 25.83 |

TABLE 9

Example 3: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | 7.4785900E−04 | 2.1293827E−04 | 1.0381820E−04 |
| A4 | −3.8511548E−04 | −1.0365716E−04 | 9.2860416E−07 |
| A5 | 1.2340891E−04 | 3.8564009E−05 | 4.8081294E−05 |
| A6 | −1.4512216E−05 | −2.1298303E−06 | −7.7314559E−06 |
| A7 | 4.9224626E−08 | −7.2696706E−07 | −1.7752078E−06 |
| A8 | 5.3518837E−08 | 9.2784549E−09 | 9.2532487E−07 |
| A9 | 2.8922399E−09 | 8.6442641E−09 | −1.0316617E−07 |
| A10 | −7.8957464E−11 | 6.6011495E−10 | 2.4425214E−09 |
| A11 | −1.9206809E−11 | −2.5525493E−11 | −9.8916429E−10 |
| A12 | −1.6348369E−12 | −1.1352522E−11 | 1.3256142E−11 |
| A13 | −3.3429455E−14 | −1.2247058E−12 | 3.1494408E−11 |
| A14 | −3.9515096E−15 | −1.3071678E−14 | 3.7348836E−12 |
| A15 | −9.1699908E−16 | 1.2100724E−14 | −3.3468939E−13 |
| A16 | −7.5966032E−17 | 1.9911078E−15 | −7.6643602E−14 |
| A17 | −1.6190291E−17 | 1.0141975E−16 | −1.5163312E−14 |
| A18 | 5.6101218E−18 | −1.7212489E−17 | 2.1727072E−16 |
| A19 | 6.4367634E−19 | −3.0594651E−18 | 5.9839667E−16 |
| A20 | −6.7743491E−20 | 2.2981883E−19 | −4.2061157E−17 |

| | Surface Number | | |
|---|---|---|---|
| | 12 | 16 | 17 |
| KA | 1.0000000E+00 | 1.0000000E+00 | 1.0000000E+00 |
| A3 | 1.2113318E−04 | 2.2290873E−04 | 4.6872091E−04 |
| A4 | 2.4221227E−04 | 1.8292345E−04 | 1.1372783E−04 |
| A5 | −4.4443486E−05 | −2.1345397E−05 | −1.6205183E−05 |
| A6 | 2.9023972E−05 | 6.6217683E−07 | 8.8563646E−07 |
| A7 | −5.7680614E−06 | 5.2310995E−08 | −9.0066027E−09 |
| A8 | 2.7110882E−07 | 6.7350078E−10 | −4.0820770E−10 |
| A9 | −7.5444010E−09 | −8.7617762E−11 | 1.6847526E−12 |
| A10 | 1.9721811E−08 | −1.8942134E−11 | −2.8907405E−13 |
| A11 | −3.2064288E−10 | −3.2360604E−12 | −6.4367525E−13 |
| A12 | −4.9623176E−10 | −6.0826403E−13 | −2.5778150E−13 |
| A13 | −7.1902252E−11 | −1.0820730E−13 | −5.8465844E−14 |
| A14 | 7.3125974E−12 | 1.5610409E−15 | −1.9680330E−14 |
| A15 | 6.0575799E−12 | −3.4749193E−15 | −2.0261786E−15 |
| A16 | −8.0617308E−13 | 1.6660313E−15 | −1.1052586E−15 |
| A17 | −1.7690125E−14 | 8.9433027E−16 | 2.6566406E−16 |
| A18 | −1.1384313E−15 | 1.2976631E−16 | 1.3555140E−16 |
| A19 | 1.3698153E−15 | −7.9414254E−18 | 4.7565782E−18 |
| A20 | −8.3488036E−17 | 9.1426388E−18 | −4.1234085E−19 |

A through L of FIG. 15 are diagrams that illustrate aberrations of the zoom lens of Example 3 (the types of aberrations are the same as those shown for Example 1). In addition, FIG. 29 through FIG. 31 are collections of diagrams that illustrate lateral aberrations of the zoom lens of Example 3.

Example 4

The zoom lens of Example 4 is of the configuration illustrated in FIG. 4. The zoom lens of the present example is of a five group configuration, substantially constituted by a first lens group G1, a second lens group G2, a third lens group G3, a fourth lens group G4, and a fifth lens group G5, provided in this order from the object side. The signs of the refractive powers of the lens groups are positive, negative, positive, negative, and positive, in this order from the first lens group G1. The first lens group G1 through the fourth lens group G4 move along the optical axis Z while changing magnification, and the third lens group G3 and the fourth lens group G4 move along mutually different paths. In addition, the shake preventing lens is a lens L34 within the third lens group G3, and the focusing lens is a lens L41, which has a positive refractive power, within the fourth lens group G4.

The zoom lens of Example 4 differs from that of Example 1 in that the fourth lens group G4 is constituted by three lenses, which are the lens L41 having a positive refractive power, a lens L42 having a negative refractive power, and a lens L43 having a positive refractive power. In addition, the zoom lens of Example 4 differs from the zoom lens of Example 1 in that the fourth lens group G4 has a negative refractive power. Note that the lens L42 and the lens L43 are cemented together. As described above, the lens L41 constitutes the movable fourth lens group that moves along the optical axis Z during focusing operations, and the lens L42 and the lens L43 constitute the fixed fourth lens group which is fixed with respect to the direction of the optical axis Z during focusing operations.

Basic lens data of Example 4 are shown in Table 10, items and variable distances among surfaces of Example 4 are shown in Table 11, and aspherical surface coefficients of Example 4 are shown in Table 12.

TABLE 10

Example 4: Lens Data

| Si (Surface Number) | Ri (Radius of Curvature) | Di (Distance) | Ndj (Refractive Index) | Ndj (Abbe's Number) |
|---|---|---|---|---|
| 1 | 52.8897 | 1.36 | 1.92286 | 18.90 |
| 2 | 36.6763 | 5.85 | 1.83481 | 42.73 |
| 3 | 231.2250 | DD[3] | | |
| 4 | 239.5412 | 1.00 | 1.57255 | 46.66 |
| 5 | 9.4329 | 5.40 | | |
| *6 | −71.0610 | 1.05 | 1.69098 | 52.95 |
| *7 | 31.9923 | 0.98 | | |
| 8 | 18.2993 | 2.50 | 1.92286 | 18.90 |
| 9 | 40.0557 | DD[9] | | |
| 10 (aperture stop) | ∞ | 1.30 | | |
| *11 | 14.7042 | 3.17 | 1.80348 | 40.44 |
| *12 | −18058.4014 | 1.20 | | |
| 13 | −120.4608 | 0.71 | 1.78806 | 29.89 |
| 14 | 12.4887 | 4.00 | 1.49700 | 81.54 |
| 15 | −11.2086 | 2.22 | | |
| *16 | −27.6939 | 1.00 | 1.52660 | 50.01 |
| *17 | 38.0902 | DD[17] | | |
| 18 | 58.9816 | 2.00 | 1.83481 | 42.73 |
| 19 | −520.4819 | 2.53 | | |
| 20 | −50.0000 | 0.81 | 1.70119 | 43.87 |
| 21 | 18.8358 | 3.45 | 1.55322 | 46.62 |
| 22 | −170.7420 | DD[22] | | |
| 23 | 219.9085 | 3.50 | 1.82001 | 46.00 |
| 24 | −50.1713 | 11.83 | | |
| 25 | ∞ | 2.85 | 1.51680 | 64.20 |
| 26 | ∞ | | | |

TABLE 11

Example 4: Items (related to d Line)

| | Wide Angle End | Intermediate | Telephoto End |
|---|---|---|---|
| Zoom Magnification | 1.000 | 1.697 | 2.880 |
| Focal Length | 18.71 | 31.75 | 53.88 |
| F No. | 3.66 | 4.57 | 5.66 |
| 2ω (°) | 78.8 | 47.2 | 28.6 |
| DD[3] | 0.69 | 12.93 | 23.82 |
| DD[9] | 13.65 | 7.94 | 3.14 |
| DD[17] | 4.51 | 3.44 | 10.66 |
| DD[22] | 2.70 | 13.75 | 18.90 |

TABLE 12

Example 4: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | 1.1226798E−03 | 6.7195885E−04 | 4.5461831E−05 |
| A4 | −3.8564194E−04 | −1.3185089E−04 | −5.7407020E−06 |
| A5 | 1.2137631E−04 | 4.3061483E−05 | 4.5857337E−05 |
| A6 | −1.4289329E−05 | −2.2295572E−06 | −7.6292304E−06 |
| A7 | 5.8213397E−08 | −7.3238545E−07 | −1.7726490E−06 |
| A8 | 5.3737431E−08 | 9.1424682E−09 | 9.2537976E−07 |
| A9 | 2.8964211E−09 | 8.6418958E−09 | −1.0316027E−07 |
| A10 | −7.8898657E−11 | 6.6011858E−10 | 2.4436703E−09 |
| A11 | −1.9207672E−11 | −2.5518338E−11 | −9.8892942E−10 |
| A12 | −1.6351028E−12 | −1.1351329E−11 | 1.3302531E−11 |
| A13 | −3.3461424E−14 | −1.2245323E−12 | 3.1500916E−11 |
| A14 | −3.9545394E−15 | −1.3045350E−14 | 3.7358735E−12 |
| A15 | −9.1675530E−16 | 1.2104672E−14 | −3.3455455E−13 |
| A16 | −7.5827104E−17 | 1.9914221E−15 | −7.6682476E−14 |
| A17 | −1.6152806E−17 | 1.0146231E−16 | −1.5182109E−14 |
| A18 | 5.6170925E−18 | −1.7214886E−17 | 2.1400155E−16 |
| A19 | 6.4649293E−19 | −3.0607754E−18 | 5.9772514E−16 |
| A20 | −6.7315781E−20 | 2.2936106E−19 | −4.2162123E−17 |

| | Surface Number | | |
|---|---|---|---|
| | 12 | 16 | 17 |
| KA | 1.0000000E+00 | 1.0000000E+00 | 1.0000000E+00 |
| A3 | 4.9623662E−05 | 4.6038381E−04 | 7.0656210E−04 |
| A4 | 2.2012486E−04 | 2.4772911E−04 | 2.0257119E−04 |
| A5 | −4.5625355E−05 | −1.9987331E−05 | −1.7151278E−05 |
| A6 | 2.8931764E−05 | 7.0597078E−07 | 8.3584220E−07 |
| A7 | −5.7697121E−06 | 5.2978059E−08 | −9.6677392E−09 |
| A8 | 2.7104865E−07 | 6.9343035E−10 | −4.1480571E−10 |
| A9 | −7.5548144E−09 | −8.4468838E−11 | 1.5203590E−12 |
| A10 | 1.9719516E−08 | −1.8240997E−11 | −3.0816249E−13 |
| A11 | −3.2111779E−10 | −3.0868952E−12 | −6.4901350E−13 |
| A12 | −4.9630894E−10 | −5.7214547E−13 | −2.5725504E−13 |
| A13 | −7.1913837E−11 | −1.0429775E−13 | −5.9786563E−14 |
| A14 | 7.3099972E−12 | 3.0278047E−15 | −1.9299356E−14 |
| A15 | 6.0581000E−12 | −2.8819991E−15 | −1.9539576E−15 |
| A16 | −8.0595718E−13 | 1.6101994E−15 | −1.0484936E−15 |
| A17 | −1.7616506E−14 | 8.7033055E−16 | 3.2516598E−16 |
| A18 | −1.1096928E−15 | 1.3127122E−16 | 1.2992905E−16 |
| A19 | 1.3700330E−15 | −8.0137454E−18 | 4.7060246E−18 |
| A20 | −8.3154163E−17 | 8.8089521E−18 | −3.8411509E−19 |

A through L of FIG. 16 are diagrams that illustrate aberrations of the zoom lens of Example 4 (the types of aberrations are the same as those shown for Example 1). In addition, FIG. 32 through FIG. 34 are collections of diagrams that illustrate lateral aberrations of the zoom lens of Example 4.

Example 5

The zoom lens of Example 5 is of the configuration illustrated in FIG. 5. The zoom lens of the present example is of a five group configuration, substantially constituted by a first lens group G1, a second lens group G2, a third lens group G3, a fourth lens group G4, and a fifth lens group G5, provided in this order from the object side. The signs of the refractive powers of the lens groups are positive, negative, positive, positive, and positive, in this order from the first lens group G1. The first lens group G1 through the fourth lens group G4 move along the optical axis Z while changing magnification, and the third lens group G3 and the fourth lens group G4 move along mutually different paths. In addition, the shake preventing lens is a lens L34 within the third lens group G3, and the focusing lens is a lens L41, which has a positive refractive power, within the fourth lens group G4.

The zoom lens of Example 5 differs from that of Example 1 in that the fourth lens group G4 is constituted by three lenses, which are the lens L41 having a positive refractive power, a lens L42 having a negative refractive power, and a lens L43 having a positive refractive power. Note that the lens L42 and the lens L43 are cemented together. As described above, the lens L41 constitutes the movable fourth lens group that moves along the optical axis Z during focusing operations, and the lens L42 and the lens L43 constitute the fixed fourth lens group which is fixed with respect to the direction of the optical axis Z during focusing operations.

Basic lens data of Example 5 are shown in Table 13, items and variable distances among surfaces of Example 5 are shown in Table 14, and aspherical surface coefficients of Example 5 are shown in Table 15.

TABLE 13

Example 5: Lens Data

| Si (Surface Number) | Ri (Radius of Curvature) | Di (Distance) | Ndj (Refractive Index) | Ndj (Abbe's Number) |
|---|---|---|---|---|
| 1 | 55.7298 | 1.36 | 1.92286 | 18.90 |
| 2 | 36.7596 | 5.85 | 1.83481 | 42.73 |
| 3 | 355.7100 | DD[3] | | |
| 4 | 456.2759 | 1.00 | 1.62710 | 40.83 |
| 5 | 9.6536 | 5.50 | | |
| *6 | −70.8788 | 1.05 | 1.69098 | 52.95 |
| *7 | 29.8550 | 1.00 | | |
| 8 | 20.6140 | 2.50 | 1.92286 | 18.90 |
| 9 | 67.7014 | DD[9] | | |
| 10 (aperture stop) | ∞ | 1.30 | | |
| *11 | 14.3213 | 2.88 | 1.80348 | 40.44 |
| *12 | 54.4016 | 1.57 | | |
| 13 | 214748.3648 | 0.71 | 1.71610 | 30.82 |
| 14 | 12.0887 | 4.00 | 1.49700 | 81.54 |
| 15 | −12.1062 | 2.81 | | |
| *16 | −27.6133 | 1.00 | 1.51999 | 51.25 |
| *17 | 37.9995 | DD[17] | | |
| 18 | 66.5261 | 1.80 | 1.81999 | 46.00 |
| 19 | −139.2235 | 2.50 | | |
| 20 | 187.4324 | 0.81 | 1.90278 | 35.40 |
| 21 | 17.9998 | 3.85 | 1.56723 | 43.14 |
| 22 | −1907.7350 | DD[22] | | |
| 23 | 536.0187 | 3.60 | 1.76323 | 47.46 |
| 24 | −52.8130 | 11.83 | | |
| 25 | ∞ | 2.85 | 1.51680 | 64.20 |
| 26 | ∞ | | | |

TABLE 14

Example 5: Items (related to d Line)

| | Wide Angle End | Intermediate | Telephoto End |
|---|---|---|---|
| Zoom Magnification | 1.000 | 1.697 | 2.880 |
| Focal Length | 18.26 | 30.98 | 52.58 |
| F No. | 3.67 | 4.50 | 5.51 |
| 2ω (°) | 79.8 | 47.4 | 28.6 |
| DD[3] | 0.60 | 12.50 | 23.81 |
| DD[9] | 14.64 | 8.19 | 3.43 |
| DD[17] | 6.03 | 4.98 | 9.64 |
| DD[22] | 3.22 | 13.66 | 22.07 |

TABLE 15

Example 5: Aspherical Surface Coefficients

| | Surface Number | | |
|---|---|---|---|
| | 6 | 7 | 11 |
| KA | 1.0000000E+00 | 1.0000000E+00 | 1.0000000E+00 |
| A3 | 1.1404379E−03 | 6.4748482E−04 | 6.2992361E−05 |
| A4 | −4.0530378E−04 | −1.4728231E−04 | 4.3212946E−05 |
| A5 | 1.2251518E−04 | 4.1900305E−05 | 4.6630010E−05 |
| A6 | −1.4324617E−05 | −2.1868481E−06 | −7.6797404E−06 |
| A7 | 5.6343956E−08 | −7.3052346E−07 | −1.7737598E−06 |
| A8 | 5.3689092E−08 | 9.1849030E−09 | 9.2535946E−07 |
| A9 | 2.8954438E−09 | 8.6426579E−09 | −1.0316257E−07 |
| A10 | −7.8921347E−11 | 6.6013544E−10 | 2.4432437E−09 |
| A11 | −1.9208812E−11 | −2.5517701E−11 | −9.8901243E−10 |
| A12 | −1.6352200E−12 | −1.1351279E−11 | 1.3286896E−11 |
| A13 | −3.3472372E−14 | −1.2245348E−12 | 3.1498485E−11 |
| A14 | −3.9561887E−15 | −1.3047728E−14 | 3.7355152E−12 |
| A15 | −9.1694323E−16 | 1.2104295E−14 | −3.3454255E−13 |
| A16 | −7.5834266E−17 | 1.9914280E−15 | −7.6660020E−14 |
| A17 | −1.6160264E−17 | 1.0144906E−16 | −1.5173041E−14 |
| A18 | 5.6159233E−18 | −1.7216237E−17 | 2.1571704E−16 |
| A19 | 6.4581467E−19 | −3.0611317E−18 | 5.9777065E−16 |
| A20 | −6.7408628E−20 | 2.2927421E−19 | −4.2111426E−17 |

| | Surface Number | | |
|---|---|---|---|
| | 12 | 16 | 17 |
| KA | 1.0000000E+00 | 1.0000000E+00 | 1.0000000E+00 |
| A3 | 6.5374491E−05 | 7.4452347E−05 | 3.1336586E−04 |
| A4 | 2.7205562E−04 | 1.8620705E−04 | 1.1862734E−04 |
| A5 | −4.5632282E−05 | −2.1439399E−05 | −1.6561513E−05 |
| A6 | 2.8965538E−05 | 6.7565058E−07 | 8.7189304E−07 |
| A7 | −5.7690368E−06 | 5.2597928E−08 | −9.1035594E−09 |
| A8 | 2.7107102E−07 | 6.8975355E−10 | −4.1110003E−10 |
| A9 | −7.5510848E−09 | −8.4748976E−11 | 1.2280839E−12 |
| A10 | 1.9720358E−08 | −1.8368209E−11 | −3.1821206E−13 |
| A11 | −3.2093721E−10 | −3.1367409E−12 | −6.3746054E−13 |
| A12 | −4.9627441E−10 | −5.8875751E−13 | −2.5249199E−13 |
| A13 | −7.1908018E−11 | −1.0413319E−13 | −5.7380436E−14 |
| A14 | 7.3111257E−12 | 3.1457723E−15 | −1.9364481E−14 |
| A15 | 6.0579228E−12 | −2.9586408E−15 | −1.9828754E−15 |
| A16 | −8.0600542E−13 | 1.6077504E−15 | −1.0507941E−15 |
| A17 | −1.7659830E−14 | 8.7070923E−16 | 2.8333392E−16 |
| A18 | −1.1260776E−15 | 1.2517194E−16 | 1.3508201E−16 |
| A19 | 1.3705583E−15 | −7.9762503E−18 | 4.8953295E−18 |
| A20 | −8.3201043E−17 | 8.8892136E−18 | −2.9590532E−19 |

A through L of FIG. 17 are diagrams that illustrate aberrations of the zoom lens of Example 5 (the types of aberrations are the same as those shown for Example 1). In addition, FIG. 35 through FIG. 37 are collections of diagrams that illustrate lateral aberrations of the zoom lens of Example 5.

Example 6

Figure 6:
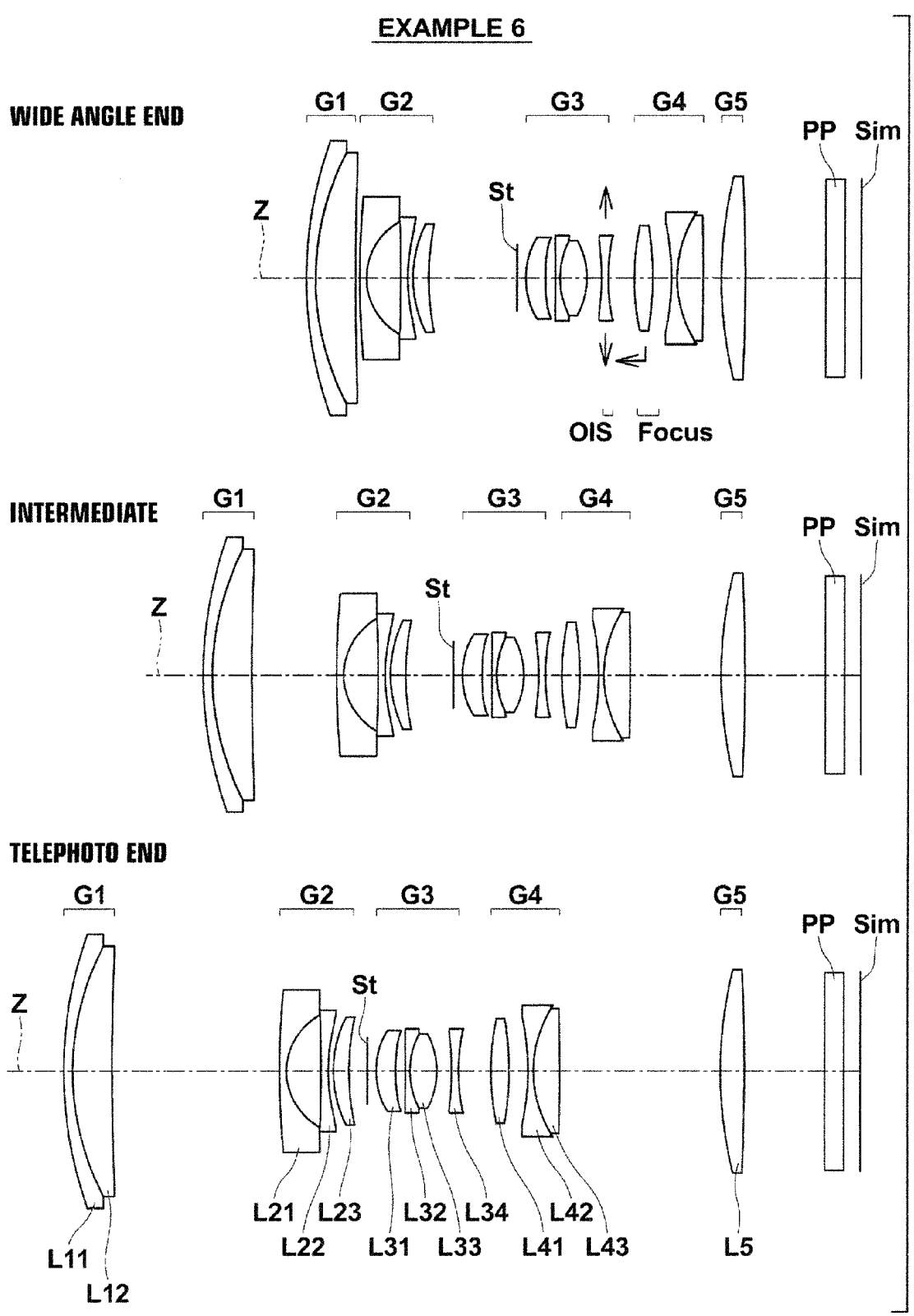
FIG. 6 is a collection of sectional diagrams that illustrate the lens configuration of a zoom lens according to Example 6 of the present invention.

The zoom lens of Example 6 is of the configuration illustrated in FIG. 6. The zoom lens of the present example is of a five group configuration, substantially constituted by a first lens group G1, a second lens group G2, a third lens group G3, a fourth lens group G4, and a fifth lens group G5, provided in this order from the object side. The signs of the refractive powers of the lens groups are positive, negative, positive, positive, and positive, in this order from the first lens group G1. The first lens group G1 through the fourth lens group G4 move along the optical axis Z while changing magnification, and the third lens group G3 and the fourth lens group G4 move along mutually different paths. In addition, the shake preventing lens is a lens L34 within the third lens group G3, and the focusing lens is a lens L41, which has a positive refractive power, within the fourth lens group G4.

The zoom lens of Example 6 differs from that of Example 1 in that the fourth lens group G4 is constituted by three lenses, which are the lens L41 having a positive refractive power, a lens L42 having a negative refractive power, and a lens L43 having a positive refractive power. Note that the lens L42 and the lens L43 are cemented together. As described above, the lens L41 constitutes the movable fourth lens group that moves along the optical axis Z during focusing operations, and the lens L42 and the lens L43 constitute the fixed fourth lens group which is fixed with respect to the direction of the optical axis Z during focusing operations.

Basic lens data of Example 6 are shown in Table 16, items and variable distances among surfaces of Example 6 are shown in Table 17, and aspherical surface coefficients of Example 6 are shown in Table 18.

TABLE 16

Example 6: Lens Data

| Si (Surface Number) | Ri (Radius of Curvature) | Di (Distance) | Ndj (Refractive Index) | vdj (Abbe's Number) |
|---|---|---|---|---|
| 1 | 60.0807 | 1.36 | 1.92286 | 18.90 |
| 2 | 39.7599 | 5.85 | 1.83481 | 42.73 |
| 3 | 434.7079 | DD[3] | | |
| 4 | 144.1978 | 1.00 | 1.61772 | 49.81 |
| 5 | 9.4875 | 5.10 | | |
| *6 | −168.7218 | 1.05 | 1.69098 | 52.95 |
| *7 | 27.6918 | 0.79 | | |
| 8 | 18.0991 | 2.30 | 1.92286 | 18.90 |
| 9 | 39.0441 | DD[9] | | |
| 10 (aperture stop) | ∞ | 1.30 | | |
| *11 | 12.9099 | 2.89 | 1.80348 | 40.44 |
| *12 | 48.0334 | 1.45 | | |
| 13 | −785.6898 | 0.71 | 1.80000 | 29.84 |
| 14 | 12.0133 | 4.00 | 1.49700 | 81.54 |
| 15 | −11.3236 | 2.20 | | |
| *16 | −30.5726 | 1.00 | 1.58313 | 59.46 |
| *17 | 40.0128 | DD[17] | | |
| 18 | 37.7249 | 2.70 | 1.79952 | 42.22 |
| 19 | −48.0756 | 2.80 | | |
| 20 | −35.9781 | 0.81 | 1.79952 | 42.22 |
| 21 | 18.0015 | 3.85 | 1.58313 | 59.38 |
| 22 | −448.3441 | DD[22] | | |
| 23 | 62.7747 | 3.60 | 1.83400 | 37.16 |
| 24 | −302.4090 | 11.83 | | |
| 25 | ∞ | 2.85 | 1.54763 | 54.98 |
| 26 | ∞ | | | |

TABLE 17

Example 6: Items (related to d Line)

| | Wide Angle End | Intermediate | Telephoto End |
|---|---|---|---|
| Zoom Magnification | 1.000 | 1.697 | 2.880 |
| Focal Length | 18.94 | 32.14 | 54.55 |
| F No. | 3.65 | 4.51 | 5.54 |
| 2ω (°) | 78.8 | 46.6 | 28.0 |
| DD[3] | 0.67 | 12.57 | 24.81 |
| DD[9] | 13.02 | 7.07 | 2.70 |
| DD[17] | 3.80 | 2.39 | 4.71 |
| DD[22] | 2.70 | 13.41 | 23.80 |

TABLE 18

Example 6: Aspherical Surface Coefficients

| Surface Number | 6 | 7 | 11 |
|---|---|---|---|
| KA | 1.0000000E+00 | 1.0000000E+00 | 1.0000000E+00 |
| A3 | 7.3136356E−04 | 2.5864349E−04 | 4.2196674E−05 |
| A4 | −3.9673281E−04 | −1.3429690E−04 | 3.8549245E−05 |
| A5 | 1.2252700E−04 | 4.1994909E−05 | 4.6272223E−05 |
| A6 | −1.4345667E−05 | −2.1746496E−06 | −7.6838294E−06 |
| A7 | 5.5492575E−08 | −7.3002190E−07 | −1.7738288E−06 |
| A8 | 5.3667593E−08 | 9.1972965E−09 | 9.2535049E−07 |
| A9 | 2.8950568E−09 | 8.6427781E−09 | −1.0316452E−07 |
| A10 | −7.8923294E−11 | 6.6011681E−10 | 2.4428644E−09 |
| A11 | −1.9208659E−11 | −2.5521062E−11 | −9.8908938E−10 |
| A12 | −1.6352392E−12 | −1.1351784E−11 | 1.3273320E−11 |
| A13 | −3.3489991E−14 | −1.2245975E−12 | 3.1493743E−11 |
| A14 | −3.9605396E−15 | −1.3056626E−14 | 3.7353639E−12 |
| A15 | −9.1840550E−16 | 1.2102633E−14 | −3.3452353E−13 |
| A16 | −7.6099044E−17 | 1.9910283E−15 | −7.6635537E−14 |
| A17 | −1.6208910E−17 | 1.0141347E−16 | −1.5164519E−14 |
| A18 | 5.6124077E−18 | −1.7217616E−17 | 2.1623940E−16 |
| A19 | 6.4459778E−19 | −3.0605258E−18 | 5.9771872E−16 |
| A20 | −6.7618371E−20 | 2.2938948E−19 | −4.2110104E−17 |

| Surface Number | 12 | 16 | 17 |
|---|---|---|---|
| KA | 1.0000000E+00 | 1.0000000E+00 | 1.0000000E+00 |
| A3 | 5.7465457E−05 | 6.1182488E−05 | 2.9041543E−04 |
| A4 | 2.8419913E−04 | 1.9312406E−04 | 1.2776016E−04 |
| A5 | −4.4857840E−05 | −2.1530370E−05 | −1.6254849E−05 |
| A6 | 2.8974140E−05 | 6.7297720E−07 | 8.7548227E−07 |
| A7 | −5.7689128E−06 | 5.2553740E−08 | −9.0865999E−09 |
| A8 | 2.7108821E−07 | 6.8947577E−10 | −4.1300182E−10 |
| A9 | −7.5476921E−09 | −8.4197491E−11 | 4.6863329E−13 |
| A10 | 1.9720962E−08 | −1.8153279E−11 | −5.4442007E−13 |
| A11 | −3.2084219E−10 | −3.0560522E−12 | −6.9629279E−13 |
| A12 | −4.9626428E−10 | −5.6968159E−13 | −2.6920729E−13 |
| A13 | −7.1910320E−11 | −9.9127475E−14 | −6.0905945E−14 |
| A14 | 7.3110350E−12 | 4.0504185E−15 | −2.0186753E−14 |
| A15 | 6.0574851E−12 | −3.7499312E−15 | −2.0060271E−15 |
| A16 | −8.0616430E−13 | 1.5245891E−15 | −1.0303054E−15 |
| A17 | −1.7682159E−14 | 8.8549751E−16 | 2.6896611E−16 |
| A18 | −1.1328485E−15 | 1.2619720E−16 | 1.3434520E−16 |
| A19 | 1.3697099E−15 | −7.8476160E−18 | 4.7281427E−18 |
| A20 | −8.3258316E−17 | 9.0962462E−18 | −4.0683929E−19 |

A through L of FIG. 18 are diagrams that illustrate aberrations of the zoom lens of Example 6 (the types of aberrations are the same as those shown for Example 1). In addition, FIG. 38 through FIG. 40 are collections of diagrams that illustrate lateral aberrations of the zoom lens of Example 6.

Example 7

The zoom lens of Example 7 is of the configuration illustrated in FIG. 7. The zoom lens of the present example is of a four group configuration, substantially constituted by a first lens group G1, a second lens group G2, a third lens group G3, and a fourth lens group G4, provided in this order from the object side. The signs of the refractive powers of the lens groups are positive, negative, positive, and positive, in this order from the first lens group G1. The first lens group G1 through the fourth lens group G4 move along the optical axis Z while changing magnification, and the third lens group G3 and the fourth lens group G4 move along mutually different paths. In addition, the shake preventing lens is a lens L34 within the third lens group G3, and the focusing lens is a lens L41, which has a positive refractive power, within the fourth lens group G4.

The zoom lens of Example 7 differs from that of Example 1 in that it is of a four group configuration, and that the fourth lens group G4 is constituted by three lenses, which are the lens L41 having a positive refractive power, a lens L42 having a negative refractive power, and a lens L43 having a positive refractive power. Note that the lens L42 and the lens L43 are cemented together. As described above, the lens L41 constitutes the movable fourth lens group that moves along the optical axis Z during focusing operations, and the lens L42 and the lens L43 constitute the fixed fourth lens group which is fixed with respect to the direction of the optical axis Z during focusing operations.

Basic lens data of Example 7 are shown in Table 19, items and variable distances among surfaces of Example 7 are shown in Table 20, and aspherical surface coefficients of Example 7 are shown in Table 21.

TABLE 19

Example 7: Lens Data

| Si (Surface Number) | Ri (Radius of Curvature) | Di (Distance) | Ndj (Refractive Index) | νdj (Abbe's Number) |
|---|---|---|---|---|
| 1 | 51.7063 | 1.36 | 1.92286 | 18.90 |
| 2 | 34.9993 | 5.85 | 1.83481 | 42.73 |
| 3 | 179.8030 | DD[3] | | |
| 4 | 127.8226 | 1.00 | 1.82001 | 44.65 |
| 5 | 10.7854 | 4.50 | | |
| *6 | −64.9977 | 1.05 | 1.69098 | 52.95 |
| *7 | 65.1844 | 1.00 | | |
| 8 | 19.9804 | 2.30 | 1.92286 | 18.90 |
| 9 | 42.4419 | DD[9] | | |
| 10 (aperture stop) | ∞ | 1.30 | | |
| *11 | 15.1987 | 2.40 | 1.80348 | 40.44 |
| *12 | 52.8491 | 1.96 | | |
| 13 | −443.6745 | 0.71 | 1.67998 | 33.13 |
| 14 | 12.2454 | 4.00 | 1.49700 | 81.54 |
| 15 | −12.7839 | 2.58 | | |
| *16 | −28.8037 | 1.00 | 1.51999 | 51.25 |
| *17 | 38.0006 | DD[17] | | |
| 18 | 53.3200 | 2.70 | 1.73832 | 53.78 |
| 19 | −26.0258 | 3.95 | | |
| 20 | −20.3176 | 0.81 | 1.92001 | 34.60 |
| 21 | 53.6044 | 3.85 | 1.61734 | 36.45 |
| 22 | −24.2759 | DD[22] | | |
| 23 | ∞ | 2.85 | 1.51680 | 64.20 |
| 24 | ∞ | | | |

TABLE 20

Example 7: Items (related to d Line)

| | Wide Angle End | Intermediate | Telephoto End |
|---|---|---|---|
| Zoom Magnification | 1.000 | 1.697 | 2.880 |
| Focal Length | 18.48 | 31.36 | 53.21 |
| F No. | 3.63 | 4.40 | 5.28 |
| 2ω (°) | 82.8 | 49.0 | 29.4 |
| DD[3] | 1.43 | 13.33 | 25.41 |
| DD[9] | 15.13 | 7.07 | 1.29 |
| DD[17] | 3.80 | 3.92 | 4.49 |
| DD[22] | 16.39 | 24.00 | 32.84 |

TABLE 21

Example 7: Aspherical Surface Coefficients

| Surface Number | 6 | 7 | 11 |
|---|---|---|---|
| KA | 1.0000000E+00 | 1.0000000E+00 | 1.0000000E+00 |
| A3 | 1.0102082E−03 | 5.9068622E−04 | 1.1597140E−04 |

TABLE 21-continued

Example 7: Aspherical Surface Coefficients

| | | | |
|---|---|---|---|
| A4 | −3.8925726E−04 | −1.3371027E−04 | 1.5094353E−05 |
| A5 | 1.2242424E−04 | 4.2667732E−05 | 4.8507159E−05 |
| A6 | −1.4420423E−05 | −2.0918726E−06 | −7.6777603E−06 |
| A7 | 5.2890661E−08 | −7.2749768E−07 | −1.7741517E−06 |
| A8 | 5.3608190E−08 | 9.2487643E−09 | 9.2533886E−07 |
| A9 | 2.8935860E−09 | 8.6436180E−09 | −1.0316583E−07 |
| A10 | −7.9024327E−11 | 6.6013750E−10 | 2.4425655E−09 |
| A11 | −1.9222493E−11 | −2.5518961E−11 | −9.8915775E−10 |
| A12 | −1.6371819E−12 | −1.1351563E−11 | 1.3258136E−11 |
| A13 | −3.3744816E−14 | −1.2245805E−12 | 3.1493627E−11 |
| A14 | −3.9918186E−15 | −1.3060011E−12 | 3.7348759E−12 |
| A15 | −9.2208370E−16 | 1.2101578E−14 | −3.3457532E−13 |
| A16 | −7.6456981E−17 | 1.9910429E−15 | −7.6631282E−14 |
| A17 | −1.6254095E−17 | 1.0135713E−16 | −1.5162698E−14 |
| A18 | 5.6025146E−18 | −1.7224317E−17 | 2.1742355E−16 |
| A19 | 6.4357006E−19 | −3.0595914E−18 | 5.9785644E−16 |
| A20 | −6.7701311E−20 | 2.2932596E−19 | −4.2111975E−17 |

| Surface Number | 12 | 16 | 17 |
|---|---|---|---|
| KA | 1.0000000E+00 | 1.0000000E+00 | 1.0000000E+00 |
| A3 | 1.1846115E−04 | 1.5672338E−04 | 3.2886829E−04 |
| A4 | 2.2652795E−04 | 1.7982567E−04 | 1.2160685E−04 |
| A5 | −4.6507331E−05 | −2.1396448E−05 | −1.6799742E−05 |
| A6 | 2.8974155E−05 | 6.4438589E−07 | 8.9692807E−07 |
| A7 | −5.7686199E−06 | 5.1736760E−08 | −8.2833912E−09 |
| A8 | 2.7110847E−07 | 6.6173734E−10 | −3.8091247E−10 |
| A9 | −7.5435378E−09 | −8.8196652E−11 | 3.3988845E−12 |
| A10 | 1.9722018E−08 | −1.9259506E−11 | −1.0650145E−13 |
| A11 | −3.2058152E−10 | −3.3698957E−12 | −6.1680856E−13 |
| A12 | −4.9620276E−10 | −6.5545028E−13 | −2.5410793E−13 |
| A13 | −7.1900725E−11 | −1.2133449E−13 | −5.7645703E−14 |
| A14 | 7.3126802E−12 | −4.6616864E−16 | −1.9343637E−14 |
| A15 | 6.0580090E−12 | −3.4099830E−15 | −2.0193048E−15 |
| A16 | −8.0618300E−13 | 1.5017910E−15 | −1.0909838E−15 |
| A17 | −1.7700611E−14 | 8.6804356E−16 | 2.7501121E−16 |
| A18 | −1.1351374E−15 | 1.2102591E−16 | 1.3604993E−16 |
| A19 | 1.3699774E−15 | −7.9687743E−18 | 5.0560153E−18 |
| A20 | −8.3265060E−17 | 8.9949014E−18 | −3.9695180E−19 |

A through L of FIG. 19 are diagrams that illustrate aberrations of the zoom lens of Example 7 (the types of aberrations are the same as those shown for Example 1). In addition, FIG. 41 through FIG. 43 are collections of diagrams that illustrate lateral aberrations of the zoom lens of Example 7.

Example 8

The zoom lens of Example 8 is of the configuration illustrated in FIG. 8. The zoom lens of the present example is of a four group configuration, substantially constituted by a first lens group G1, a second lens group G2, a third lens group G3, and a fourth lens group G4, provided in this order from the object side. The signs of the refractive powers of the lens groups are positive, negative, positive, and positive, in this order from the first lens group G1. The first lens group G1 through the fourth lens group G4 move along the optical axis Z while changing magnification, and the third lens group G3 and the fourth lens group G4 move integrally. In addition, the shake preventing lens is a lens L34 within the third lens group G3, and the focusing lens is a lens L41, which has a positive refractive power, within the fourth lens group G4.

The zoom lens of Example 8 differs from that of Example 1 in that it is of a four group configuration, and that the fourth lens group G4 is constituted by four lenses, which are the lens L41 having a positive refractive power, a lens L42 having a negative refractive power, a lens L43 having a positive refractive power, and a lens L44 having a positive refractive power. Note that the lens L42 and the lens L43 are cemented together. As described above, the lens L41 constitutes the movable fourth lens group that moves along the optical axis Z during focusing operations, and the lens L42, the lens L43, and the lens L44 constitute the fixed fourth lens group which is fixed with respect to the direction of the optical axis Z during focusing operations.

Basic lens data of Example 8 are shown in Table 22, items and variable distances among surfaces of Example 8 are shown in Table 23, and aspherical surface coefficients of Example 8 are shown in Table 24.

TABLE 22

Example 8: Lens Data

| Si (Surface Number) | Ri (Radius of Curvature) | Di (Distance) | Ndj (Refractive Index) | vdj (Abbe's Number) |
|---|---|---|---|---|
| 1 | 52.0149 | 1.36 | 1.92286 | 18.90 |
| 2 | 34.9996 | 5.20 | 1.83481 | 42.73 |
| 3 | 151.8386 | DD[3] | | |
| 4 | 43.7604 | 1.00 | 1.88300 | 40.76 |
| 5 | 9.6365 | 4.70 | | |
| *6 | −209.1411 | 1.05 | 1.58313 | 59.46 |
| *7 | 20.5152 | 0.88 | | |
| 8 | 15.9260 | 2.15 | 1.92286 | 18.90 |
| 9 | 31.3336 | DD[9] | | |
| 10 (aperture stop) | ∞ | 1.30 | | |
| *11 | 15.1709 | 2.46 | 1.80348 | 40.44 |
| *12 | 128.7404 | 1.64 | | |
| 13 | −214748.3648 | 0.71 | 1.77995 | 31.48 |
| 14 | 12.1840 | 4.00 | 1.49700 | 81.54 |
| 15 | −13.3402 | 2.20 | | |
| *16 | −44.3976 | 1.00 | 1.58313 | 59.46 |
| *17 | 39.0313 | 4.02 | | |
| 18 | 37.8359 | 2.90 | 1.53965 | 60.82 |
| 19 | −21.6162 | 5.00 | | |
| 20 | −15.1175 | 0.81 | 1.71610 | 43.55 |
| 21 | 75.0070 | 4.10 | 1.52000 | 58.56 |
| 22 | −20.6436 | 0.20 | | |
| 23 | −94.8063 | 2.00 | 1.51999 | 56.21 |
| 24 | −83.5125 | DD[24] | | |
| 25 | ∞ | 2.85 | 1.51680 | 64.20 |
| 26 | ∞ | | | |

TABLE 23

Example 8: Items (related to d Line)

| | Wide Angle End | Intermediate | Telephoto End |
|---|---|---|---|
| Zoom Magnification | 1.000 | 1.697 | 2.880 |
| Focal Length | 16.57 | 28.13 | 47.73 |
| F No. | 3.64 | 4.54 | 5.65 |
| 2ω (°) | 89.0 | 54.2 | 32.8 |
| DD[3] | 0.70 | 11.51 | 23.80 |
| DD[9] | 15.24 | 7.79 | 2.90 |
| DD[24] | 12.80 | 22.00 | 33.29 |

TABLE 24

Example 8: Aspherical Surface Coefficients

| Surface Number | 6 | 7 | 11 |
|---|---|---|---|
| KA | 1.0000000E+00 | 1.0000000E+00 | 1.0000000E+00 |
| A3 | 7.2452752E−04 | 1.5366035E−04 | 1.2494728E−04 |
| A4 | −4.8873191E−04 | −1.8088152E−04 | −2.5527208E−05 |
| A5 | 1.2862581E−04 | 4.3214309E−05 | 4.7890512E−05 |
| A6 | −1.4324746E−05 | −1.9266272E−06 | −7.7172427E−06 |
| A7 | 4.8784457E−08 | −7.1846652E−07 | −1.7754876E−06 |

TABLE 24-continued

Example 8: Aspherical Surface Coefficients

| A8 | 5.3417510E−08 | 9.5030085E−09 | 9.2528931E−07 |
|---|---|---|---|
| A9 | 2.8895148E−09 | 8.6481764E−09 | −1.0317350E−07 |
| A10 | −7.9019329E−11 | 6.6012467E−10 | 2.4407827E−09 |
| A11 | −1.9213403E−11 | −2.5528997E−11 | −9.8946242E−10 |
| A12 | −1.6360962E−12 | −1.1352658E−11 | 1.3198785E−11 |
| A13 | −3.3615399E−14 | −1.2247229E−12 | 3.1483643E−11 |
| A14 | −3.9807076E−15 | −1.3084827E−14 | 3.7339326E−12 |
| A15 | −9.1993645E−16 | 1.2099197E−14 | −3.3451804E−13 |
| A16 | −7.6107784E−17 | 1.9903804E−15 | −7.6533893E−14 |
| A17 | −1.6198421E−17 | 1.0146787E−16 | −1.5121567E−14 |
| A18 | 5.5943509E−18 | −1.7186665E−17 | 2.2017973E−16 |
| A19 | 6.4042315E−19 | −3.0521643E−18 | 5.9907480E−16 |
| A20 | −6.8180635E−20 | 2.3150986E−19 | −4.2063456E−17 |

| Surface Number | 12 | 16 | 17 |
|---|---|---|---|
| KA | 1.0000000E+00 | 1.0000000E+00 | 1.0000000E+00 |
| A3 | 1.2074581E−04 | −1.3186641E−04 | 3.0903026E−05 |
| A4 | 1.8003536E−04 | 1.8548474E−04 | 1.4666171E−04 |
| A5 | −5.0067700E−05 | −1.7810601E−05 | −1.7299739E−05 |
| A6 | 2.8911987E−05 | 5.4474160E−07 | 1.0676434E−06 |
| A7 | −5.7687809E−06 | 4.9197805E−08 | −3.5986383E−09 |
| A8 | 2.7114351E−07 | 8.1374396E−10 | −3.6845195E−10 |
| A9 | −7.5351942E−09 | −5.4563762E−11 | −8.4476164E−12 |
| A10 | 1.9724383E−08 | −1.4191267E−11 | −2.3626347E−12 |
| A11 | −3.2003291E−10 | −2.6684659E−12 | −1.0118215E−12 |
| A12 | −4.9611147E−10 | −5.8478515E−13 | −3.2081904E−13 |
| A13 | −7.1884318E−11 | −1.1453763E−13 | −6.6576198E−14 |
| A14 | 7.3144966E−12 | 1.5339778E−16 | −2.0867114E−14 |
| A15 | 6.0587177E−12 | −3.2837440E−15 | −2.0580491E−15 |
| A16 | −8.0616146E−13 | 1.5656868E−15 | −1.0693552E−15 |
| A17 | −1.7708523E−14 | 5.4728767E−16 | 3.0115515E−16 |
| A18 | −1.1378361E−15 | 8.6070468E−17 | 1.6181232E−16 |
| A19 | 1.3703716E−15 | −9.2161280E−18 | 6.4868708E−18 |
| A20 | −8.3309631E−17 | 8.3521807E−18 | −3.2698848E−19 |

A through L of FIG. 20 are diagrams that illustrate aberrations of the zoom lens of Example 8 (the types of aberrations are the same as those shown for Example 1). In addition, FIG. 44 through FIG. 46 are collections of diagrams that illustrate lateral aberrations of the zoom lens of Example 8.

Example 9

The zoom lens of Example 9 is of the configuration illustrated in FIG. 9. The zoom lens of the present example is of a five group configuration, substantially constituted by a first lens group G1, a second lens group G2, a third lens group G3, a fourth lens group G4, and a fifth lens group G5, provided in this order from the object side. The signs of the refractive powers of the lens groups are positive, negative, positive, positive, and positive, in this order from the first lens group G1. The first lens group G1 through the fourth lens group G4 move along the optical axis Z while changing magnification, and the third lens group G3 and the fourth lens group G4 move integrally. In addition, the shake preventing lens is a lens L34 within the third lens group G3, and the focusing lens is a lens L41, which has a positive refractive power, within the fourth lens group G4.

Basic lens data of Example 9 are shown in Table 25, items and variable distances among surfaces of Example 9 are shown in Table 26, and aspherical surface coefficients of Example 9 are shown in Table 27.

TABLE 25

Example 9: Lens Data

| Si (Surface Number) | Ri (Radius of Curvature) | Di (Distance) | Ndj (Refractive Index) | vdj (Abbe's Number) |
|---|---|---|---|---|
| 1 | 51.0204 | 1.36 | 1.92286 | 18.90 |
| 2 | 35.4440 | 5.20 | 1.83481 | 42.73 |
| 3 | 169.7109 | DD[3] | | |
| 4 | 46.1295 | 1.00 | 1.88300 | 40.76 |
| 5 | 10.3417 | 6.20 | | |
| *6 | −77.7133 | 1.05 | 1.58063 | 59.15 |
| *7 | 24.4564 | 0.10 | | |
| 8 | 18.7277 | 2.50 | 1.94595 | 17.98 |
| 9 | 42.0003 | DD[9] | | |
| 10 (aperture stop) | ∞ | 1.30 | | |
| *11 | 21.9513 | 3.30 | 1.80348 | 40.44 |
| *12 | −90.2615 | 1.82 | | |
| 13 | ∞ | 0.71 | 1.80000 | 29.84 |
| 14 | 13.6541 | 4.71 | 1.49700 | 81.54 |
| 15 | −13.6541 | 2.20 | | |
| *16 | −77.0729 | 1.00 | 1.58063 | 59.15 |
| *17 | 48.5929 | 5.20 | | |
| 18 | 53.1272 | 3.10 | 1.61800 | 63.33 |
| 19 | −29.6603 | 3.60 | | |
| 20 | −17.9241 | 0.80 | 1.53172 | 48.84 |
| 21 | ∞ | DD[21] | | |
| 22 | ∞ | 2.80 | 1.71299 | 53.87 |
| 23 | −75.5885 | 11.95 | | |
| 24 | ∞ | 2.85 | 1.51680 | 64.20 |
| 25 | ∞ | | | |

TABLE 26

Example 9: Items (related to d Line)

| | Wide Angle End | Intermediate | Telephoto End |
|---|---|---|---|
| Zoom Magnification | 1.000 | 1.697 | 2.946 |
| Focal Length | 16.50 | 27.99 | 48.59 |
| F No. | 3.60 | 4.57 | 5.76 |
| 2ω (°) | 89.8 | 55.0 | 32.2 |
| DD[3] | 0.70 | 7.97 | 21.38 |
| DD[9] | 14.35 | 7.39 | 3.12 |
| DD[21] | 2.20 | 13.28 | 25.02 |

TABLE 27

Example 9: Aspherical Surface Coefficients

| Surface Number | 6 | 7 | 11 |
|---|---|---|---|
| KA | 1.0000000E+00 | 1.0000000E+00 | 1.0000000E+00 |
| A3 | 2.9672130E−04 | −2.1892949E−04 | −8.2983816E−06 |
| A4 | −5.4955966E−04 | −2.4673796E−04 | −1.0903663E−04 |
| A5 | 1.3511333E−04 | 4.7754473E−05 | 3.9947552E−05 |
| A6 | −1.4222700E−05 | −1.0776574E−06 | −8.9819580E−06 |
| A7 | 9.2033531E−08 | −6.8294433E−07 | −1.9084984E−06 |
| A8 | 5.9200809E−08 | 8.7686793E−09 | 9.1885918E−07 |
| A9 | 3.0971072E−09 | 8.4031379E−09 | −1.0129499E−07 |
| A10 | −1.3923193E−10 | 6.6038494E−10 | 3.1103377E−09 |
| A11 | −3.3623728E−11 | −2.5255928E−11 | −8.8263964E−10 |
| A12 | −3.2954555E−12 | −1.1712202E−11 | 1.7287195E−11 |
| A13 | −1.1080966E−13 | −1.3946328E−12 | 2.8125655E−11 |
| A14 | 6.0145658E−15 | −3.9487643E−14 | 2.3977508E−12 |
| A15 | 1.7701054E−15 | 9.6566158E−15 | −6.1312525E−13 |
| A16 | 2.4843809E−16 | 2.1111601E−15 | −1.0719878E−13 |
| A17 | 4.2166955E−19 | 1.7484288E−16 | −1.2066232E−14 |
| A18 | 4.2308906E−18 | −3.8321743E−18 | 2.6442409E−15 |
| A19 | 2.3888337E−19 | −2.2140997E−18 | 1.1281265E−15 |
| A20 | −7.5272974E−20 | −3.7026635E−20 | −1.2731435E−16 |

TABLE 27-continued

Example 9: Aspherical Surface Coefficients

| Surface Number | 12 | 16 | 17 |
|---|---|---|---|
| KA | 1.0000000E+00 | 1.0000000E+00 | 1.0000000E+00 |
| A3 | −9.7334742E−07 | −2.2884532E−04 | −4.6886096E−05 |
| A4 | 3.8530133E−05 | 1.9013540E−04 | 1.1644194E−04 |
| A5 | −5.7115607E−05 | −3.5479825E−05 | −1.5775715E−05 |
| A6 | 2.7528873E−05 | 2.0361279E−06 | 9.6107425E−07 |
| A7 | −5.8665589E−06 | 6.3751523E−07 | 4.5308513E−08 |
| A8 | 2.69587.567E−07 | 4.9107752E−08 | 2.4602042E−08 |
| A9 | −6.6758591E−09 | −7.6046835E−09 | 5.9680459E−09 |
| A10 | 1.9827070E−08 | −2.9051179E−09 | 7.4130689E−10 |
| A11 | −3.3128209E−10 | −4.2111471E−10 | −2.1682215E−11 |
| A12 | −5.0460072E−10 | −1.3360337E−11 | −3.5845458E−11 |
| A13 | −7.4128698E−11 | 9.9190349E−12 | −1.0038829E−11 |
| A14 | 6.9448678E−12 | 3.1655886E−12 | −1.7245978E−12 |
| A15 | 6.0097044E−12 | 5.2049778E−13 | −1.3337483E−13 |
| A16 | −8.0758150E−13 | 3.4342588E−14 | 2.8221441E−14 |
| A17 | −1.6327537E−14 | −9.5279779E−15 | 1.5516333E−14 |
| A18 | −3.9861242E−16 | −4.2244087E−15 | 3.6045923E−15 |
| A19 | 1.4322616E−15 | −6.6044624E−16 | 2.8661253E−16 |
| A20 | −8.6222508E−17 | 1.3773764E−16 | −1.6924525E−16 |

A through L of FIG. 21 are diagrams that illustrate aberrations of the zoom lens of Example 9 (the types of aberrations are the same as those shown for Example 1). In addition, FIG. 47 through FIG. 49 are collections of diagrams that illustrate lateral aberrations of the zoom lens of Example 9.

Example 10

The zoom lens of Example 10 is of the configuration illustrated in FIG. 10. The zoom lens of the present example is of a five group configuration, substantially constituted by a first lens group G1, a second lens group G2, a third lens group G3, a fourth lens group G4, and a fifth lens group G5, provided in this order from the object side. The signs of the refractive powers of the lens groups are positive, negative, positive, positive, and positive, in this order from the first lens group G1. The first lens group G1 through the fourth lens group G4 move along the optical axis Z while changing magnification, and the third lens group G3 and the fourth lens group G4 move integrally. In addition, the shake preventing lens is a lens L34 within the third lens group G3, and the focusing lens is a lens L41, which has a positive refractive power, within the fourth lens group G4.

Basic lens data of Example 10 are shown in Table 28, items and variable distances among surfaces of Example 10 are shown in Table 29, and aspherical surface coefficients of Example 10 are shown in Table 30.

TABLE 28

Example 10: Lens Data

| Si (Surface Number) | Ri (Radius of Curvature) | Di (Distance) | Ndj (Refractive Index) | vdj (Abbe's Number) |
|---|---|---|---|---|
| 1 | 50.7584 | 1.36 | 1.92286 | 18.90 |
| 2 | 35.3960 | 5.20 | 1.83481 | 42.73 |

TABLE 28-continued

Example 10: Lens Data

| Si (Surface Number) | Ri (Radius of Curvature) | Di (Distance) | Ndj (Refractive Index) | vdj (Abbe's Number) |
|---|---|---|---|---|
| 3 | 172.5090 | DD[3] | | |
| 4 | 45.6995 | 1.00 | 1.88300 | 40.76 |
| 5 | 10.3829 | 6.20 | | |
| *6 | −79.1957 | 1.05 | 1.58063 | 59.15 |
| *7 | 24.5916 | 0.13 | | |
| 8 | 18.6905 | 2.50 | 1.94595 | 17.98 |
| 9 | 42.1169 | DD[9] | | |
| 10 (aperture stop) | ∞ | 1.30 | | |
| *11 | 21.8562 | 2.67 | 1.80348 | 40.44 |
| *12 | −89.2045 | 1.87 | | |
| 13 | ∞ | 0.71 | 1.80000 | 29.84 |
| 14 | 13.4916 | 4.79 | 1.49700 | 81.54 |
| 15 | −13.4916 | 2.51 | | |
| *16 | −65.5278 | 1.00 | 1.58063 | 59.15 |
| *17 | 43.5543 | 5.20 | | |
| 18 | 52.6806 | 3.10 | 1.61800 | 63.33 |
| 19 | −29.4392 | 3.60 | | |
| 20 | −18.0675 | 0.80 | 1.53172 | 48.84 |
| 21 | ∞ | DD[21] | | |
| 22 | ∞ | 2.80 | 1.71299 | 53.87 |
| 23 | −60.0620 | 11.95 | | |
| 24 | ∞ | 2.85 | 1.51680 | 64.20 |
| 25 | ∞ | | | |

TABLE 29

Example 10: Items (related to d Line)

| | Wide Angle End | Intermediate | Telephoto End |
|---|---|---|---|
| Zoom Magnification | 1.000 | 1.697 | 2.946 |
| Focal Length | 16.52 | 28.03 | 48.66 |
| F No. | 3.59 | 4.54 | 5.62 |
| 2ω (°) | 89.4 | 54.8 | 32.2 |
| DD[3] | 0.70 | 8.54 | 22.04 |
| DD[9] | 14.56 | 7.73 | 3.43 |
| DD[21] | 2.20 | 13.36 | 24.95 |

TABLE 30

Example 10: Aspherical Surface Coefficients

| Surface Number | 6 | 7 | 11 |
|---|---|---|---|
| KA | 1.0000000E+00 | 1.0000000E+00 | 1.0000000E+00 |
| A3 | 1.3261466E−04 | −3.2535960E−04 | 2.6294284E−05 |
| A4 | −5.4682543E−04 | −2.5379984E−04 | −1.1637710E−04 |
| A5 | 1.3565342E−04 | 4.8091827E−05 | 3.9422076E−05 |
| A6 | −1.4185107E−05 | −9.3857983E−07 | −8.9945096E−06 |
| A7 | 9.5421085E−08 | −6.6624311E−07 | −1.9079783E−06 |
| A8 | 5.9631616E−08 | 9.8143733E−09 | 9.1846164E−07 |
| A9 | 3.1386593E−09 | 8.3599640E−09 | −1.0148435E−07 |
| A10 | −1.3822195E−10 | 6.4321867E−10 | 3.0613861E−09 |
| A11 | −3.4107461E−11 | −2.7310772E−11 | −8.9251715E−10 |
| A12 | −3.4036975E−12 | −1.1959289E−11 | 1.5660735E−11 |
| A13 | −1.2451233E−13 | −1.4007516E−12 | 2.7910491E−11 |
| A14 | 4.8471380E−15 | −3.9869227E−14 | 2.3779804E−12 |
| A15 | 1.7134692E−15 | 9.8853248E−15 | −6.1234031E−13 |
| A16 | 2.5051251E−16 | 2.1174214E−15 | −1.0624393E−13 |
| A17 | 1.1358833E−18 | 1.7756233E−16 | −1.1791378E−14 |
| A18 | 4.3278274E−18 | −3.9729409E−18 | 2.6975712E−15 |
| A19 | 2.4800382E−19 | −2.1787272E−18 | 1.1329425E−15 |
| A20 | −7.3205718E−20 | −3.7402136E−20 | −1.2948261E−16 |

| Surface Number | 12 | 16 | 17 |
|---|---|---|---|
| KA | 1.0000000E+00 | 1.0000000E+00 | 1.0000000E+00 |
| A3 | 1.9526224E−05 | −1.8360679E−04 | 2.5717863E−06 |
| A4 | 3.7582449E−05 | 1.9368904E−04 | 1.2010679E−04 |
| A5 | −5.7284888E−05 | −3.5237961E−05 | −1.5429248E−05 |
| A6 | 2.7458550E−05 | 2.0859307E−06 | 9.5831263E−07 |
| A7 | −5.8809212E−06 | 6.4568744E−07 | 3.8362823E−08 |
| A8 | 2.6764805E−07 | 4.9544239E−08 | 2.3179864E−08 |
| A9 | −6.8421070E−09 | −7.8058311E−09 | 5.7935754E−09 |
| A10 | 1.9828373E−08 | −2.9887460E−09 | 7.3191964E−10 |
| A11 | −3.2761969E−10 | −4.4086247E−10 | −1.9902190E−11 |
| A12 | −5.0392516E−10 | −1.6646737E−11 | −3.5193428E−11 |
| A13 | −7.4083489E−11 | 9.5996000E−12 | −9.9287205E−12 |
| A14 | 6.9293510E−12 | 3.1905268E−12 | −1.7170673E−12 |
| A15 | 6.0015653E−12 | 5.4270137E−13 | −1.3544163E−13 |
| A16 | −8.0969893E−13 | 4.1092155E−14 | 2.7232681E−14 |
| A17 | −1.6735466E−14 | −8.1318557E−15 | 1.5276751E−14 |
| A18 | −4.3695473E−16 | −4.0481586E−15 | 3.5691419E−15 |
| A19 | 1.4359945E−15 | −6.7263597E−16 | 2.8689331E−16 |
| A20 | −8.1457656E−17 | 1.1996698E−16 | −1.6672489E−16 |

A through L of FIG. 22 are diagrams that illustrate aberrations of the zoom lens of Example 10 (the types of aberrations are the same as those shown for Example 1). In addition, FIG. 50 through FIG. 52 are collections of diagrams that illustrate lateral aberrations of the zoom lens of Example 10.

Table 31 shows values of the zoom lenses of Examples 1 through 10 corresponding to Conditional Formulae (1) through (7). The values shown here are the values of the condition defined in each conditional formula, that is the equations therein, and are related to the d line.

TABLE 31

| | Example 1 | Example 2 | Example 3 | Example 4 | Example 5 | Example 6 | Example 7 | Example 8 | Example 9 | Example 10 |
|---|---|---|---|---|---|---|---|---|---|---|
| (1) \|f3IS/f3\| | 1.47 | 1.26 | 1.18 | 1.32 | 1.22 | 1.13 | 1.11 | 1.37 | 2.14 | 1.84 |
| (2) \|f3IS/fw\| | 2.23 | 1.62 | 1.85 | 1.62 | 1.68 | 1.56 | 1.70 | 2.14 | 3.10 | 2.72 |
| (3) \|f3IS/ft\| | 0.76 | 0.56 | 0.64 | 0.56 | 0.58 | 0.54 | 0.59 | 0.74 | 1.05 | 0.92 |
| (4) \|f4F/f4\| | 0.28 | 0.78 | 0.33 | 0.11 | 0.31 | 0.24 | 0.50 | 0.51 | 0.20 | 0.22 |
| (5) f1/fw | 5.56 | 4.88 | 6.02 | 4.58 | 4.57 | 4.65 | 4.92 | 5.99 | 5.51 | 5.43 |
| (6) f1/ft | 1.89 | 1.69 | 2.09 | 1.59 | 1.59 | 1.61 | 1.71 | 2.08 | 1.87 | 1.84 |
| (7) BFw/TLw | 0.25 | 0.31 | 0.24 | 0.25 | 0.23 | 0.25 | 0.33 | 0.26 | 0.25 | 0.25 |

Table 32 shows the amounts of movement of the movable third lens groups (the lens L34) in the zoom lenses of Examples 1 through 10 in the case that camera shake in which the optical axis tilts 0.3 degrees is corrected. Here, the amounts of movement at the wide angle end, at the intermediate focal distance, and at the telephoto end are shown for each Example. Note that the amounts of movement are amounts of movement in a direction perpendicular to the optical axis, and the units of measurement are mm.

TABLE 32

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Wide Angle End | 0.108 | 0.101 | 0.090 | 0.105 | 0.099 | 0.100 | 0.097 | 0.099 | 0.147 | 0.131 |
| Intermediate | 0.138 | 0.139 | 0.119 | 0.142 | 0.135 | 0.134 | 0.134 | 0.132 | 0.186 | 0.167 |
| Telephoto End | 0.190 | 0.193 | 0.156 | 0.194 | 0.185 | 0.184 | 0.188 | 0.178 | 0.255 | 0.231 |

Next, an imaging apparatus according to an embodiment of the present invention will be described with reference to FIG. 53 and FIG. 54. A camera 30 illustrated in the front perspective view of FIG. 53 and the rear perspective view of FIG. 54 is non reflex digital camera, onto which an exchangeable lens 20 is interchangeably mounted. The exchangeable lens 20 is a zoom lens 1 according to an embodiment of the present invention housed in a lens barrel.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37.

An imaging element (not shown), such as a CCD that receives images of subjects formed by the exchangeable lens 20 and outputs image signals corresponding to the images, a signal processing circuit that processes the image signals output by the imaging element to generate images, and a recording medium for recording the generated images, are provided within the camera body 31. In this camera 30, photography of a still image corresponding to a single frame or video imaging is enabled by pressing the shutter release button 32. Image data obtained by photography or video imaging are recorded in the recording medium.

The camera 30 has fast camera shake correction response time and focusing operation response time, and can achieve reductions in size and weight, because it is equipped with the zoom lens 1 of the present invention.

The present invention has been described with reference to the embodiments and Examples thereof. However, the present invention is not limited to the embodiments and Examples described above, and various modifications are possible. For example, the values of the radii of curvature of each lens component, the distances among surfaces, the refractive indices, the Abbe's numbers, the aspherical surface coefficients, etc., are not limited to the numerical values indicated in connection with the Examples, and may be other values.

In addition, a non reflex (so called mirrorless) digital camera was described as an example of the embodiment of the imaging apparatus. However, the imaging apparatus of the present invention is not limited to such a camera. The present invention may be applied to imaging apparatuses such as video cameras, digital cameras, cinematic cameras, and broadcast cameras as well.

What is claimed is:

1. A zoom lens, comprising:
a first lens group having a positive refractive power;
a second lens group having a negative refractive power;
a third lens group having a positive refractive power; and
a fourth lens group having a positive or a negative refractive power; provided in this order from an object side;
the first lens group, the second lens group, and the third lens group moving such that the distance between the first lens group and the second lens group is greater while the distance between the second lens group and the third lens group is less at the telephoto end compared to the wide angle end, and the fourth lens moving integrally with the third lens group;
the third lens group substantially consisting of a fixed third lens group having a positive refractive power as a whole, constituted by at least one lens having a positive refractive power and at least one lens having a negative refractive power, and a movable third lens group provided more toward an image side than the fixed third lens group constituted by a single lens having a negative refractive power that moves in a direction perpendicular to an optical axis to correct an image plane when camera shake occurs; and
the fourth lens group substantially consisting of a movable fourth lens group that moves along the optical axis during focusing operations and a fixed fourth lens group which is fixed with respect to the direction of the optical axis during focusing operations.

2. A zoom lens, comprising:
a first lens group having a positive refractive power;
a second lens group having a negative refractive power;
a third lens group having a positive refractive power; and
a fourth lens group having a positive or a negative refractive power; provided in this order from an object side;
the first lens group, the second lens group, and the third lens group moving such that the distance between the first lens group and the second lens group is greater while the distance between the second lens group and the third lens group is less at the telephoto end compared to the wide angle end, and the fourth lens moving along a trajectory different from that of the third lens group;

the third lens group substantially consisting of a fixed third lens group having a positive refractive power as a whole, constituted by at least one lens having a positive refractive power and at least one lens having a negative refractive power, and a movable third lens group provided more toward an image side than the fixed third lens group constituted by a single lens having a negative refractive power that moves in a direction perpendicular to an optical axis to correct an image plane when camera shake occurs; and the fourth lens group substantially consisting of a movable fourth lens group that moves along the optical axis during focusing operations and a fixed fourth lens group which is fixed with respect to the direction of the optical axis during focusing operations.

3. A zoom lens as defined in claim 1, wherein:
the movable fourth lens group and the fixed fourth lens group have refractive powers of mutually different signs.

4. A zoom lens as defined in claim 1, wherein:
the fixed third lens group comprises at least two lenses having positive refractive powers.

5. A zoom lens as defined in claim 1 that satisfies Conditional Formula (1) below:

$$0.8 < |f3IS/f3| < 2.6 \quad (1)$$

wherein f3IS is the focal length of the movable third lens group, and f3 is the focal length of the third lens group.

6. A zoom lens as defined in claim 5 that satisfies Conditional Formula (1-2) below:

$$0.9 < |f3IS/f3| < 2.4 \quad (1\text{-}2).$$

7. A zoom lens as defined in claim 5 that satisfies Conditional Formula (1-3) below:

$$1.0 < |f3IS/f3| < 2.3 \quad (1\text{-}3).$$

8. A zoom lens as defined in claim 1 that satisfies Conditional Formulae (2) and (3) below:

$$1.2 < |f3IS/fw| < 3.5 \quad (2)$$

$$0.3 < |f3IS/ft| < 1.3 \quad (3)$$

wherein f3IS is the focal length of the movable third lens group, fw is the focal length of the entire system at the wide angle end, and ft is the focal length of the entire system at the telephoto end.

9. A zoom lens as defined in claim 8 that satisfies Conditional Formula (2-2) below:

$$1.3 < |f3IS/fw| < 3.4 \quad (2\text{-}2).$$

10. A zoom lens as defined in claim 8 that satisfies Conditional Formula (2-3) below:

$$1.4 < |f3IS/fw| < 3.3 \quad (2\text{-}3).$$

11. A zoom lens as defined in claim 8 that satisfies Conditional Formula (3-2) below:

$$0.4 < |f3IS/ft| < 1.1 \quad (3\text{-}2).$$

12. A zoom lens as defined in claim 1, wherein:
the first lens group substantially consists of two lenses, which are a lens having a negative refractive power, and a lens having a positive refractive power, provided in this order from the object side.

13. A zoom lens as defined in claim 1, wherein:
the fourth lens group has a positive refractive power; and
the movable fourth lens group has a positive refractive power.

14. A zoom lens as defined in claim 1 that satisfies Conditional Formula (4) below:

$$0.05 < |f4F/f4| < 1.00 \quad (4)$$

wherein f4F is the focal length of the movable fourth lens group and f4 is the focal length of the fourth lens group.

15. A zoom lens as defined in claim 1, wherein:
the second lens group substantially consists of three lenses, which are a lens having a negative refractive power, a lens having a negative refractive power, and a lens having a positive refractive power, provided in this order from the object side.

16. A zoom lens as defined in claim 1, wherein:
only a fifth lens group, which is constituted by a single lens having a positive refractive power and which is fixed in the direction of the optical axis while changing magnification and during focusing operations, is provided as a lens group arranged more toward the image side than the fourth lens group.

17. A zoom lens as defined in claim 1, wherein:
the movable fourth lens group substantially consists of a single lens.

18. A zoom lens as defined in claim 1, wherein:
the fixed third lens group substantially consists of a lens having a positive refractive power, a lens having a negative refractive power, and a lens having a positive refractive power, provided in this order from the object side.

19. An imaging apparatus equipped with a zoom lens as defined in claim 1.

20. An imaging apparatus equipped with a zoom lens as defined in claim 2.

* * * * *